(12) United States Patent
Uno et al.

(10) Patent No.: US 9,476,732 B2
(45) Date of Patent: Oct. 25, 2016

(54) POOR VISIBILITY ESTIMATION SYSTEM AND POOR VISIBILITY ESTIMATION METHOD

(71) Applicants: Satoshi Uno, Tokyo (JP); Takuji Yamada, Mitaka (JP); Shinichiro Fujii, Kawasaki (JP); Kazuomi Ohta, Yokohama (JP)

(72) Inventors: Satoshi Uno, Tokyo (JP); Takuji Yamada, Mitaka (JP); Shinichiro Fujii, Kawasaki (JP); Kazuomi Ohta, Yokohama (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/647,533

(22) PCT Filed: Nov. 30, 2012

(86) PCT No.: PCT/JP2012/081207
§ 371 (c)(1),
(2) Date: May 27, 2015

(87) PCT Pub. No.: WO2014/083708
PCT Pub. Date: Jun. 5, 2014

(65) Prior Publication Data
US 2015/0330807 A1 Nov. 19, 2015

(51) Int. Cl.
*B60Q 1/00* (2006.01)
*G01C 21/36* (2006.01)
*G01M 17/06* (2006.01)
(Continued)

(52) U.S. Cl.
CPC ....... *G01C 21/3691* (2013.01); *G01C 21/3407* (2013.01); *G01M 17/06* (2013.01); *G01W 1/00* (2013.01); *G08G 1/096716* (2013.01); *G08G 1/096741* (2013.01); *G08G 1/096775* (2013.01);
(Continued)

(58) Field of Classification Search
USPC ....... 702/3, 182, 179, 181; 701/41; 180/400; 362/464, 466
See application file for complete search history.

(56) References Cited

U.S. PATENT DOCUMENTS 6,227,496 B1 * 5/2001 Yoshikawa .............. B64G 1/24
244/171
6,327,522 B1 * 12/2001 Kojima .................. B60K 35/00
348/115
(Continued)

FOREIGN PATENT DOCUMENTS

| JP | 2000-36098 A | 2/2000 |
| JP | 2005-249647 A | 9/2005 |

(Continued)

OTHER PUBLICATIONS

Analysis of Steering Angle under Driving Fatigue; Mao Zhe; Huang Deqi; Education Technology and Computer Science (ETCS), 2010 Second International Workshop on; Year: 2010, vol. 3; pp. 650-653, DOI: 10.1109/ETCS.2010.562.*

(Continued)

*Primary Examiner* — Cuong H Nguyen
(74) *Attorney, Agent, or Firm* — Sughrue Mion, PLLC

(57) ABSTRACT

Provided are a poor visibility estimation system and a poor visibility estimation method that can estimate poor visibility using a simpler configuration. A center has a change amount calculation unit for calculating the change amounts of operation elements of vehicles. A visibility estimation unit estimates poor visibility on the basis of the change amounts calculated by the change amount calculation unit. The center also has a distribution unit for distributing the estimation results of the visibility estimation unit.

4 Claims, 39 Drawing Sheets

(51) Int. Cl.
*G01C 21/34* (2006.01)
*G01W 1/00* (2006.01)
*G08G 1/0967* (2006.01)
*G08G 1/0968* (2006.01)

(52) U.S. Cl.
CPC .. *G08G 1/096827* (2013.01); *G08G 1/096866* (2013.01)

(56) References Cited

U.S. PATENT DOCUMENTS

| | | | | |
|---|---|---|---|---|
| 6,829,568 | B2* | 12/2004 | Julier | G06F 17/18 702/189 |
| 7,254,468 | B2* | 8/2007 | Pillar | A62C 27/00 169/24 |
| 7,302,320 | B2* | 11/2007 | Nasr | A62C 27/00 180/65.1 |
| 8,000,850 | B2* | 8/2011 | Nasr | A62C 27/00 180/65.1 |
| 8,519,837 | B2* | 8/2013 | Kirsch | B60K 35/00 340/425.5 |
| 2003/0147247 | A1* | 8/2003 | Koike | B60Q 1/484 362/464 |
| 2003/0204382 | A1* | 10/2003 | Julier | G06F 17/18 702/196 |
| 2005/0113988 | A1* | 5/2005 | Nasr | A62C 27/00 701/22 |
| 2005/0114007 | A1* | 5/2005 | Pillar | A62C 27/00 701/82 |
| 2008/0040004 | A1* | 2/2008 | Breed | B60R 21/0134 701/45 |
| 2008/0071438 | A1* | 3/2008 | Nasr | A62C 27/00 701/22 |
| 2008/0291276 | A1* | 11/2008 | Randler | B62D 1/28 348/149 |
| 2009/0076774 | A1 | 3/2009 | Miyajima | |
| 2009/0082917 | A1 | 3/2009 | Adachi | |
| 2012/0310536 | A1* | 12/2012 | Katayama | G01C 21/3461 702/3 |

FOREIGN PATENT DOCUMENTS

| | | |
|---|---|---|
| JP | 2005-352615 A | 12/2005 |
| JP | 2007-269268 A | 10/2007 |
| JP | 2008-191910 A | 8/2008 |
| JP | 2009-75647 A | 4/2009 |
| JP | 2009-230720 A | 10/2009 |
| JP | 2011-215929 A | 10/2011 |

OTHER PUBLICATIONS

RCS simulation and comparison of two shipboard cylindrical trihedral radar reflectors in S-band and X-band; Zivkovic, Z.; Sarolic, A.; Software, Telecommunications & Computer Networks, 2009. SoftCOM 2009. 17th International Conference on; Year: 2009; pp. 60-64.*

Simulation and evaluation of the vehicle steering wheel angle pulse input test based on ADAMS; Li Sun; Yongchen Liu; Artificial Intelligence, Management Science and Electronic Commerce (AIMSEC), 2011 2nd International Conference on; Year: 2011; pp. 5773-5776, DOI: 10.1109/AIMSEC.2011.6009963.*

System Analysis of a Phased-Array Radar Applying Adaptive Beam-Control for Future Automotive Safety Applications; Manuel Dudek; Ismail Nasr; Gabor Bozsik; Mohamed Hamouda; Dietmar Kissinger; Georg Fischer; IEEE Transactions on Vehicular Technology; Year: 2015, vol. 64, Issue: 1; pp. 34-47, DOI: 10.1109/TVT.2014.2321175.*

Radar imaging with very low grazing angles in a bistatic forward-looking configuration; Ingo Walterscheid; Andreas R. Brenner; Jens Klare; 2012 IEEE International Geoscience and Remote Sensing Symposium; Year: 2012; pp. 327-330, DOI: 10.1109/IGARSS.2012.6351571.*

International Search Report for PCT/JP2012/081207 dated Feb. 26, 2013 [PCT/ISA/210].

* cited by examiner

Fig.23

| Road Condition | Unsteady-state Determination Threshold Value | Poor Visibility Estimation Threshold Value |
|---|---|---|
| Dry | X1 | Y1 |
| Wet | X2 | Y2 |
| Frozen | X3 | Y3 |
| Covered With Snow | X4 | Y4 |
| Icy | X5 | Y5 |
| ... | X6 | Y6 |
| ... | X7 | Y7 |
| ... | ... | ... |
| ... | ... | ... |
| ... | ... | ... |

Fig.26

| Road Condition | Unsteady-state Determination Threshold Value | Average Of Spectrum Areas |
|---|---|---|
| Dry | X1 | Z1 |
| Wet | X2 | Z2 |
| Frozen | X3 | Z3 |
| Covered With Snow | X4 | Z4 |
| Icy | X5 | Z5 |
| ... | X6 | Z6 |
| ... | X7 | Z7 |
| ... | ... | ... |
| ... | ... | ... |
| ... | ... | ... |

POOR VISIBILITY ESTIMATION SYSTEM AND POOR VISIBILITY ESTIMATION METHOD

CROSS REFERENCE TO RELATED APPLICATION

This application is a National Stage of International Application No. PCT/JP2012/081207, filed on Nov. 30, 2012, the contents of all of which are incorporated herein by reference in their entirety.

FIELD OF DISCLOSURE

The present invention relates to a poor visibility estimation system and a poor visibility estimation method that are used for estimating poor visibility.

BACKGROUND OF THE DISCLOSURE

Generally, traveling environments of a vehicle, especially visibility, change with weather conditions. Therefore, a navigation system or the like mounted on a vehicle acquires, from the outside, information about weather conditions, and presents the acquired information.

In recent years, a system for observing weather based on information acquired from vehicles has been developed. As a system of this type, a system (weather information processor) for observing weather based on a weather condition variable measured by a weather information sensor mounted on a first vehicle is known, as disclosed in Patent Document 1, for example. This system includes, as a weather information sensor, a raindrop sensor, a barometer, a sunshine sensor, a thermometer, and hygrometer. In this system, the amount of rainfall, the illuminance of the sun on the vehicle, the respective temperature and humidity levels inside and outside the vehicle, and the like are measured, as weather condition variables, by the raindrop sensor, the barometer, the sunshine sensor, the thermometer, the hygrometer, and the like. Next, it is determined whether the amount of deviation between this measured weather condition variable and the previous weather condition variable is equal to or higher than a predetermined value. When it is determined that the amount of deviation is equal to or higher than a predetermined value, weather change detection information is generated, which indicates the amount of deviation and a weather change position indicating the current position of the first vehicle, where the weather condition variable has been measured. Then, the weather change detection information thus generated is transmitted to a second vehicle different from the first vehicle, and is presented to, for example, the driver through an apparatus mounted on this second vehicle.

PRIOR ART DOCUMENTS

Patent Documents

Patent Document 1: Japanese Laid-Open Patent Publication No. 2011-215929

SUMMARY OF THE INVENTION

Problems that the Invention is to Solve

In the system described in the Patent Document 1, various sensors for observing weather are required. Such a requirement further necessitates providing a vehicle control device and the like with a processing function to process results detected by various sensors. Therefore, it is inevitable that an on-vehicle system and hence a system for observing weather will be complicated and costs will be increased. Even in observation of weather, which is a factor in poor visibility, by use of the system described in Patent Document 1, complication of the system and an increase in the cost are inevitable.

Accordingly, it is an objective of the present invention to provide a poor visibility estimation system and a poor visibility estimation method that are able to estimate poor visibility by a simpler configuration.

Means for Solving the Problems

Means for achieving the above objective and advantages thereof will now be discussed.

To achieve the foregoing objective, the present invention provides a poor visibility estimation system that estimates poor visibility. The system includes a change amount calculating section that calculates an amount of change in an operation element of a vehicle and a visibility estimating section that estimates poor visibility based on the calculated amount of change.

To achieve the foregoing objective, the present invention also provides a poor visibility estimation method for estimating poor visibility. The method includes: a calculation step in which an amount of change in an operation element of a vehicle is calculated; and a visibility step in which poor visibility is estimated based on the amount of change calculated in the calculation step.

When visibility decreases due to weather conditions, vehicle operations performed by the driver also change due to the decrease in the visibility. Such changes tend to be common or similar under the conditions in which the visibility decreases, that is, when the visibility is poor. Additionally, changes in such operation elements can be detected by various existing sensors or the like provided in a vehicle.

Therefore, in the foregoing configuration or method, an amount of change in the operation element of the vehicle is calculated. Then, based on the calculated amount of change, poor visibility is estimated. Accordingly, it is possible to estimate poor visibility based on the amounts of change in operation elements detectable by the various existing sensors or the like provided in the vehicle. Thus, poor visibility can be estimated without providing the vehicle and the like with a sensor and system for observing weather that is a factor in poor visibility. Accordingly, it is possible to estimate poor visibility by a simpler configuration.

In accordance with one aspect of the present, if the amount of change calculated by the change amount calculating section is equal to or greater than a reference change amount used as a reference for determining whether visibility is poor, the visibility estimating section determines that the visibility is poor at a traveling point or in a traveling area of the vehicle for which the amount of change has been calculated.

The amount of change in the operation element when the visibility is poor often reaches or exceeds a certain amount of change. In contrast, the amount of change in the operation element when the visibility is favorable changes to a certain amount of change, and seldom reaches or exceeds the certain amount of change.

Therefore, in the foregoing configuration, a reference change amount is set as a threshold value for estimating poor visibility. If the calculated amount of change is equal to or higher than the reference change amount, it is determined that the visibility is poor at the traveling point or in the traveling area of the vehicle from which the amount of change has been calculated. Therefore, based on a comparison between the reference change amount and the calculated amount of change, poor visibility is determined. Thus, poor visibility is more easily estimated.

In accordance with one aspect of the present invention, the visibility estimating section determines that the visibility is poor if at least one of the following conditions is satisfied: (a) the amount of change continues to be equal to or greater than the reference change amount for a time equal to or longer than a prescribed time; (b) the number of times that the amount of change has become equal to or greater than the reference change amount is equal to or larger than the prescribed number; and (c) the number of times that the amount of change continues to be equal to or greater than the reference change amount for a time equal to or longer than the prescribed time is equal to or larger than the prescribed number.

When the visibility is poor, the amount of change in the operation element increases. When the visibility is poor, the time for which the amount of change is equal to or greater than the reference change amount tends to be equal to or longer than the predetermined time. Therefore, in the foregoing configuration, based on the tendency that the time for which the amount of change is equal to or greater than the reference change amount is equal to or longer than the prescribed time, it is determined that the visibility is poor. Thus, it is possible to estimate poor visibility based on the measurement of the time for which the amount of change is equal to or greater than the reference change amount is equal to or longer than a prescribed time.

When the visibility is poor, the number of times that the amount of change becomes equal to or greater than the reference change amount tends to be equal to or larger than a prescribed number. Therefore, in the foregoing configuration, based on the tendency that the number of times that the amount of change becomes equal to or greater than the reference change amount is equal to or larger than a prescribed number, the visibility is determined to be poor. Thus, it is possible to estimate poor visibility based on the measurement of the number of times that the amount of change becomes equal to or greater than the reference change amount is equal to or larger than a prescribed number.

Also, when the visibility is poor, the number of times that the time for which the amount of change becomes equal to or greater than the reference change amount is equal to or longer than the prescribed time is equal to or larger than a prescribed number. Therefore, in the foregoing configuration, based on the tendency that the time for which the amount of change becomes equal to or greater than the reference change amount is equal to or longer than the prescribed time, the visibility is determined to be poor. That is, if the time for which the amount of change is equal to or greater than the reference change amount is equal to or longer than the prescribed time, and the number of times that the time for which the amount of change becomes equal to or greater than the reference change amount is equal to or longer than the prescribed time is equal to or larger than the prescribed number, the visibility is determined to be poor. Accordingly, poor visibility is estimated based on stricter conditions. Accordingly, the reliability of the result of poor visibility estimation is further improved.

In accordance with one aspect of the present invention, the change amount calculating section performs at least one of: a process of calculating the amount of change per collection unit of data indicating the amount of change in the operation element of the vehicle; a process of calculating the amount of change per predetermined traveling distance of the vehicle; and a process of calculating the amount of change as required each time a collection road section of data indicating the amount of change in the operation element of the vehicle switches, wherein the predetermined traveling distance of the vehicle is used as a unit.

Data indicating the amounts of change in operation elements of the vehicle are acquired by various sensors mounted on the vehicle and are transmitted to a vehicle network such as a CAN at predetermined intervals. Then, the data is stored in a storage area connected to the vehicle network. That is, the transmission interval of the vehicle network corresponds to collection unit of data that indicates the amount of change in the operation element of the vehicle, and also corresponds to the smallest unit of data.

In the foregoing configuration, the amount of change is calculated per data collection unit. Therefore, even the minimal level of amount of change in the operation element is detected. When the data stored in the storage area of the vehicle is collected in an external device, this collection unit can also be used as the collection unit described above.

Additionally, changes in the operation element caused by poor visibility tend to be noticeable in a predetermined traveling distance, for example, from tens to hundreds of meters. Therefore, by calculating the amount of change in the operation element per predetermined traveling distance, the change in the operation element caused by poor visibility is accurately reflected in the amount of change calculated.

Additionally, in the foregoing configuration, the amount of change calculated per predetermined traveling distance as described above can be calculated as required each time the data collection section is switched. By virtue of this, while a predetermined traveling distance is used as a calculation unit for the amount of change, change in the operation element caused in the unit of data collection is also accurately exhibited. Thus, poor visibility and the point where the visibility is poor are estimated with higher accuracy.

In accordance with one aspect of the present invention, the change amount calculating section subjects the data indicating the amount of change in the operation element of the vehicle to frequency conversion. The visibility estimating section determines that the visibility is poor if the data subjected to the frequency conversion is equal to or greater than a prescribed amount of operation.

In the foregoing configuration, a change in the operation element can be classified into a plurality of frequency bands. A change in the operation element caused by poor visibility is especially noticeable in a particular frequency band.

In this respect, according to the foregoing configuration, data indicating the amount of change in the operation element of the vehicle is subjected to frequency conversion. Then, if the data subjected to the frequency conversion is equal to or greater than a prescribed amount of operation, the visibility is determined to be poor. Accordingly, even when a change in the operation element caused by poor visibility occurs in a specific frequency band, this change is accurately detected. Thus, estimation based on the amount of change in the operation element is performed with high accuracy.

In accordance with one aspect of the present invention, the change amount calculating section carries out the frequency conversion by the Fourier transform or the wavelet transform.

According to the Fourier transform or the wavelet transform, the change amount of each frequency is rendered noticeable. Therefore, as in the foregoing configuration, by subjecting data indicating the amount of change in the operation element to the Fourier transform or the wavelet transform, poor visibility is estimated with higher accuracy based on the data subjected to the frequency conversion.

In accordance with one aspect of the present invention, the visibility estimating section estimates poor visibility based on the data subjected to the frequency conversion in a frequency band from 0.5 to 1.0 Hz.

The difference in the amount of change in the operation element between when the visibility is favorable and when the visibility is poor is especially noticeable in a frequency band from 0.5 to 1.0 Hz. Therefore, in the foregoing configuration, poor visibility is estimated based on data in the frequency band from 0.5 to 1.0 Hz. Thus, it is possible to accurately determine whether the visibility is favorable.

In accordance with one aspect of the present invention, the visibility estimating section determines that the visibility is poor if the amount of change in the operation element subjected to estimation exceeds the average of amounts of change in the operation element when the weather is fine.

The amount of change in the operation element when the weather is fine, that is, when the visibility is favorable, is lower than that when the visibility is poor. Additionally, the amount of change in the operation element when the visibility is favorable tends to change within a certain range. Therefore, if a change exceeds the range of the amount of change in the operation element when the visibility is favorable, the visibility is highly likely to be poor.

Therefore, in the foregoing configuration, if the amount of change in the operation element subjected to estimation exceeds the average of the amounts of change in the operation element when the weather is fine, it is assumed that the change exceeds the range of the amount of change in the operation element when the visibility is favorable, and the visibility is determined to be poor. Thus, poor visibility is accurately determined based on a comparison with the characteristics of the amount of change in the operation element acquired when the weather is fine.

In accordance with one aspect of the present invention, the amount of change in the operation element is an amount of change in at least one a steering angle, a steering angular velocity, a traveling speed, an acceleration, a steering torque, a yaw rate, an amount of depression of an accelerator pedal, and an amount of depression of a brake pedal.

When the visibility is poor, the driver's view decreases, causing the driver to perform vehicle operations more carefully than when the visibility is favorable. Therefore, operating methods for the steering wheel, the accelerator pedal, or the brake pedal change. In particular, the frequency and the amount of operation of the steering wheel increase. Additionally, the traveling speed of the vehicle decreases with a decrease in the amount of depression of the accelerator pedal or with an increase in the amount of depression of the brake pedal.

In this respect, according to the forgoing configuration, the amount of change in at least of one of the elements: the steering angle, the steering angular velocity, the traveling speed, the acceleration, the steering torque, the yaw rate, the amount of depression of the accelerator pedal, and the amount of depression of the brake pedal, is calculated as the amount of change in the operation element. Therefore, poor visibility is estimated based on the amount of change in the operation element highly likely to be affected by poor visibility.

In accordance with one aspect of the present invention, the poor visibility estimation system further includes a filtering section that selects, from among the data indicating the amount of change in the operation element, data not subjected to estimation and excludes the selected data.

According to the foregoing configuration, data not subjected to estimation is selected, and the selected data is excluded. Therefore, for the calculation of the amount of change, the change amount calculating section needs only the data that has not been excluded by the filtering section. Additionally, the visibility estimating section needs to estimate poor visibility based only on change amounts based on the data that has not been excluded by the filtering section. In this way, processing loads on the change amount calculating section and the visibility estimating section are reduced, thus smoothing the change amount calculation and the poor visibility estimation.

In accordance with one aspect of the present invention, the filtering section selects, as the excluded data, at least data indicating that the number of inversions of a steering angle is smaller than a predetermined number or data indicating the amount of change in the operation element in the vehicle on a road of a predetermined curvature.

When the visibility is poor, the number of inversions of the steering angle tends to increase, and it has been observed that the number of inversions of the steering angle reaches or exceeds the predetermined number. In contrast, when the number of inversions of the steering angle is smaller than the predetermined number, the visibility is highly likely to be favorable.

In this respect, according to the forgoing configuration, data indicating that the number of inversions of the steering angle is smaller than the predetermined number is highly likely to have been acquired when the visibility was favorable, and is excluded by the filtering section. Therefore, the change amount calculating section and the visibility estimating section need to process only data that is highly likely to have been acquired when the visibility was poor. Thus, while processing loads on the change amount calculating section and the visibility estimating section are reduced, data subjected to estimation is accurately narrowed down. Additionally, based on the steering angle change data and the like, the number of inversions of the steering angle can be easily determined. Accordingly, in the foregoing configuration, it is easy for the filtering section to select data to be excluded.

Meanwhile, on a road of a predetermined curvature, vehicle operations, such as steering and deceleration, which meet the linear shape of the road, are performed regardless of whether the visibility is favorable. Therefore, data acquired on the road of a predetermined curvature includes a change amount caused by an element different from the visibility.

In this respect, according to the forgoing configuration, data acquired on the road of the predetermined curvature is selected to be excluded. Thereby, detection of a change amount caused by an element different from the visibility is prevented from causing an erroneous estimation of poor visibility.

In accordance with one aspect of the present invention, the visibility estimating section determines that the visibility is poor under weather conditions including fog, snowstorm, whiteout, or an amount of rainfall not smaller than a prescribed amount.

Weather phenomena such as fog, snowstorm, whiteout, an amount of rain not smaller than a prescribed amount, or the like significantly influence visibility, and vehicle operations also tend to change due to these weather phenomena.

In this respect, according to the forgoing configuration, fog, snowstorm, whiteout, and an amount of rain not smaller than a prescribed amount are used as weather conditions that cause poor visibility, thus making it possible to estimate whether the visibility is favorable depending on these weather conditions.

In accordance with one aspect of the present invention, the change amount calculating section and the visibility estimating section are provided in a center that collects probe information indicating the amount of change in the operation element of the vehicle together with position information of the vehicle.

What is called probe information includes data detected by various sensors mounted on the vehicle. Based on the data, amounts of change in operation elements of the vehicle can be determined. The wider the variety of vehicles and traveling areas thereof that are collection sources of the probe information, the higher becomes the probability of collection of probe information acquired at the point or in an area where the visibility is poor.

In this respect, according to the forgoing configuration, a plurality of items of probe information acquired by a plurality of vehicles is collected together in a center. Accordingly, it is possible for the center to estimate poor visibility by using probe information acquired over a wide range and on a plurality of roads. Thus, the estimation range for poor visibility is expanded, making it possible to estimate poor visibility for more areas.

In accordance with one aspect of the present invention, the center identifies a poor visibility point or area based on a result of estimation by the visibility estimating section and the position information, and delivers information indicating the result of the estimation to an information terminal used in at least one of a vehicle present at the identified point, a vehicle the destination of which is the identified point, a vehicle on a recommended route to a destination that includes the identified point, and a vehicle present in a predetermined range around the identified point.

In the foregoing configuration, a poor visibility point or area is identified based on the result of estimation by the visibility estimating section and the position information. Then, information indicating the result of the estimation is delivered to an information terminal used in at least one of: a vehicle present at the identified point; a vehicle destination of which is the identified point; and the vehicle present in a predetermined range around the identified point. Thus, the information terminals are actively provided with the estimation result obtained by the center.

Additionally, in the foregoing configuration, the result of estimation is delivered to an information terminal used in a vehicle the destination of which is the point where the visibility is estimated to be poor or to an information terminal used in a vehicle that is on a route to a destination including the of the estimated poor visibility. Therefore, when a set destination and recommended route are identified and a poor visibility point is present at this destination or on a recommended route, information indicating this is actively delivered to the information terminals. Accordingly, the user of the information terminal can grasp in advance whether the visibility is favorable at the destination or on the recommended route. By virtue of this, it is possible for the information terminals to set a destination and to search for a route, taking into consideration the result of poor visibility estimation.

Meanwhile, in the foregoing configuration, the estimation result is delivered to information terminals used in vehicles present in a predetermined range around the identified point, thereby making it possible to inform the information terminal users that a poor visibility area is present around the vehicles.

Information terminals are multifunctional phones such as a smart phone and a navigation system mounted on, for example, a vehicle.

In accordance with one aspect of the present invention, the data indicating the amount of change in the operation element of the vehicle is acquired through a multifunctional phone that is able to communicate with an on-vehicle information terminal mounted on the vehicle. The multifunctional phone transmits the acquired data to the center through communication with the center.

Multifunctional phones such as recent smart phones are able to acquire, through communication with an on-vehicle information terminal, data flowing in a vehicle network. Additionally, such multifunctional phones are able to communicate with an external network through a communication function.

Accordingly, in the foregoing configuration, data indicating the amount of change in the operation element of the vehicle is acquired through the multifunctional phone. Then, the acquired data is transmitted to the center. Accordingly, means for acquiring data indicating the amount of change in the operation element of the vehicle is further diversified, improving the versatility of the poor visibility estimation system.

BRIEF DESCRIPTION OF THE DRAWINGS

FIG. 23 is a chart showing examples of an unsteady-state determination threshold value and a poor visibility estimation threshold value for each traveling environment.

FIG. 26 is a chart showing examples of an unsteady-state determination threshold value and the average of spectrum areas for each traveling environment.

DETAILED DESCRIPTION OF THE PREFERRED EMBODIMENTS

First Embodiment

A poor visibility estimation system and a poor visibility estimation method according to a first embodiment of the present invention will be described with reference to FIGS. 1 to 9.

Figure 1:
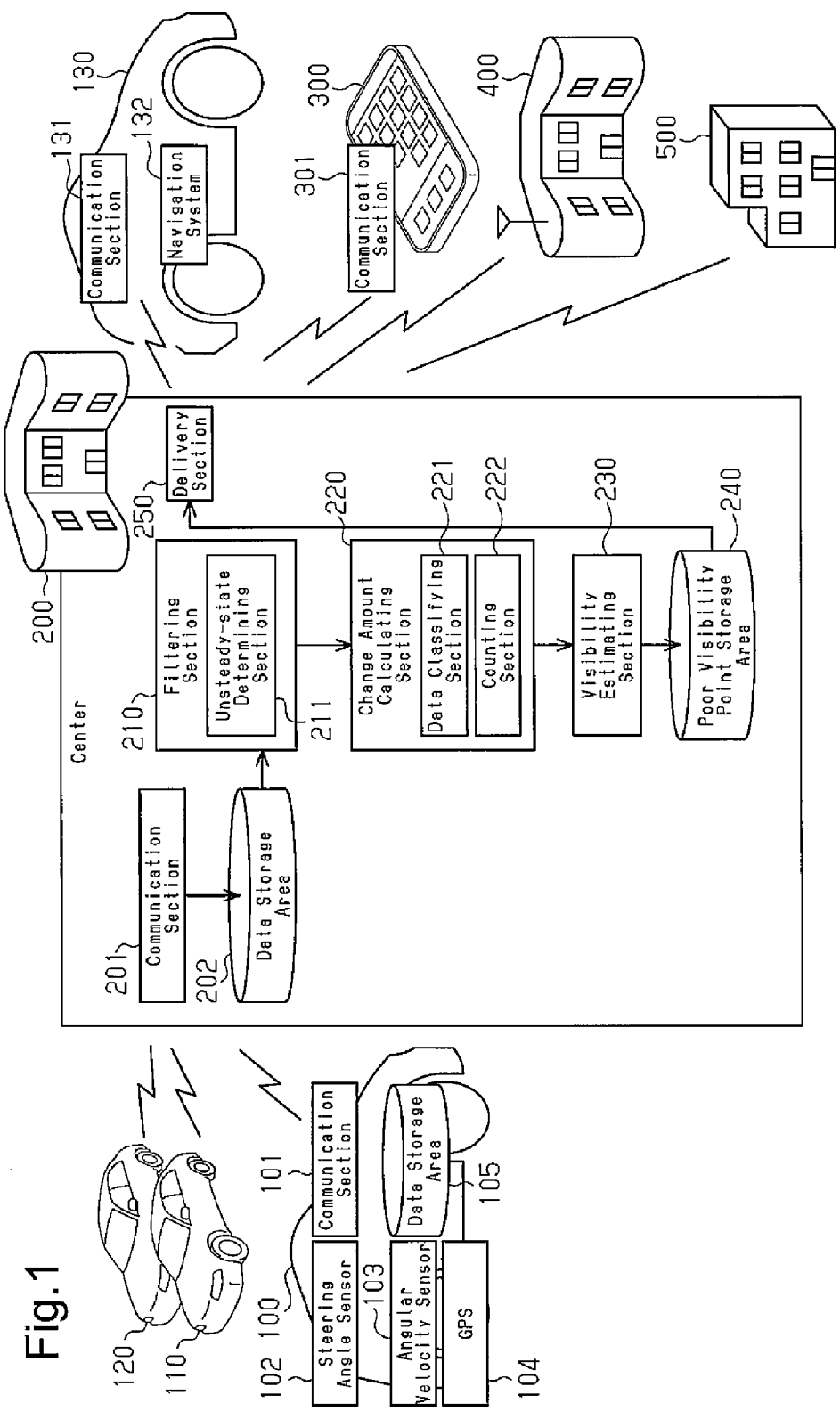
FIG. 1 is a block diagram schematically showing a center to which a poor visibility estimation system and a poor visibility estimation method according to a first embodiment of the present invention are applied, and showing communication with the center.

As shown in FIG. 1, a center 200 where the poor visibility estimation system and the poor visibility estimation method according to the first embodiment are used has a communication section 201 that is able to communicate with a vehicle 100. The communication section 201 acquires, through a communication section 101 provided on the vehicle 100, data indicating amounts of changes in various elements of operation performed in the vehicle 100.

The vehicle 100 is provided with, for example, a steering angle sensor 102, an angular velocity sensor 103, and a GPS 104.

The steering angle sensor 102 detects the steering angle of the vehicle 100, and outputs to a data storage area 105 a signal indicating the detected steering angle. The angular velocity sensor 103 detects a steering angular velocity, and outputs to the data storage area 105 a signal indicating the detected steering angular velocity.

In the first embodiment, the amount of change in steering of the vehicle 100, that is, in an operation element such as the steering wheel is detected by the steering angle sensor 102 and angular velocity sensor 103. The amount of change in an operation element refers to the amount to which the operation element is changed by its operation in operating the vehicle.

The GPS 104 receives a GPS satellite signal for detecting the absolute position of the vehicle 100, and detects the longitude and latitude of the vehicle 100 based on the received GPS satellite signal. The GPS 104 outputs latitude-longitude data indicating the detected latitude and longitude of the vehicle 100, as position information, to the data storage area 105.

Signals input from the steering angle sensor 102, the angular velocity sensor 103, and the GPS 104 are stored in the data storage area 105 as needed. Thus, the data indicating the steering angle, the steering torque, and the latitude and longitude, which changes according to operations performed by the driver, is stored in the data storage area 105 in time series.

The results of detection by the steering angle sensor 102, the angular velocity sensor 103, and the GPS 104 are collected via a vehicle network, to/from which data is transmitted/received, at intervals defined based on communication regulations, and are stored in the data storage area 105. That is, in the present embodiment, the interval prescribed based on the communication regulations is prescribed as a collection unit for data indicating changes or the like in operation elements of vehicle 100.

For example, on condition that an accessory position of the vehicle 100 is switched from OFF to ON, the communication section 101 transmits data stored in the data storage area 105, to the center 200.

Similarly, also from vehicles 110, 120 and the like, different from the vehicle 100, data indicating changes or the like in operation elements, stored in each vehicle 110, 120, are transmitted to the center 200.

Upon receiving data transmitted from each vehicle 100, 110, 120, the communication section 201 included in the center 200 outputs the received data to the data storage area 202 of the center 200.

Data transmitted from vehicles of two or more types, such as the vehicles 100, 110, and 120, is stored in the data storage area 202 as needed. In the data storage area 202, data respectively indicating steering angle, steering angular velocity, and latitude and longitude is stored so as to be associated with each vehicle as the unit from which the data has been acquired.

The center 200 has a filtering section 210 that selects, from among the data stored in the data storage area 202, data not subjected to poor visibility estimation and excludes the selected data. Additionally, the center 200 includes: a change amount calculating section 220 that calculates the amount of change in the operation element of the vehicle based on the data stored in the data storage area 202, and a visibility estimating section 230 that estimates poor visibility based on the calculated amount of change. Furthermore, the center 200 has a delivery section 250 that delivers information about a poor visibility point storage area 240, in which data indicating the result of estimation is stored, and about the result of the estimation. The poor visibility point storage area 240, the delivery section 250, and an authentication data generating section 210 can be provided in a predetermined apparatus other than the center 200.

The filtering section 210 according to the present embodiment has unsteady-state determining section 211 that determines whether the vehicle is unsteady based on the number of times that inversion of the steering angle has been carried out between the right and left sides. The unsteady-state determining section 211 retrieves data stored in the data storage area 202, and selects data indicating that the number of times that inversion of the steering angle has been carried out between the right and left sides is smaller than a predetermined number, from among the retrieved data based on steering angle data. Also, the unsteady-state determining section 211 discards the selected steering angle data. Additionally, the unsteady-state determining section 211 discards steering angular velocity data and latitude-longitude data both of which are associated with the selected steering angle data. Thus, the data group indicating that the number of times that the steering angle has been inverted between the right and left sides is smaller than the predetermined number is excluded from the data subjected to change amount calculation by a change amount calculating section 220 and from the data subjected to poor visibility estimation by the visibility estimating section 230.

The unsteady-state determining section 211 outputs to the change amount calculating section 220 the unselected data, that is, steering angular velocity data and latitude-longitude data, both of which are associated with the steering angle data, which has not been excluded.

Upon receiving input of pieces of data, the change amount calculating section 220 performs the process of calculating the amount of change in the operation element indicated by the steering angular velocity data.

The change amount calculating section 220 according to the present embodiment has a data classifying section 221 that classifies data based on predetermined rules in order to calculate the amount of change in the operation element. Also, the change amount calculating section 220 according to the present embodiment has a counting section 222 that performs, as the process of calculating the amount of change, the process of counting the number of changes in the operation element indicated by the data.

The data classifying section 221 classifies the steering angular velocity data acquired per data collection unit into data grouped in units of a predetermined traveling distance of the vehicle from which the data has been collected. The data classifying section 221 carries out such classification while shifting, as required, the data for every data collection unit. The traveling distance is calculated based on changes in the latitude-longitude data associated with the steering angular velocity data.

The counting section 222 analyzes each piece of the data acquired by classifying the data by the data classifying section 221, each piece of data using the predetermined traveling distance as a unit. Thereby, the counting section 222 counts the number of times that and the time for which the amount of change is equal to or greater than a reference change amount, which is used as a reference for determining whether the visibility is poor. The counting section 222 according to the present embodiment counts, for example, the number of times that the steering angular velocity is, for example, about 6 [deg/sec] or higher detected by the angular velocity sensor 103 continues for about 2 seconds or more. Then, the counting section 222 outputs the count result to the visibility estimating section 230.

Upon input of the count result, the visibility estimating section 230 estimates that the data corresponding to a predetermined traveling distance at which the number of times that a value of about 6 [deg/sec] or higher continues for about 2 seconds or more has reached a prescribed number has been acquired at the point where the visibility was poor. When the visibility is poor, the driver's view decreases. Therefore, the speed with which, or the number of times that, the steering direction is reversed tends to increase. As a result of this, the change in the steering angular velocity, which indicates the amount of operation of the steering wheel during the time of poor visibility covers a change of about 6 [deg/sec] or higher that continues for about 2 seconds or more. Therefore, in the present embodiment, poor visibility is estimated based on whether a change in the steering angular velocity includes a steering angular velocity of about 6 [deg/sec] or higher that continues for about 2 seconds or more.

Additionally, the visibility estimating section 230 identifies an estimated-data acquisition point based on corresponding latitude-longitude data. Thus, the visibility estimating section 230 identifies a point or area where poor visibility has been estimated. The visibility estimating section 230 outputs to a poor visibility point storage area 240 the estimation result and the latitude-longitude data indicating the point or area where the poor visibility has been estimated. Thus, the data acquired by the visibility estimating section 230 at the point where the visibility is poor and the data estimated by it is stored in the poor visibility point storage area 240.

The visibility estimating section 230 according to the present embodiment estimates, as weather conditions that may cause poor visibility, the presence or absence of fog, snowstorm, whiteout, and an amount of rainfall not smaller than a prescribed amount. In the present embodiment, poor visibility refers to a situation in which weather conditions affect vehicle operations because the visibility has decreased in a range from tens to hundreds of meters. That is, when fog, snowstorm, whiteout, an amount of rainfall not smaller than a prescribed amount or the like occurs, the visibility decreases, causing a change in the driver's vehicle operation. In the present embodiment, poor visibility is estimated based on such changes.

Upon receiving a request for visibility information from, for example, a vehicle 130 with a navigation system 132 mounted thereon via the communication section 131 of the vehicle 130, the delivery section 250 of the center 200 delivers information about a requested point or area to the vehicle 130. For example, if it is determined, based on the estimation result stored in the poor visibility point storage area 240, that the visibility in the requested point or area is not poor, the delivery section 250 delivers to the vehicle 130 information indicating that the visibility in the requested point or area is favorable.

The delivery section 250 also delivers visibility information to, for example, a multifunctional phone 300 composed of a smart phone or the like, a road traffic information center 400, which provides a variety of road traffic information, and a weather company server 500 provided by a weather company or the like.

For example, when the latitude-longitude data of the vehicle 130 is transmitted from the vehicle 130, the delivery section 250 according to the present embodiment delivers to the vehicle 130 information about the visibility at the point indicated by the latitude-longitude data, and information about the visibility in a predetermined range including this point. Additionally, when information indicating a destination or a recommended route to the destination, set in the navigation system 132, is transmitted from the vehicle 130, the delivery section 250 delivers to the vehicle 130 information about the visibility around the destination or recommended route.

For example, when the latitude-longitude data of the multifunctional phone 300 is transmitted from the multifunctional phone 300, the delivery section 250 according to the present embodiment delivers to the multifunctional phone 300 information about the visibility at the point indicated by the latitude-longitude data, and information about the visibility in a predetermined range including this point. Additionally, when information indicating a destination or a recommended route to the destination set in the navigation function of the multifunctional phone 300 is transmitted from the multifunctional phone 300, the delivery section 250 delivers information about the visibility around the destination or recommended route to the multifunctional phone 300.

Next, the mode of data selection by the filtering section 210 according to the present embodiment will be described referring to FIG. 2. The changes shown in FIGS. 2A and 2B are changes in the steering angle of a vehicle that has traveled a predetermined distance on a straight road.

Figure 2A:
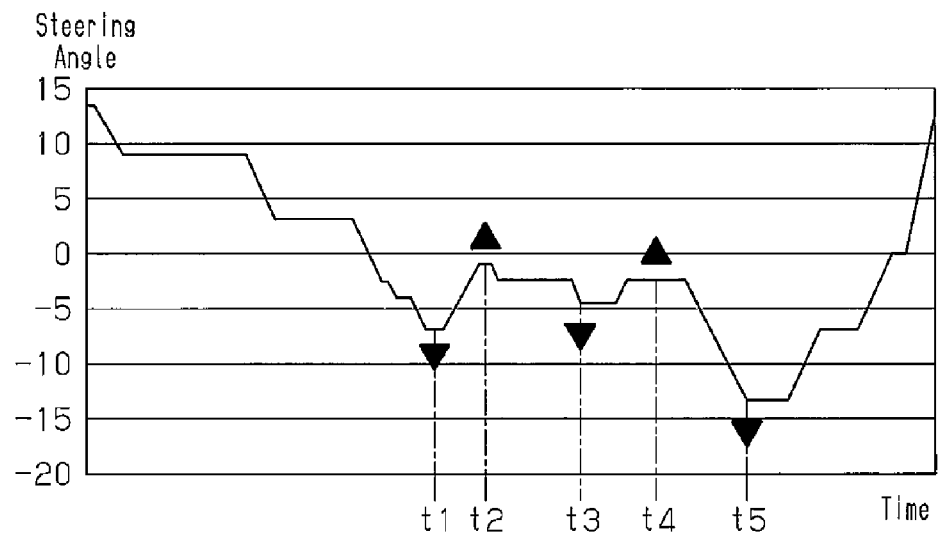
FIG. 2A is a graph showing changes in the steering angle when the visibility is favorable (when the weather is fine).

As shown FIG. 2A, when the visibility is favorable, that is, when the weather is fine, the steering angle changes such that the steering angle is inverted at a point in time t1 as a result of switching from, for example, leftward steering to rightward steering. Similarly, the steering angle is inverted at points in time t2, t3, t4, and t5. In the traveling road section shown in FIG. 2A, the steering direction is reversed five times in total.

Figure 2B:
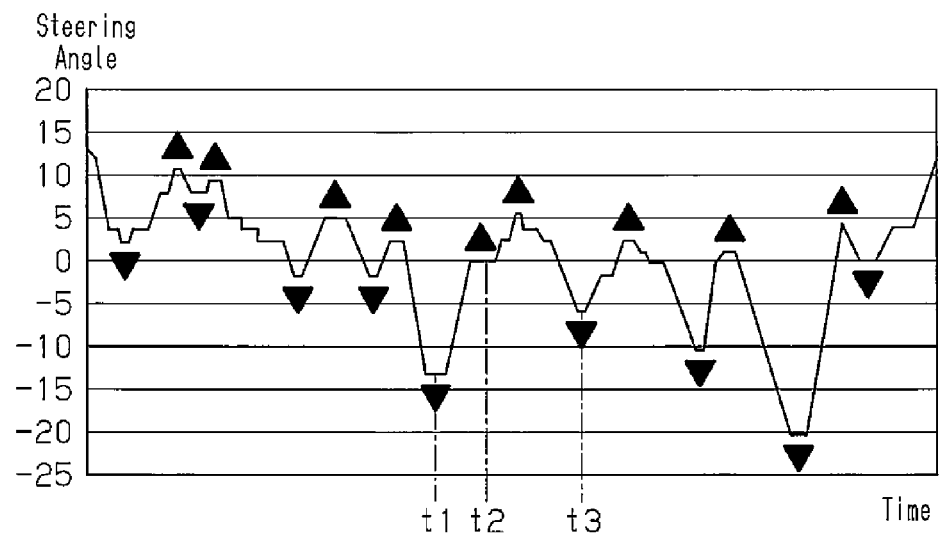
FIG. 2B is a graph showing changes in the steering angle when the visibility is poor.

In contrast, as shown in FIG. 2B, in changes in the steering angle when the visibility is poor, for example, when it is foggy, the number of times that the steering angle is reversed increases due to the influence of poor visibility. In the traveling road section shown in FIG. 2B, the steering direction is reversed, for example, 17 times in total.

In view of the forgoing tendencies, in the present embodiment, when the visibility is poor, the average of the number of times that steering angle is reversed in a traveling distance is calculated, the traveling distance being selected arbitrarily from a range, for example, from tens to hundreds of meters. The average thus calculated is used as a selection threshold value for selecting a data group including data acquired when the visibility is poor and a data group acquired when the visibility is favorable.

Upon retrieving a data group stored in the data storage area 202, the filtering section 210 according to the present embodiment determines whether, in the retrieved data group, the number of times that the steering angle is reversed in the predetermined traveling distance is equal to or larger than the selection threshold value. The filtering section 210 determines that the steering angle data group determined to be equal to or higher than the selection threshold value includes data acquired when the visibility is poor due to fog or the like. Then, the filtering section 210 outputs this data group to the change amount calculating section 220.

Meanwhile, the filtering section 210 determines that the data group determined to be lower than the selection threshold value includes no data acquired when the visibility is poor due to fog or the like. Then, the filtering section 210 discards this data group. Thus, the data group determined to include no data acquired when the visibility is poor is excluded in advance from data subjected to change amount calculation and data subjected to visibility estimation. Accordingly, the change amount calculating section 220 is able to calculate the amount of change in only the data group including data acquired when the visibility is poor. By virtue of this, in the present embodiment, the load of calculating the amount of change by the change amount calculating section 220 is decreased.

Next, the mode of data classification by the data classifying section 221 according to the present embodiment will be described referring to FIG. 3.

Figure 3:
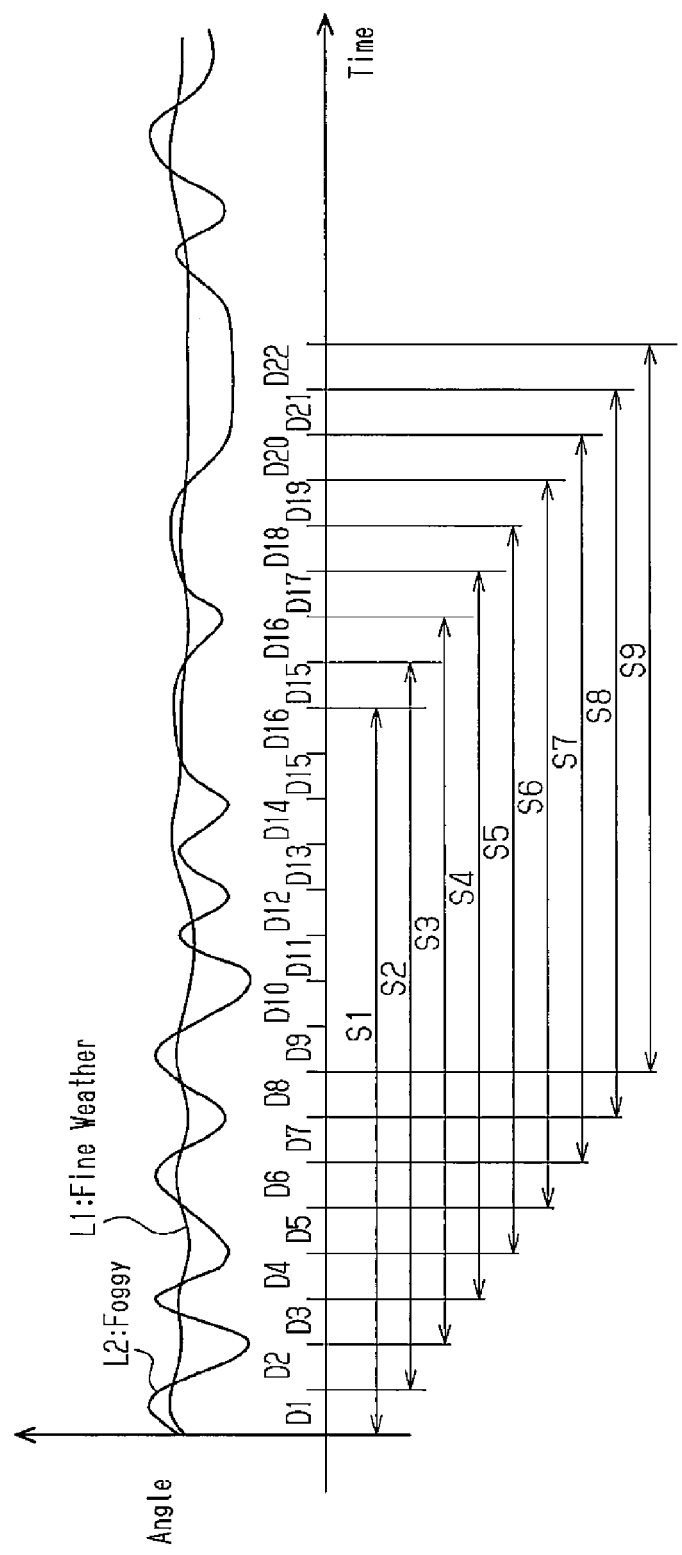
FIG. 3 is a diagram showing the mode of data classification.

As shown in FIG. 3, steering angular velocity data L1 acquired when the visibility is favorable, and steering angular velocity data L2 acquired when the visibility is poor due to fog or the like are time series data that use, for example, the smallest data collection unit.

Upon receiving input of steering angular velocity data L1, L2 and latitude-longitude data acquired from a certain vehicle, the data classifying section 221 according to the present embodiment classifies the steering angular velocity data L1, L2 into data that uses the smallest data collection unit, based on, for example, the latitude-longitude data. Then, the data classifying section 221 integrates the data resulting from the classification as a data that uses a predetermined traveling distance as a unit. The predetermined traveling distance is prescribed within a range of, for example, from tens to hundreds of meters.

Thus, as shown in FIG. 3, the steering angular velocity data L1, L2 is classified into data D1 to D22 and the like, each of which is the smallest data collection unit. Data groups D1 to D16, which are a series of the smallest data collection units, are integrated as a data S1 that uses the predetermined traveling distance as a unit. The boundary between any adjacent two of the data D1 to D22 and the like is a position where a data collection road section switches from one to another.

Next, the data D2 following the data D1 used as the starting point of the data S1, is used as the starting point of the integration range of data. Then, a series of data groups D2 to D17, shifted by the data collection unit, is used as a data S2 that uses the predetermined traveling distance as a unit. Thus, a plurality of series of data groups D1 to D22 and the like, which are shifted as required by the data collection unit and are integrated using the predetermined traveling distance as a unit, are used as data S1 to S9. The data classifying section 221 outputs to the counting section 222 the data thus classified and integrated.

Next, the poor visibility estimation mode will be described with reference to FIG. 4. The changes shown in FIGS. 4A and 4B are changes in the steering angular velocity of a vehicle that has traveled a predetermined distance on a straight road.

Figure 4A:
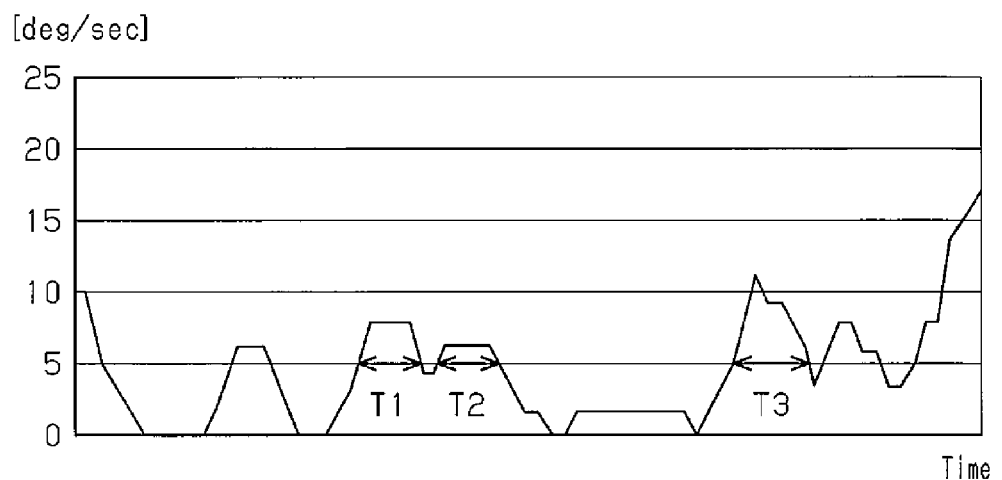
FIG. 4A is a graph showing changes in the steering angular velocity when the visibility is favorable (when the weather is fine).

As shown in FIG. 4A, in the steering angular velocity change when the visibility is favorable, that is, when the weather is fine, most of the steering angular velocities are lower than about 6 [deg/sec].

In the top three periods T1, T2, and T3 in which the steering angular velocity is about 6 [deg/sec] or higher, the times for which a steering angular velocity of about 6 [deg/sec] or higher continues are about 1.0 second (period T1), about 1.0 second (period T2), and about 1.2 seconds (period T3), respectively. That is, when the visibility is favorable, the length of time of about 6 [deg/sec] or higher continues is about 1 sec.

Figure 4B:
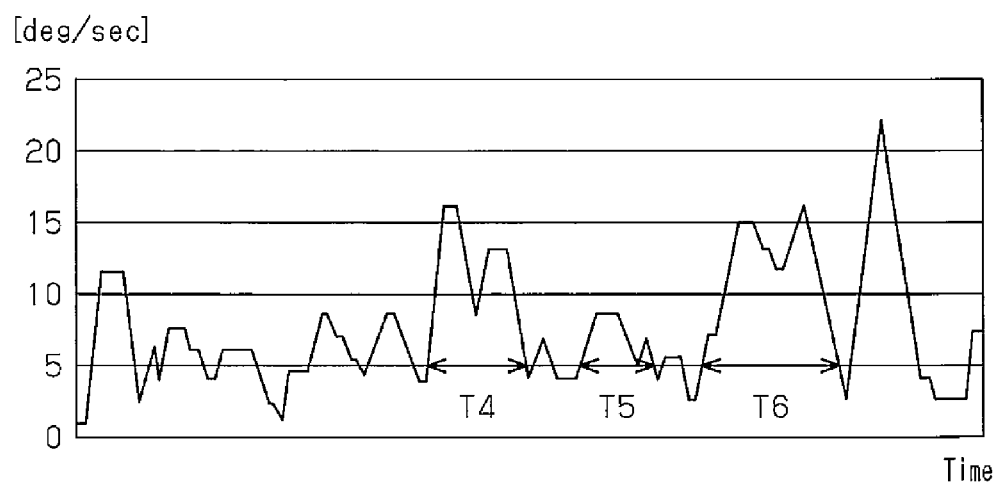
FIG. 4B is a graph showing changes in the steering angular velocity when the visibility is poor.

In contrast, as shown in FIG. 4B, steering angular velocity change when the visibility is poor due to fog or the like is greater on average in the steering angular velocity than that when the visibility is favorable.

In the top three periods T4, T5, and T6 in which the steering angular velocity is about 6 [deg/sec] or higher, the times for which a steering angular velocity of about 6 [deg/sec] or higher continues are about 2.6 seconds (period T4), about 2.0 seconds (period T5), and about 3.6 seconds (period T6), respectively. That is, when the visibility is poor, there are periods of about 2 seconds or more for which a steering angular velocity of about 6 [deg/sec] or higher continues. The number of times that the steering angular velocity is about 6 [deg/sec] or higher when the visibility is poor is larger than that when the visibility is favorable.

Therefore, for each piece of data obtained by the classification by the data classifying section 221 and using the predetermined traveling distance as a unit, the counting section 222 according to the present embodiment counts the number of times that the time for which a steering angular velocity of about 6 [deg/sec] or higher continues about 2 seconds or more.

For example, if the number of times counted is one or more, the counting section 222 estimates that it is foggy or the like at the point where the steering angular velocity data subjected to the counting has been acquired or in a predetermined range of area including this point and, therefore, where the visibility is poor.

Thus, the counting section 222 analyzes each piece of data acquired by classifying the data by the data classifying section 221, each piece of data using the predetermined traveling distance as a unit. Thereby, the counting section 222 counts the number of times that, and the time for which, the amount of change is equal to or greater than a reference change amount, which is used as a reference for determining whether the visibility is poor. The counting section 222 according to the present embodiment counts, for example, the number of times that a steering angular velocity of, for example, about 6 [deg/sec] or higher, detected by the angular velocity sensor 103, continues for about 2 seconds or more.

For example, if the number of times counted is one or more, the counting section 222 estimates that it is foggy or the like at the point where the steering angular velocity data subjected to the counting has been acquired or in a predetermined range of area including this point and, therefore, where the visibility is poor. The point at which the steering angular velocity data has been acquired is specified based on the latitude-longitude data associated with the steering angular velocity data.

Figure 5:
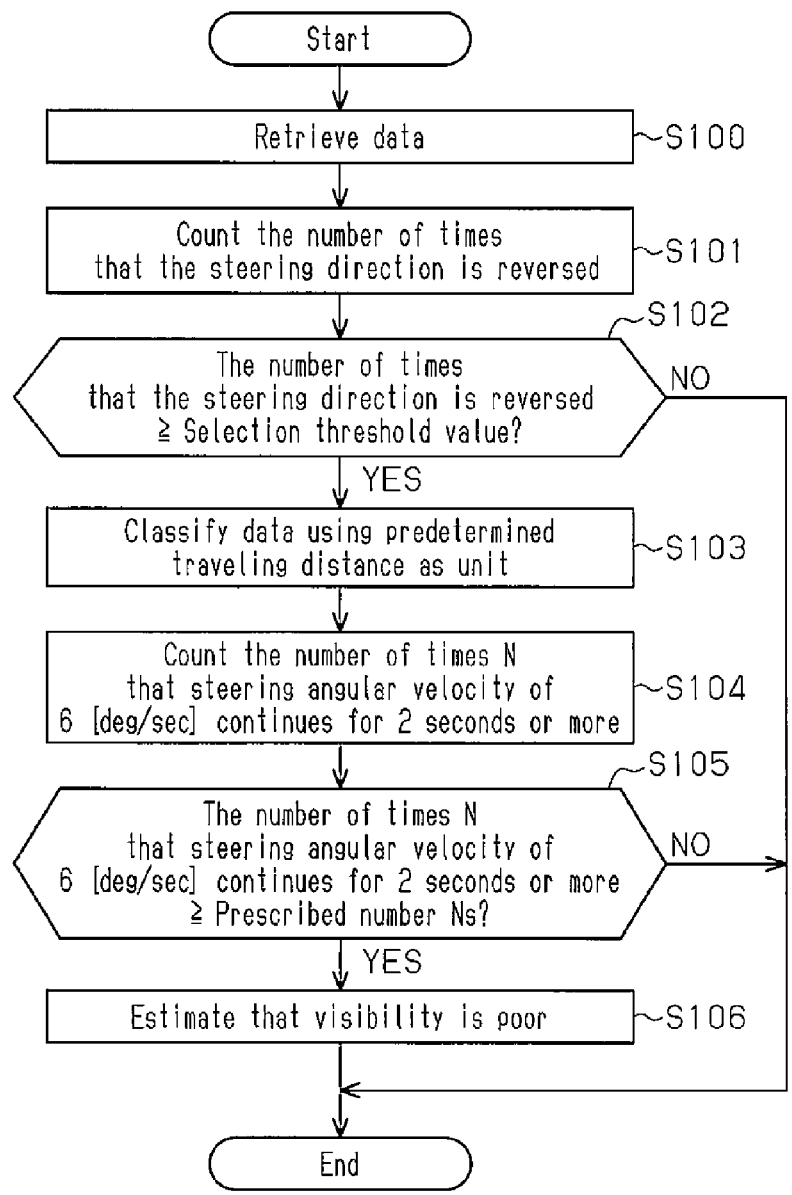
FIG. 5 is a flowchart of an example of a visibility estimation process using the poor visibility estimation system and the poor visibility estimation method according to the first embodiment.

Referring to FIG. 5, next will be described a visibility estimation procedure using the poor visibility estimation system and the poor visibility estimation method according to the present embodiment.

As shown in FIG. 5, when data stored in the data storage area 202 is retrieved (step S100), the number of times that the steering direction is reversed in a predetermined traveling distance prescribed to be, for example, from tens to hundreds of meters is counted based on the steering angle data of the retrieved data (step S101).

Then, it is determined whether the number of times that the steering direction is reversed is equal to or larger than a selection threshold value (step S102). If it is determined that the number of times that the steering direction is reversed is equal to or larger than the selection threshold value, then steering angular velocity data and latitude-longitude data associated with the steering angle data subjected to the determination are selected as data not to be excluded (step S102: YES).

Then, the steering angular velocity data thus selected is classified into data for every predetermined traveling distance unit and integrated, as in the mode exemplified in FIG. 3 (step S103). Such classification is carried out in the mode of shifting, as required, the data for every data collection unit.

Next, the number of times N that a steering angular velocity of 6 [deg/sec] or higher continues for 2 seconds or more is counted based on the steering angular velocity data that is calculated as required for each predetermined traveling distance unit (step S104). In the present embodiment, step S104 corresponds to a calculation step for the amount of change.

Then, it is determined whether the counted number of times N is equal to or larger than a prescribed number Ns, which is prescribed as a reference change amount in order to determine whether the visibility is favorable (step S105).

Then, if it is determined that the number of times N is equal to or larger than the prescribed number Ns, (step S105: YES), the point at which the steering angular velocity data has been acquired or a predetermined range of area including this point is identified based on the latitude-longitude data associated with the steering angular velocity data subjected to the determination. Then, the visibility is estimated to be poor at the identified point or area (step S106). In the present embodiment, steps S105, S106 correspond to an estimation step.

In contrast, in step S102, if it is determined that the number of times that the steering direction is reversed is smaller than the selection threshold value (step S102: NO), the steering angular velocity data and latitude-longitude data associated with the steering angle data subjected to the determination are selected as data to be excluded. Then, each of the data determined to be excluded is discarded.

If it is determined in step S105 that the number of times is smaller than the prescribed number Ns (step S105: NO), it is determined that the visibility is not poor, i.e., the visibility is favorable at the point where the steering angular velocity data used for the determination has been acquired.

Next, the mode of usage of information delivered from the center 200 will be described with reference to FIGS. 6 to 9.

Upon searching a route from the current position Ps of the vehicle 130 to its destination Pg, the navigation system 132 first determines based on information delivered from the delivery section 250 of the center 200 whether any poor visibility spots or areas are present in the route searched for.

Figure 6:
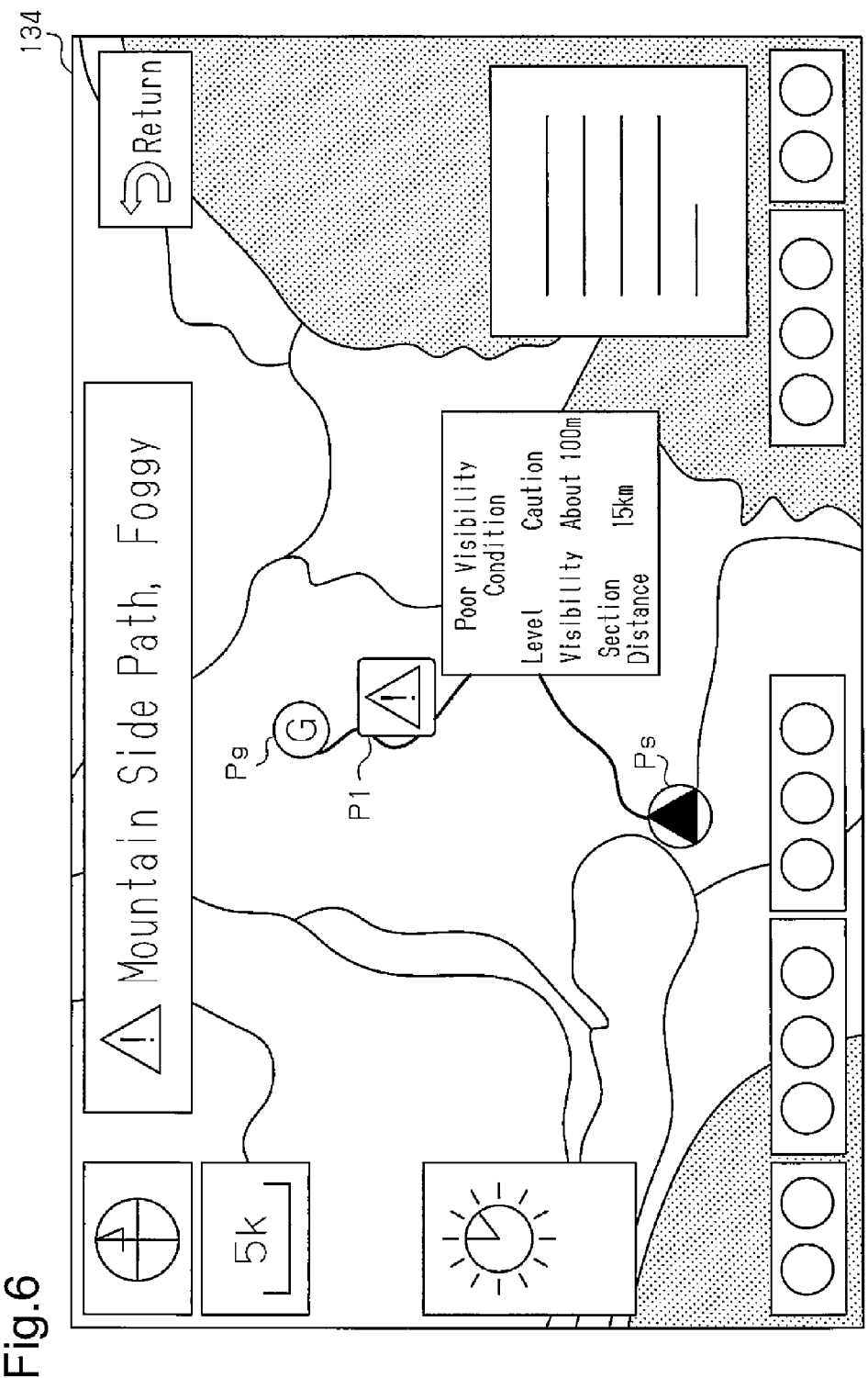
FIG. 6 is a diagram showing the result of poor visibility estimation, thus showing a guide view for a poor visibility point located on a recommended route from the current position of the vehicle to its destination.

Then, as shown in FIG. 6 as an example, when it is determined that the point P1 where the visibility is poor is present in the route searched for, the navigation system 132 displays, on a route guide view 134, information such as "Visibility, about 100 m" or "Road section distance, 1.5 km," which indicates that the road section where a visibility of 100 m continues.

Figure 7:
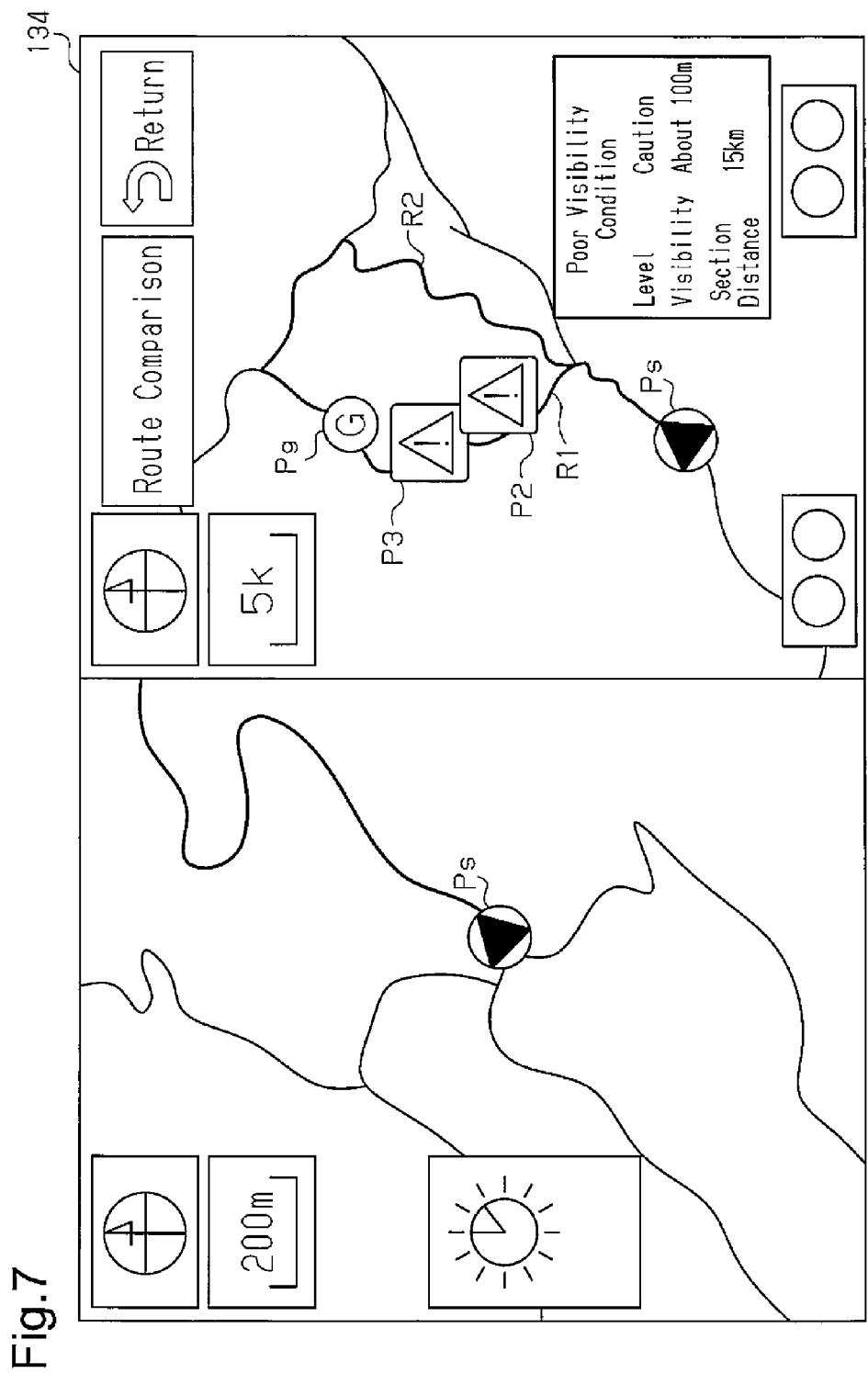
FIG. 7 is a diagram showing the result of poor visibility estimation, thus showing a guide view for a route avoiding a poor visibility point.

Additionally, as shown in FIG. 7, when it is determined that points P2, P3 where the visibility is poor are present in the route R1 searched for, making it difficult to travel, the navigation system 132 searches for a route R2 avoiding the points P2, P3. Then, the navigation system 132 provides guidance for the route R2 searched for.

Figure 8:
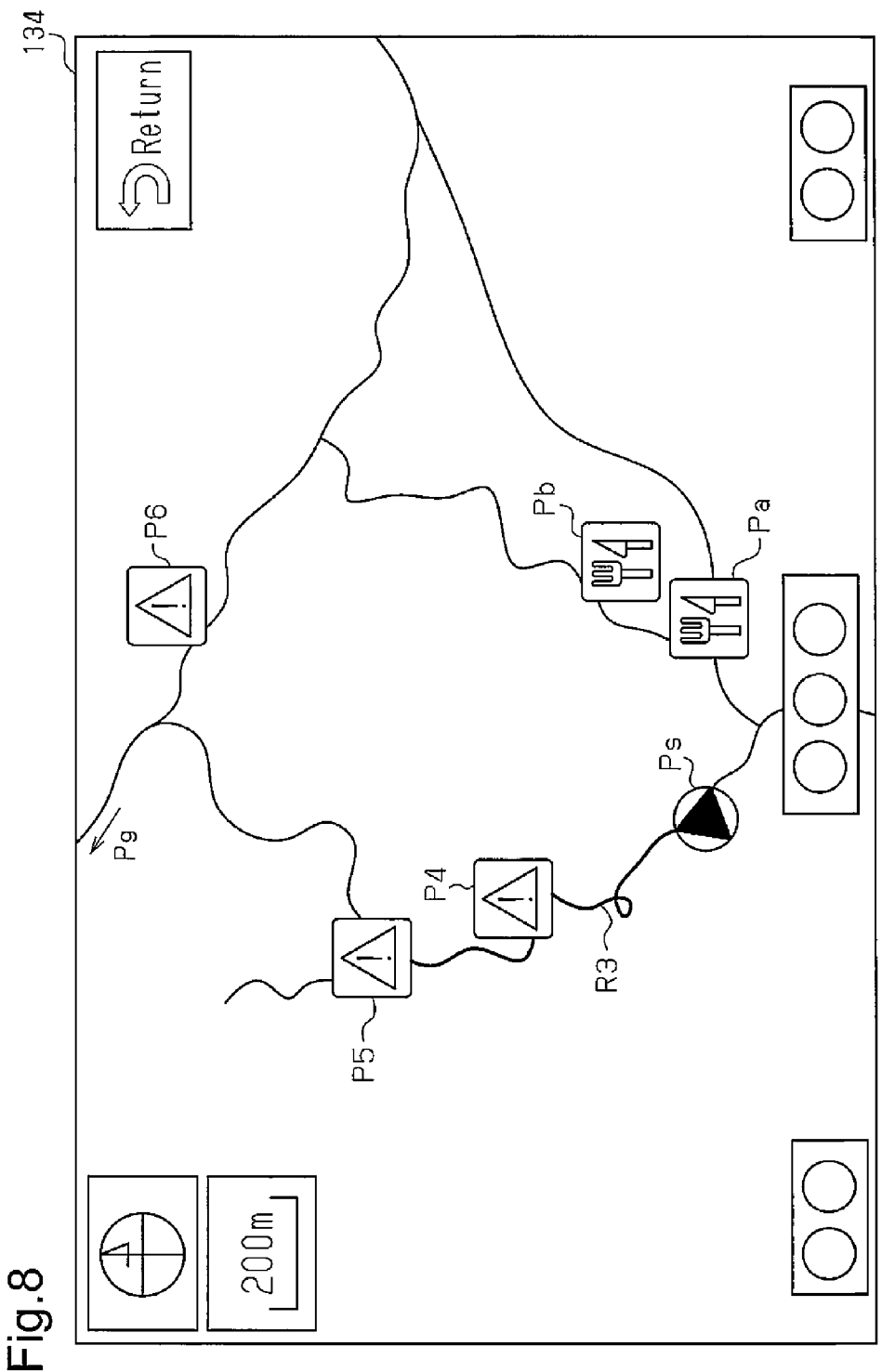
FIG. 8 is a diagram showing the result of poor visibility estimation, thus showing a guide view for points where the driver and passengers in the vehicle can wait or rest around the vehicle.

Meanwhile, as shown in FIG. 8, when points P4, P5, and P6 where the visibility is poor are present in the route R3 searched for and, moreover, these poor visibility points cannot be avoided by any other routes, the navigation system provides guidance for points Pa, Pb where the driver and passengers in the vehicle 130 can wait or rest, which are located around the current position Ps of the vehicle 130.

Figure 9:
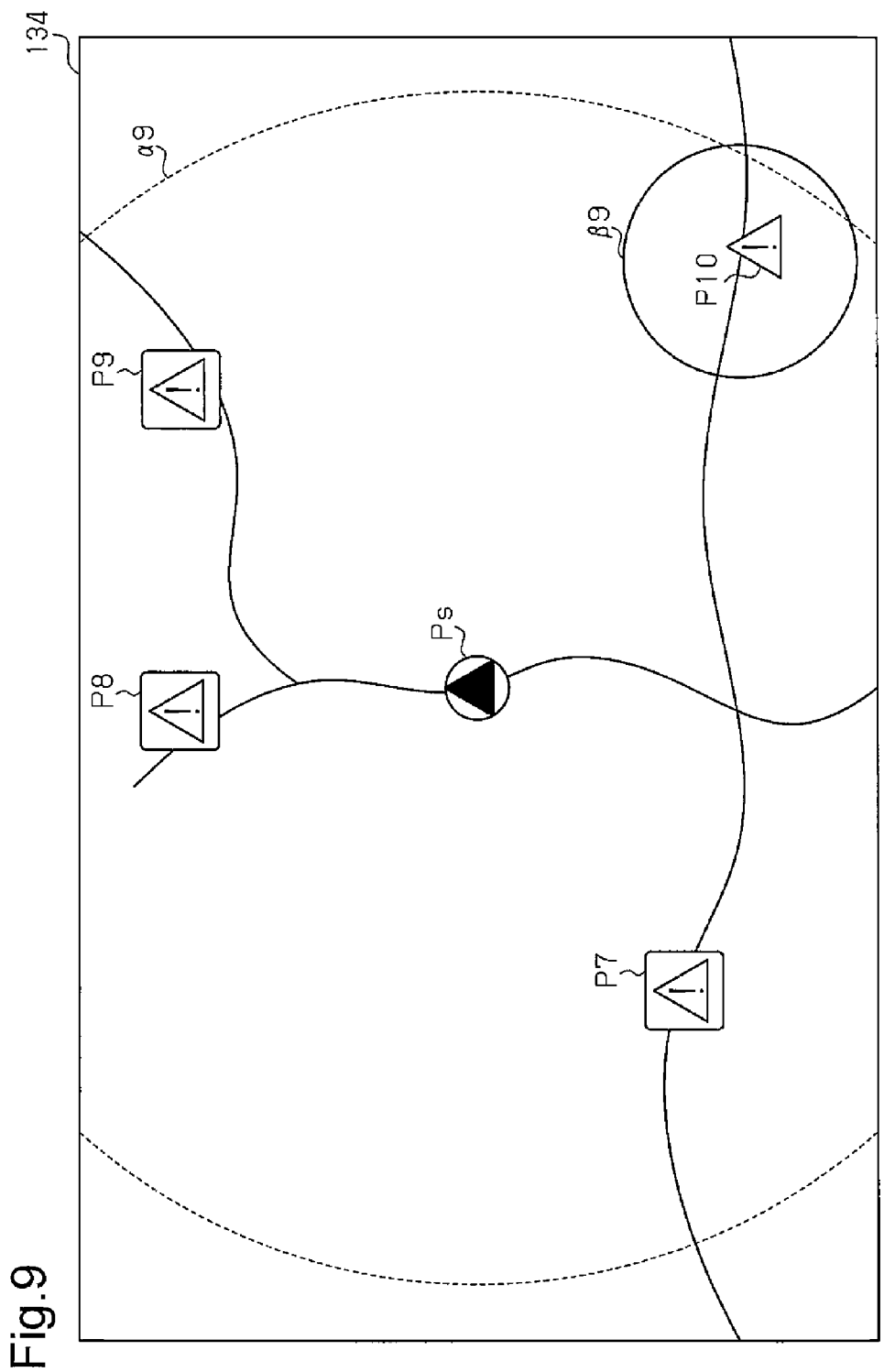
FIG. 9 is a diagram showing the result of poor visibility estimation, thus showing a guide view for poor visibility points and area located within a predetermined range around the vehicle.

Additionally, as shown in FIG. 9 as an example, even when a destination has not been set and if points P7, P8, and P9 where the visibility is poor are present within a predetermined area α9 around the current position Ps of the vehicle 130, information that the visibility is poor at each point P7, P8, P9 will be given. Additionally, for example, if the visibility is estimated to be poor in a predetermined area β9 around the point P10, information that the visibility in the predetermined area β9 is poor will be given.

As described above, the poor visibility estimation system and the poor visibility estimation method of the present embodiment achieves the following advantages.

(1) The change amount calculating section 220 calculates changes in operation elements of the vehicles, 100, 110, 120, and the like. Based on the amount of change calculated by this change amount calculating section 220, the visibility estimating section 230 estimates poor visibility. Accordingly, it is possible for the visibility estimating section 230 to estimate poor visibility based on the amounts of change in operation elements detectable by the existing steering angle sensor 102, the angular velocity sensor 103, and the like, provided in one or more vehicles 100 and the like. Thus, poor visibility can be estimated without providing the vehicle 100 and the like with a sensor and system for observing weather that is a factor in poor visibility. Accordingly, it is possible to estimate poor visibility by a simpler configuration.

(2) If the amount of change in the operation element calculated by the change amount calculating section 220 is equal to or higher than a reference change amount, which is used as a reference for determining whether the visibility is poor, the visibility estimating section 230 determines that the visibility is poor at the traveling point or traveling area of each vehicle 100, 110, 120 for which the amount of change has been calculated. Based on a comparison between the reference change amount and the calculated amount of change, the visibility estimating section 230 is able to determine whether the visibility is favorable. Accordingly, poor visibility is estimated using the simpler process.

(3) The poor visibility estimating section 230 estimates that the visibility is poor if the number of times that the time for which the amount of change equal to or greater than the reference change amount continues is equal to or longer than a prescribed time is equal to or larger than the prescribed number. Accordingly, poor visibility is estimated based on stricter conditions. Accordingly, the reliability of the result of poor visibility estimation is further improved.

(4) Each time a collection road section of data indicating an amount of change in the operation element is switched, the change amount calculating section 220 performs the process of calculating the amounts of change as required, the collection road section using as a unit a predetermined traveling distance of each vehicle 110, 120, 130. While a predetermined traveling distance is used as a calculation unit for the amount of change, a change in the operation element caused in data collection unit is also accurately exhibited. Thus, poor visibility and the point where the visibility is poor are estimated with higher accuracy.

(5) As the amount of change in the operation element, the amount of change in the steering angular velocity is used. When the amount of steering operation changes due to poor visibility, this change is accurately detected. Estimating poor visibility based on the amount of change in the steering angular velocity, in which such a change is reflected, improves the estimation accuracy.

(6) The filtering section 210 selects, from among the data stored in the data storage area 202, data not subjected to estimation, and excludes the selected data. Therefore, for calculation of the amount of change, the change amount calculating section 220 needs only the data that has not been excluded by the filtering section 210. Additionally, the visibility estimating section 230 needs to estimate poor visibility only based on change amounts based on data that has not been excluded by the filtering section 210. In this way, processing loads on the change amount calculating section 220 and the visibility estimating section 230 are reduced, thus smoothing the calculation of the amount of change in the operation element and the estimation of poor visibility.

(7) The filtering section 210 has unsteady-state determining section 211 that determines whether the vehicle is unsteady, based on the number of times that the steering angle is inverted. The filtering section 210 selects, as excluded data, data indicating that the number of times that the steering angle is inverted is smaller than a predetermined number. Therefore, the change amount calculating section 220 and the visibility estimating section 230 need only to process data highly likely to have been acquired when the visibility was poor. Thus, while processing loads on the change amount calculating section 220 and the visibility estimating section 230 are reduced, data subjected to estimation are accurately narrowed. Additionally, based on steering angle change data and the like, the unsteady-state determining section 211 is easily able to count the number of times that the steering angle is inverted. Accordingly, it is easy for the filtering section 210 to select data to be excluded.

(8) The visibility estimating section 230 uses, as weather conditions that may cause poor visibility, the presence or absence of fog, snowstorm, whiteout, or an amount of rain not smaller than a prescribed amount. Thus, it is possible for the visibility estimating section 230 to estimate whether the visibility, which is influenced by fog, snowstorm, whiteout, or an amount of rain not smaller than a prescribed amount, is favorable.

(9) The change amount calculating section 220 and the visibility estimating section 230 are provided in the center 200 that collects probe information, which indicates the amount of changes in operation elements in each vehicle 110, 110, 120. The center 200 collects the probe information as well as position information, i.e., latitude-longitude data of each vehicle 110, 110, 120. Accordingly, it is possible for the center 200 to estimate poor visibility by using probe information acquired over a wide range and on a plurality of roads. Thus, the estimation range for poor visibility is expanded, making it possible to estimate poor visibility for more areas.

(10) The center 200 identifies a poor visibility point or area based on the result of estimation by the visibility estimating section 230 and latitude-longitude data. Additionally, the center 200 identifies: a vehicle present at an identified point; a vehicle the destination of which is the identified point; a vehicle, a recommended route to the destination of which includes the identified point; and a vehicle present in a predetermined range around the identified point. The center 200 delivers the result of estimation to the navigation system 132 used in each vehicle identified. Thus, the navigation systems 132 or the like are actively provided with the estimation result obtained by the center 200. Accordingly, if there are any poor visibility points at a destination or recommended route set in each navigation system 132, information indicating this is delivered to the navigation system 132. Thus, the user of the navigation system 132 is able to grasp in advance whether the visibility at the destination or on the recommended route is favorable. Also, by virtue of this, each navigation system 132 is able to set a destination or search for a route, taking into consideration the result of poor visibility estimation. Additionally, by virtue of this, it is possible to inform the user of each navigation system 132 that there is a poor visibility area around the vehicle 130.

(11) The center 200 identifies a poor visibility point or area based on the result of estimation by the visibility estimating section 230 and latitude-longitude data. Additionally, the center 200 identifies: a multifunctional phone 300 present at an identified point; a multifunctional phone 300 by which the identified point is set as a destination; a multifunctional phone 300 by which a recommended route including the identified point is set; and a multifunctional phone 300 present in a predetermined range around the identified point. The center 200 delivers the result of estimation to the identified multifunctional phones 300. Thus, the multifunctional phones 300 or the like are actively provided with the estimation result obtained by the center 200. Accordingly, if there are any poor visibility points at a destination or recommended route set in each multifunctional phone 300, information indicating this is delivered to the multifunctional phone 300. Thus, the user of the multifunctional phone 300 is able to grasp in advance whether the visibility at the destination or in the recommended route is favorable. Also, by virtue of this, each multifunctional phone 300 is able to set a destination or search for a route, taking into consideration the result of poor visibility estimation. Additionally, by virtue of this, it is possible to inform the user of each multifunctional phone 300 that there is a poor visibility area around the multifunctional phone 300.

(12) The delivery section 250 delivers the result of estimation to the multifunctional phones 300 as well as the road traffic information center 400 and weather company server 500. Thus, estimation results based on data acquired by the vehicles 100, 110, 120, and the like are widely used. Accordingly, the poor visibility estimation system and the poor visibility estimation method are generalized.

Second Embodiment

Next, a poor visibility estimation system and a poor visibility estimation method according to a second embodiment of the present invention will be described with reference to FIGS. 10 to 13, focusing on differences from the first embodiment. The poor visibility estimation system and the poor visibility estimation method according to the present embodiment are identical in basic configuration to the first embodiment. Also in FIGS. 10 to 13, elements substantially identical to those in the first embodiment are labeled with identical symbols, and redundant descriptions thereof will not be repeated.

Figure 10:
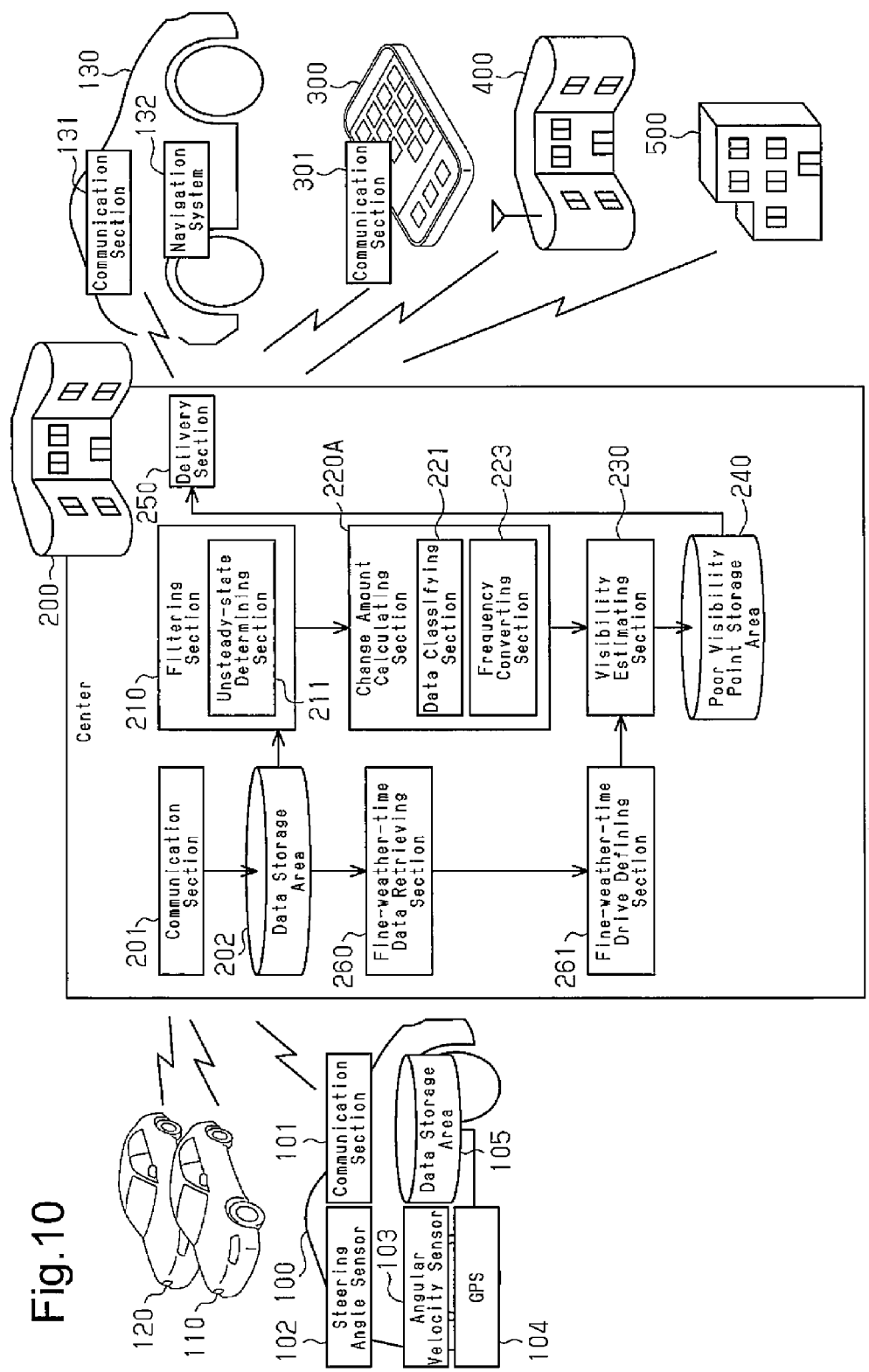
FIG. 10 is a block diagram schematically showing a center to which a poor visibility estimation system and a poor visibility estimation method according to a second embodiment of the present invention are applied, and showing communication with the center.

As shown in FIG. 10, a center 200 in the present embodiment has a fine-weather-time data retrieving section 260 that retrieves data acquired in fine weather from among the data stored in a data storage area 202. Also, the center 200 has a fine-weather-time drive defining section 261 by which the amount of change in the operation element, which is acquired based on a normal driving operation performed when the weather is fine, is defined based on fine-weather-time data retrieved by the fine-weather-time data retrieving section 260.

The fine-weather-time data retrieving section 260 acquires, via a communication section 201, weather information provided through, for example, an external internetwork. Weather information includes information indicating areas where the weather is fine and information indicating times and dates.

From among points indicated by latitude-longitude data stored in the data storage area 202, the fine-weather-time data retrieving section 260 identifies latitude-longitude data included in a fine weather area indicated by the weather information. Additionally, the fine-weather-time data retrieving section 260 identifies the latitude-longitude data acquired at the times and dates included in a period of fine weather. Then, the fine-weather-time data retrieving section 260 outputs to the fine-weather-time drive defining section 261 data indicating steering angles associated with the identified latitude-longitude data.

Upon receiving input of the steering angle data, the fine-weather-time drive defining section 261 subjects the data to frequency conversion by, for example, the Fourier transform. In view of the fact that the spectrum area difference between when the weather is fine and when the visibility is poor relatively increases in a frequency band from 0.5 to 1.0 Hz, the fine-weather-time drive defining section 261 selects data of the frequency band from 0.5 to 1.0 Hz. The fine-weather-time drive defining section 261 calculates the spectrum areas of the steering angle based on the selected data subjected to the frequency conversion. Subsequently, the fine-weather-time drive defining section 261 defines the average of the calculated spectrum areas, as the amount of change in the steering angle based on driving operations performed in fine weather. Then, the fine-weather-time drive defining section 261 outputs information indicating the defined average to the visibility estimating section 230.

The filtering section 210 according to the embodiment outputs to the change amount calculating section 220A steering angular velocity data and latitude-longitude data, both of which are associated with the steering angle data, which has not been excluded.

Instead of the counting section 222 described above, a change amount calculating section 220A according to the present embodiment has a frequency converting section 223 by which steering angle data input from a filtering section 210 is subjected to frequency conversion. As frequency conversion, the frequency converting section 223 carries out, for example, the Fourier transform.

A data classifying section 221 according to the present embodiment classifies the steering angle data for every predetermined traveling distance, for example, from tens to hundreds of meters.

Additionally, upon receiving the input of the steering angle data, which has not been excluded, the frequency converting section 223 subjects the data to the Fourier transform. Additionally, in view of the fact that the characteristics of a spectrum area when the visibility is poor are noticeable in the frequency band from 0.5 to 1.0 Hz, the visibility estimating section 230 selects data of the frequency band from 0.5 to 1.0 Hz. Then, the frequency converting section 223 calculates the spectrum area of the steering angle based on the selected data subjected to the frequency conversion. Next, the frequency converting section 223 outputs information indicating the spectrum area thus calculated, to the visibility estimating section 230.

Upon receiving input of the spectrum area from the frequency converting section 223, the visibility estimating section 230 compares this spectrum area with the average input from the fine-weather-time drive defining section 261. Then, if the spectrum area input from the frequency converting section 223 exceeds the average, the visibility estimating section 230 estimates that the steering angle data subjected to frequency conversion by the frequency converting section 223 is data acquired when the visibility was poor due to the occurrence of fog or the like. The visibility estimating section 230 outputs the latitude-longitude data associated with the estimated steering angle data to a poor visibility point storage area 240 as data indicating a poor visibility area.

Next, the mode of poor visibility estimation by the visibility estimating section 230 according to the present embodiment will be described with reference to FIG. 11.

Figure 11:
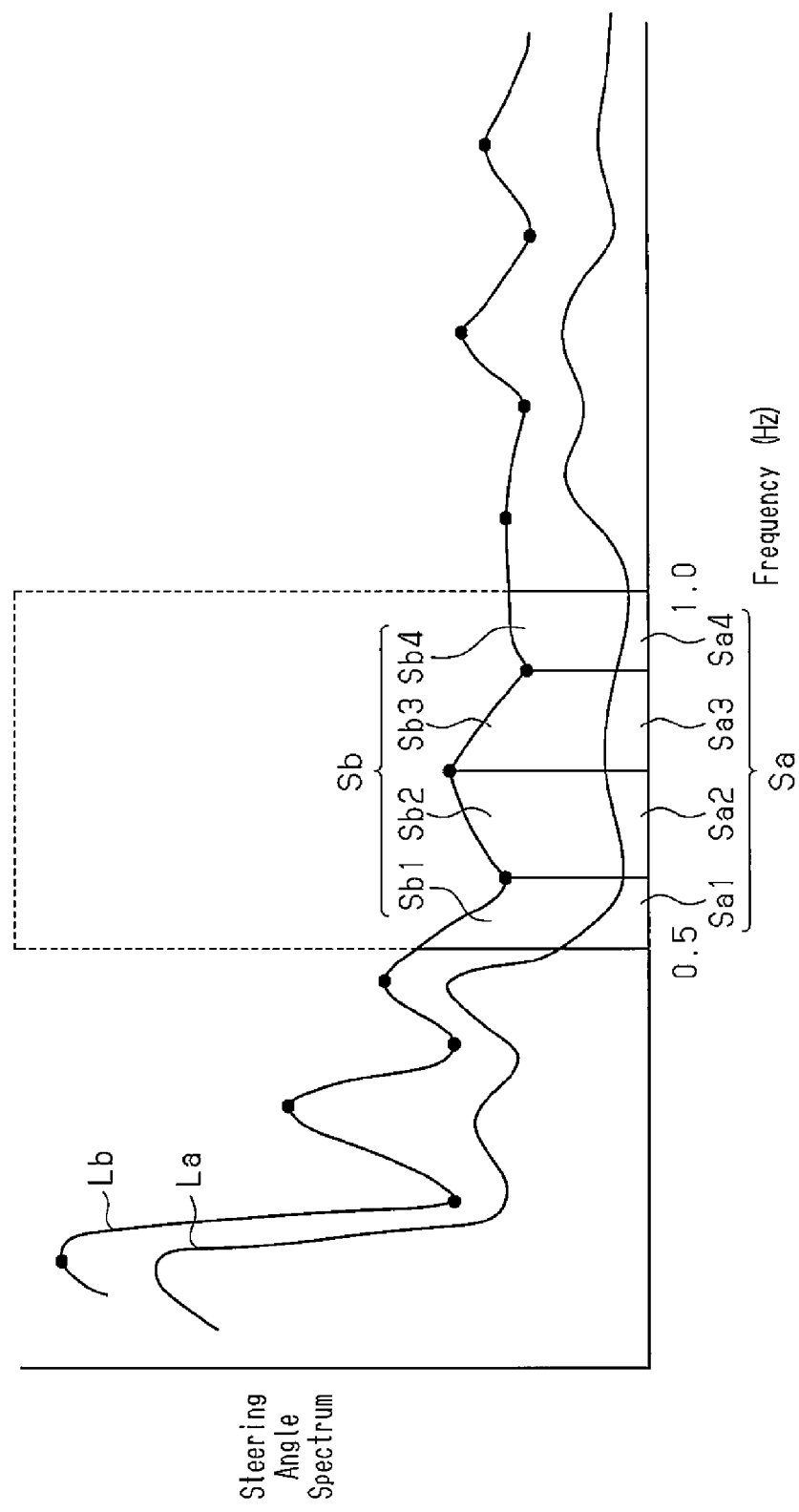
FIG. 11 is a graph showing change in steering angle data in a predetermined traveling distance acquired when the visibility is favorable and change in steering angle data in the predetermined traveling distance acquired when the visibility is poor.

As shown in FIG. 11, change in the steering angle data in a predetermined traveling distance acquired when the weather is fine, i.e., when the visibility is favorable, exhibits, for example, change La.

In contrast, change Lb in the steering angle data in the predetermined traveling distance acquired when the visibility is poor due to the occurrence of fog or the like, exhibits larger values than the change La in a frequency band. In the steering angle data change Lb when the visibility is poor, changes at corresponding frequencies are more noticeable than in the change La when the visibility is favorable.

Furthermore, the difference between the steering angle data change Lb when the visibility is poor and the steering angle data change La when the visibility is favorable is especially noticeable in a frequency band from 0.5 to 1.0 Hz. Therefore, in the present embodiment, poor visibility is estimated based on spectrum area of the frequency band from 0.5 to 1.0 Hz.

To estimate poor visibility, a spectrum area Sa in the frequency band from 0.5 to 1.0 Hz when the visibility is favorable is first calculated. The spectrum area Sa is calculated based on the total value of spectrum areas in areas Sa1, Sa2, Sa3, and Sa4 into which the frequency band from 0.5 to 1.0 Hz is sectioned by an extreme value. Then, the calculation of such a total value is carried out for two or more types of change exhibited when the visibility is favorable, and each of the calculated total values is averaged. In the present embodiment, each total value thus averaged is used as a reference change amount for poor visibility estimation.

Also, a spectrum area Sb in the frequency band from 0.5 to 1.0 Hz in the change Lb used for poor visibility estimation is calculated. The spectrum area Sb is calculated based on the total value of spectrum areas in areas Sb1, Sb2, Sb3, and Sb4 into which the frequency band from 0.5 to 1.0 Hz is sectioned by an extreme value.

In the present embodiment, if the spectrum area Sb, calculated based on the steering angle data subjected to the estimation, exceeds the spectrum area Sa in favorable weather prescribed as the reference change amount, then the visibility is estimated to be poor at the point where the steering angle data Lb subjected to the estimation has been acquired or in a predetermined range of area including this point.

Next, a fine-weather-time data definition process according to the present embodiment will be described with reference to FIG. 12.

Figure 12:
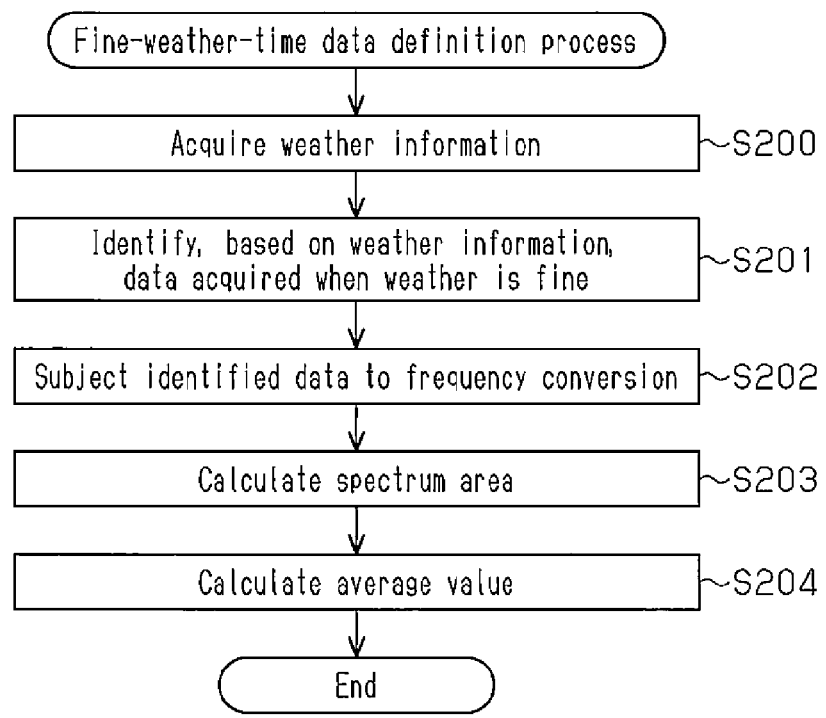
FIG. 12 is a flowchart of an example of a fine-weather-time data definition process according to the second embodiment.

As shown in FIG. 12, first, weather information for identifying an area where weather is fine and a period of time that the weather is fine are acquired (step S200). Then, a plurality of pieces of steering angle data and latitude-longitude data acquired when the weather was fine are identified from among the data stored in the data storage area 202 based on the acquired weather information (step S201).

Next, the pieces of the steering angle data thus identified are subjected to frequency conversion, and spectrum areas corresponding to the data subjected to the conversion are calculated (steps S202, S203). Then, the average of the spectrum areas based on the plurality of calculated steering angle data is calculated (step S204). When the average is thus calculated, this calculated average is defined as the amount of change in the steering angle based on the vehicle operation performed when the weather was fine.

Figure 13:
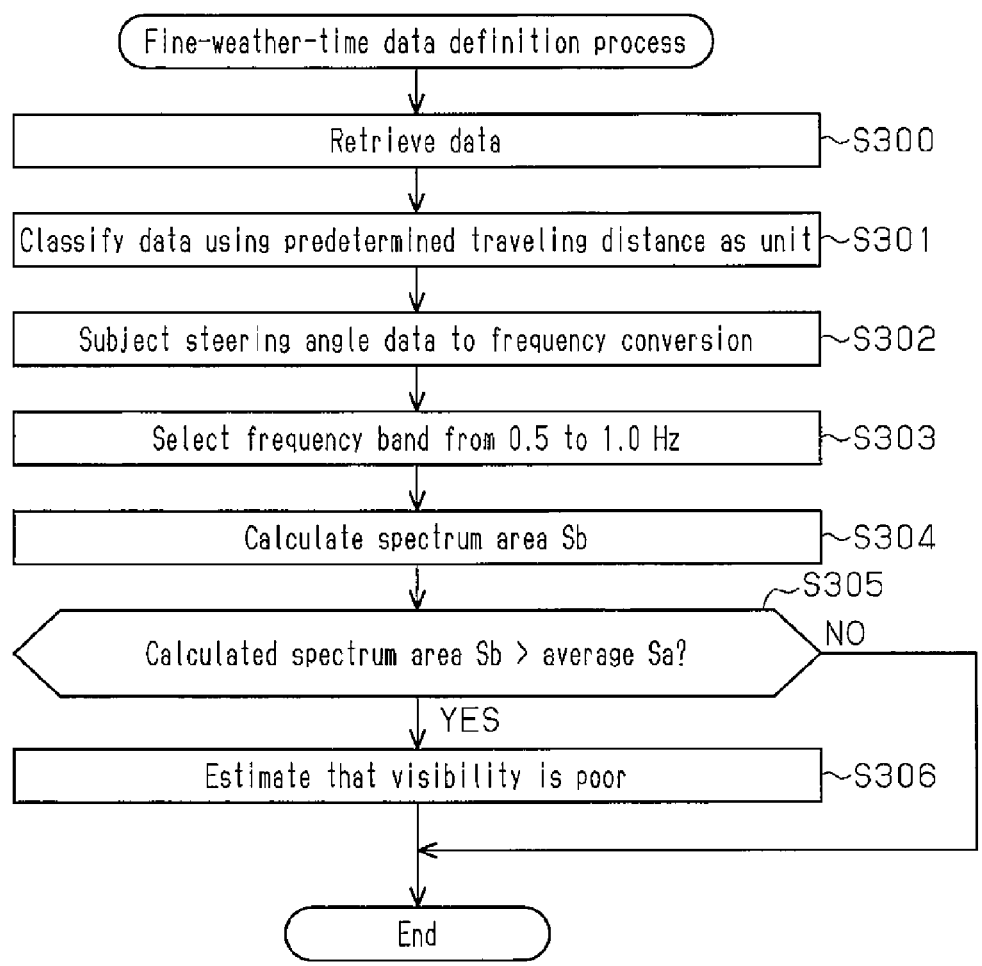
FIG. 13 is a flowchart of an example of a visibility estimation process using the poor visibility estimation system and the poor visibility estimation method according to the second embodiment.

Referring to FIG. 13, a poor visibility estimation system and a poor visibility estimation method according to the present embodiment will now be described.

As shown in FIG. 13, when data stored in the data storage area 202 is retrieved (step S300), data indicating steering angle among the retrieved data is classified for every prescribed traveling unit and integrated (step S301).

Then, the steering angle data resulting from the classification is subjected to frequency conversion by, for example, the Fourier transform (step S302). Then, the data of the frequency band from 0.5 to 1.0 Hz is selected from among the data subjected to the frequency conversion (step S303).

When the data is thus selected, spectrum area in the selected frequency band is calculated (step S304). Then, the calculated spectrum area Sb and the average Sa of the spectrum areas when the weather is fine are compared.

If the calculated spectrum area Sb exceeds the average Sa of the spectrum areas Sa when the weather is fine (step S305: YES), the amount of change in the steering angle is estimated to be equal to or larger than the reference change amount used for poor visibility. Next, the point at which the steering angle data subjected to the calculation of the spectrum area Sb is acquired or the predetermined range of area including this point is identified. Then, the visibility is estimated to be poor at the identified point or in the identified area (step S306).

In contrast, if it is determined in step S305 that the spectrum area Sb is equal to or smaller than the average Sa of the spectrum areas when the weather is fine (step S305: NO), it is determined that the visibility is not poor, i.e., the visibility is favorable at the point where the steering angular velocity data used for the determination has been acquired.

As described above, the poor visibility estimation system and the poor visibility estimation method of the present embodiment achieves the following advantages in place of the advantages (4) and (5), as well as the advantages (1) to (3) and (6) to (12).

(4A) The change amount calculating section 220 performs the process of calculating an amount of change in the operation element, using as a unit a predetermined traveling distance of each vehicle 110, 120, 130. Thus, a change in the operation element caused by poor visibility is accurately reflected in the calculated amount of change.

(5A) The change amount calculating section 220A includes the frequency converting section 223, which subjects data indicating the amount of change in the operation element to frequency conversion. If the data subjected to frequency conversion indicates that the amount of operation is equal to or greater than a prescribed amount of operation, the visibility estimating section 230 determines that the visibility is poor. Accordingly, even when a change in the operation element caused by poor visibility occurs in a specific frequency band, this change is accurately detected. Thus, estimation based on the amount of change in the operation element is performed with high accuracy.

(6A) The frequency converting section 223 subjects data indicating the amount of change in the operation element to frequency conversion by the Fourier transform. Thus, poor visibility is estimated with higher accuracy based on data subjected to frequency conversion.

(7A) Poor visibility is estimated based on spectrum area of the frequency band from 0.5 to 1.0 Hz among the data subjected to frequency conversion. Therefore, poor visibility is estimated based on the difference between data when the weather is fine and when the weather is bad. Thus, poor visibility is estimated with higher accuracy. Additionally, the data of the frequency band from 0.5-1.0 Hz composes only some of the data. Therefore, by estimating poor visibility based on comparisons between such some of the data, processing load on poor visibility estimation is remarkably reduced.

(8A) If a spectrum area indicating the amount of change in the operation element subjected to estimation exceeds the average of the spectrum areas when the weather is fine, the visibility estimating section 230 determines that the visibility is poor. Thus, poor visibility is determined based on a comparison with the characteristics of the amount of change in the operation element acquired when the weather is fine.

Third Embodiment

Next, referring to FIGS. 14 to 20, a poor visibility estimation system and a poor visibility estimation method according to a third embodiment of the present invention will be described, focusing on differences from the first embodiment. The poor visibility estimation system and the poor visibility estimation method according to the present embodiment are identical in basic configuration to the first embodiment. Also in FIGS. 14 to 20, elements substantially identical to those in the first embodiment are labeled with identical symbols, and redundant descriptions thereof will not be repeated.

Figure 14:
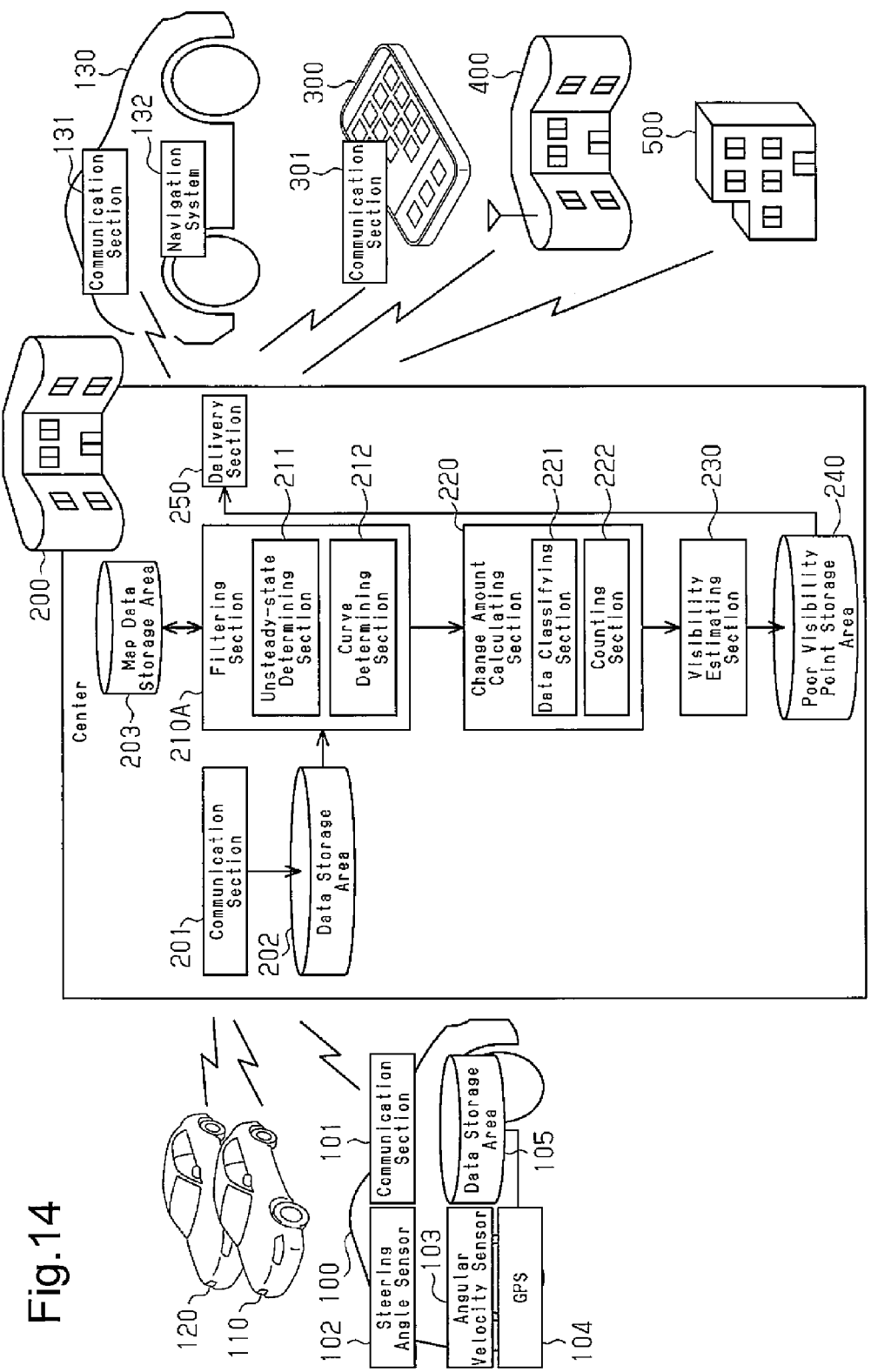
FIG. 14 is a block diagram schematically showing a center to which a poor visibility estimation system and a poor visibility estimation method according to a third embodiment of the present invention are applied, and showing communication with the center.

As FIG. 14, a filtering section 210A included in a center 200 according to the present embodiment further includes a curve determining section 212 that selects a road of a predetermined curvature, that is, data acquired on a curve, to be excluded.

Based on map data stored in a map data storage area 203 and latitude-longitude data stored in a data storage area 202, the curve determining section 212 determines whether data stored in the data storage area 202 is data acquired on the curve where the latitude-longitude data were acquired. Then, the curve determining section 212 selects the data acquired on the curve to be excluded.

Additionally, the curve determining section 212 calculates an approximate straight line based on changes in the steering angle data from which data acquired on roads of a predetermined curvature or greater has been excluded. Then, the curve determining section 212 selects, as data to be excluded, data indicating that the gradient of the calculated approximate straight line is equal to or greater than a predetermined gradient.

The curve determining section 212 outputs, to a change amount calculating section 220, steering angular velocity data associated with steering angle data that has not been excluded, and latitude-longitude data associated with the steering angular velocity data.

The map data stored in the map data storage area 203 are information related to maps, and includes information, such as data about road linear shape, various traffic elements, and their latitudes and longitudes.

The change amount calculating section 220 calculates an amount of change in the steering angular velocity data that has not been excluded by the curve determining section 212, that is, data acquired on a straight line. Then, a visibility estimating section 230 carries out poor visibility estimation based on the steering angular velocity data acquired on the straight line.

Figure 15:
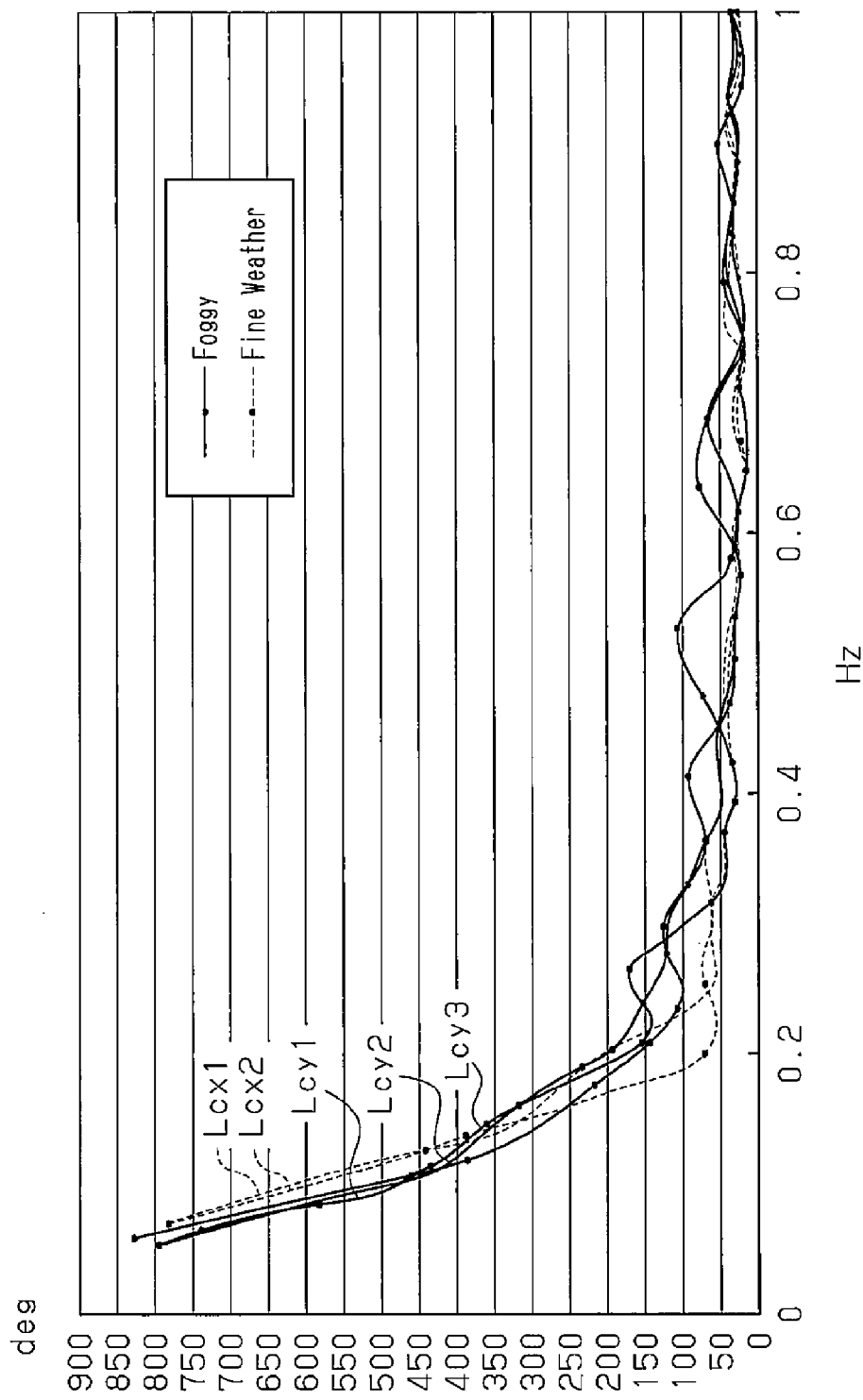
FIG. 15 is a diagram showing amounts of change in a steering angle acquired on a road of a predetermined curvature.

Next, referring to FIGS. 15 and 16, the characteristics of the steering angle for each road linear shape will be described. FIG. 15 shows amounts of change in the steering angle acquired on a road of a predetermined curvature. In FIG. 15, changes Lcx1, Lcx2 shown by broken lines indicate the respective absolute values of the changes in data resulting from the Fourier transform of the steering angle acquired when the weather is fine, that is, when the visibility is favorable. Additionally, in FIG. 15, changes Lcy1, Lcy2, Lcy3 indicate the respective absolute values of changes in data resulting from the Fourier transform of the steering angle acquired when the visibility is poor.

Figure 16:
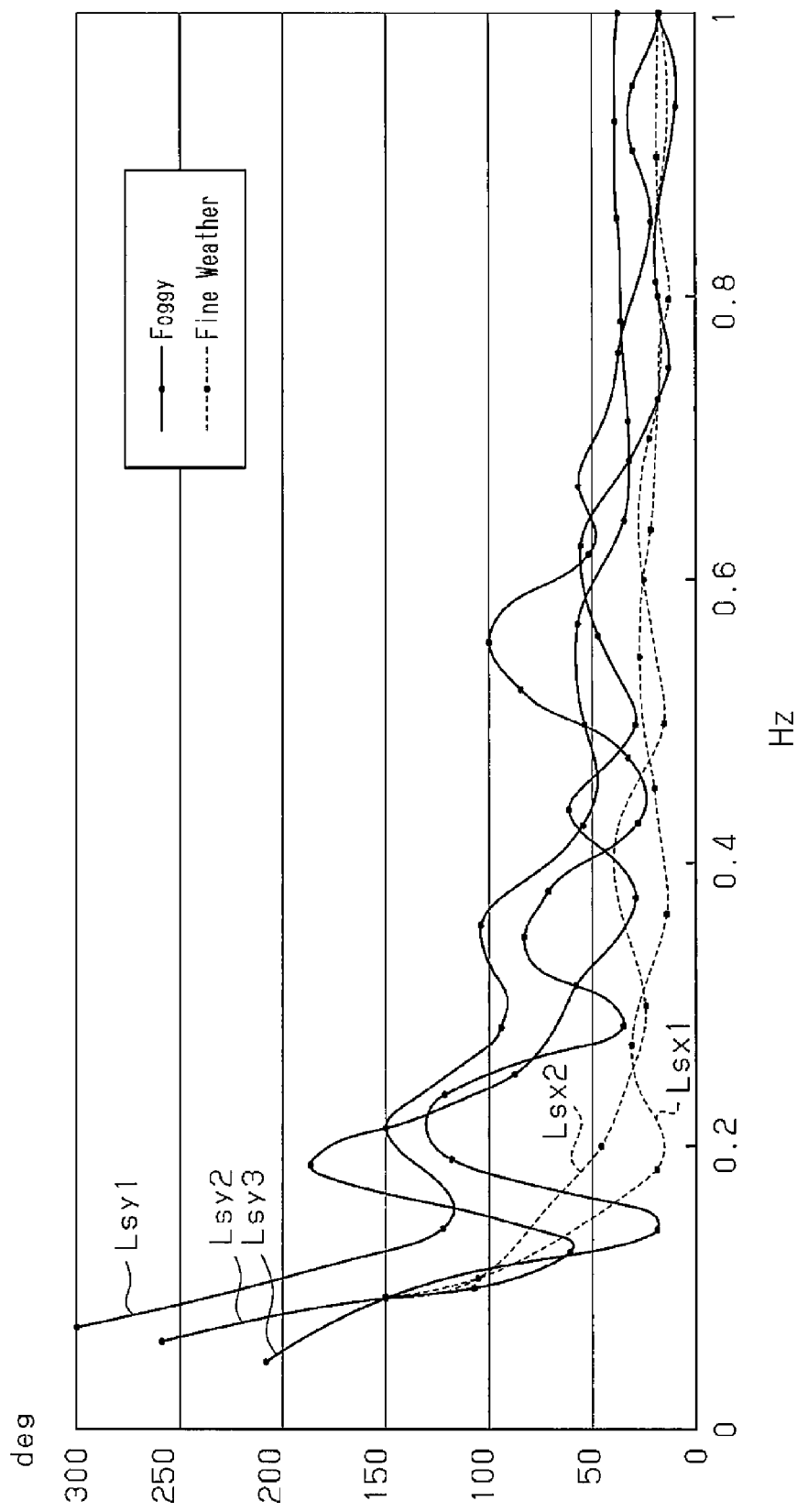
FIG. 16 is a diagram showing amounts of change in a steering angle acquired on a straight road.

FIG. 16 shows amounts of change in the steering angle acquired on a straight road. In FIG. 16, changes Lsx1, Lsx2 shown by broken lines indicate the respective absolute values of the changes in data resulting from the Fourier transform of the steering angle acquired when the weather is fine, that is, when the visibility is favorable. Additionally, in FIG. 15, changes Lsy1, Lsy2, Lsy3 indicate the respective absolute values of changes in data resulting from the Fourier transform of the steering angle acquired when the visibility is poor.

As shown in FIG. 15, on the road (curve) of a predetermined curvature, there is a difference between changes Lcx1, Lcx2 when the visibility is favorable and the changes Lcy1, Lcy2, Lcy3 when the visibility is poor in each frequency band. However, the differences decrease by amounts reflected by amounts of steering operation performed along a curve.

In contrast, as shown in FIG. 16, on the straight road, the difference between the changes Lsx1, Lsx2 when the visibility is favorable and the changes Lsy1, Lsy2, Lsy3 when the visibility is poor in each frequency band increase by an amount that does not include steering along the road linear shape.

Therefore, in the present embodiment, since the respective differences in the steering angle data and steering angular velocity data between when the visibility is favorable and when the visibility is poor tend to decrease on a curve, the filtering section 210A selects the steering angle data and steering angular velocity data to be excluded. In the present embodiment, for example, steering angle data of about 30 degrees or greater in change of steering angle in a predetermined traveling distance is determined to have been acquired from a vehicle that has traveled on a road of a predetermined curvature, and is excluded.

Figure 17:
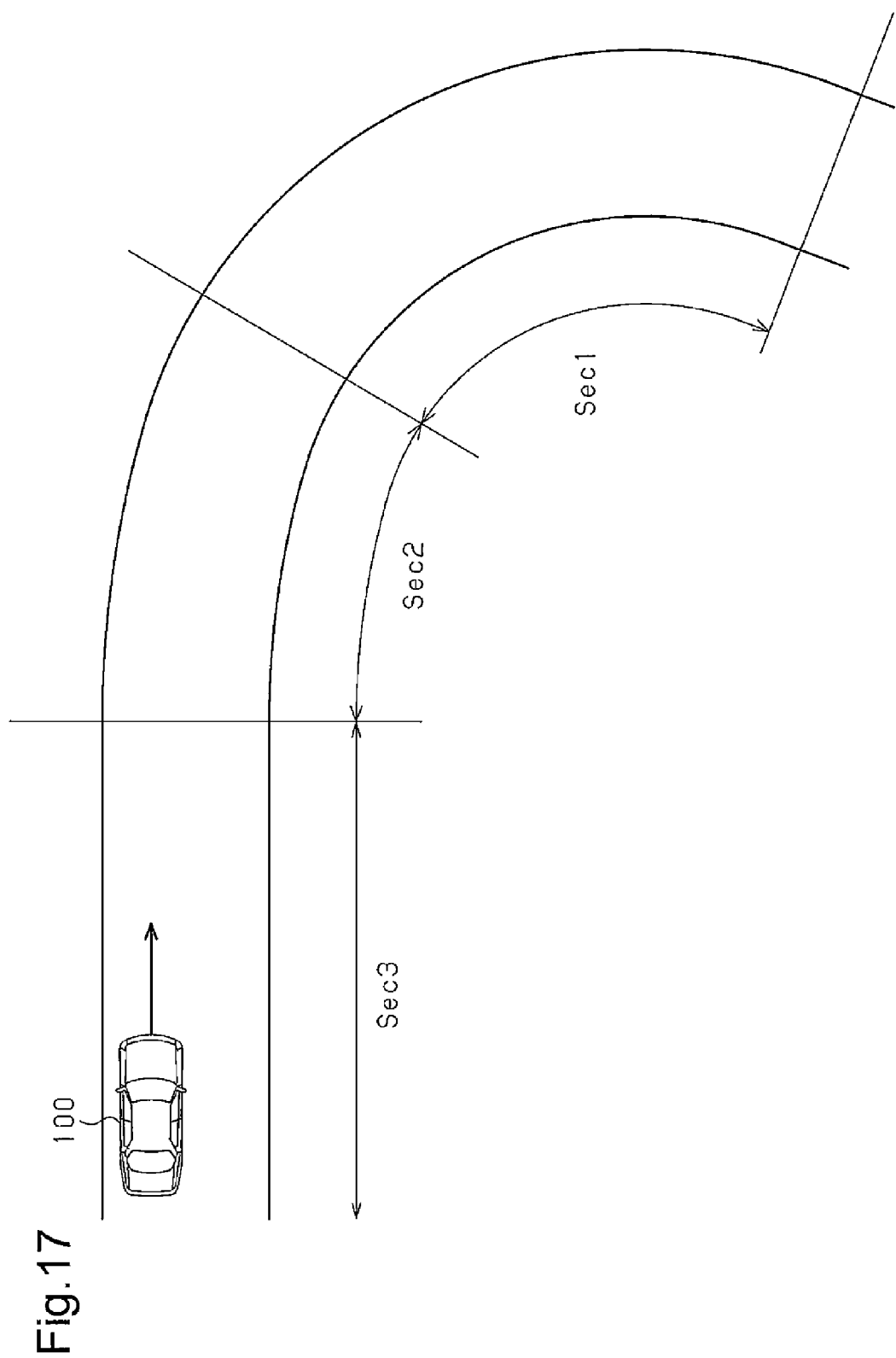
FIG. 17 is a diagram showing the relationship between a road of a predetermined curvature and a vehicle entering the road.

As a result, as shown in FIG. 17, the steering angle data and the steering angular velocity data acquired in a road section Sec1 of a predetermined curvature are excluded from data subjected to poor visibility estimation. Thus, the visibility estimating section 230 is able to estimate whether the visibility is favorable, based on data in which the differences between when the visibility is favorable and when the visibility is poor are accurately reflected.

Additionally, in a road section Sec2 immediately before the curve shown in FIG. 17, operations for entering the curve are performed. Therefore, although the road section Sec2 is the one the curvature of which is not greater than the predetermined curvature, that is, the one not determined to be a general curve, a change amount reflecting the road linear shape that is not a factor in poor visibility is included in the steering angle data and steering angular velocity data.

Therefore, using approximate straight lines, the curve determining section 212 according to the present embodiment selects steering angle data and steering angular velocity reflecting the road linear shape, to be excluded.

Figure 18A:
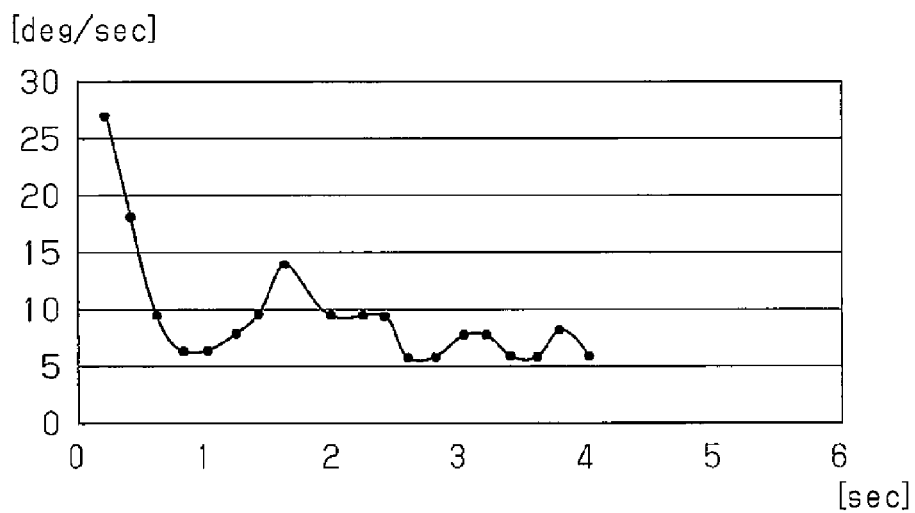
FIG. 18A is a diagram showing a steering angular velocity change acquired in a vehicle that has traveled in a certain road section connecting a straight road and a curve when the visibility is favorable.
Figure 18B:
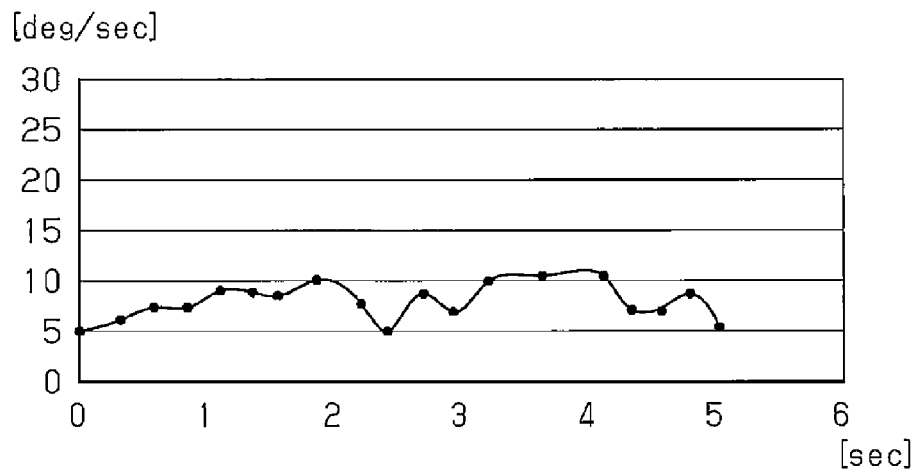
FIG. 18B is a diagram showing a steering angular velocity change acquired in a vehicle that has traveled on a straight road when the visibility is poor.

Each of FIGS. 18A and 18B shows data when a steering angular velocity of 6 [deg/sec] has been detected for 2 seconds or more. The change shown in 18A is based on steering angular velocity data, for example, in the road section Sec2 shown in FIG. 17, acquired by a vehicle that has traveled in this road section Sec2. In contrast, the change shown in FIG. 18B is based on the steering angular velocity data in, for example, a road section Sec3, or the like in FIG. 17, acquired by a vehicle that has traveled a straight road such as the road section Sec3.

As shown in FIG. 18A, the change in the steering angular velocity in, for example, the road section Sec2 in FIG. 17, acquired by the vehicle that has traveled in this road section Sec2 varies in a range from about 6 [deg/sec] to 26 [deg/sec] even when the visibility is favorable. Therefore, data based on only data indicating steering angular velocity change shown in FIG. 18A is likely to cause the erroneous determination that the data has been acquired when the visibility was poor.

Additionally, as shown in FIG. 18B, steering angular velocity change in, for example, the road section Sec3 shown in FIG. 17, acquired by a vehicle that has traveled in the road section Sec3, includes change caused by poor visibility. In both the changes shown in FIGS. 18A and 18B, the steering angular velocities are equal to or higher than a predetermined value, for example, about 6 [deg/sec] or higher.

Figure 19A:
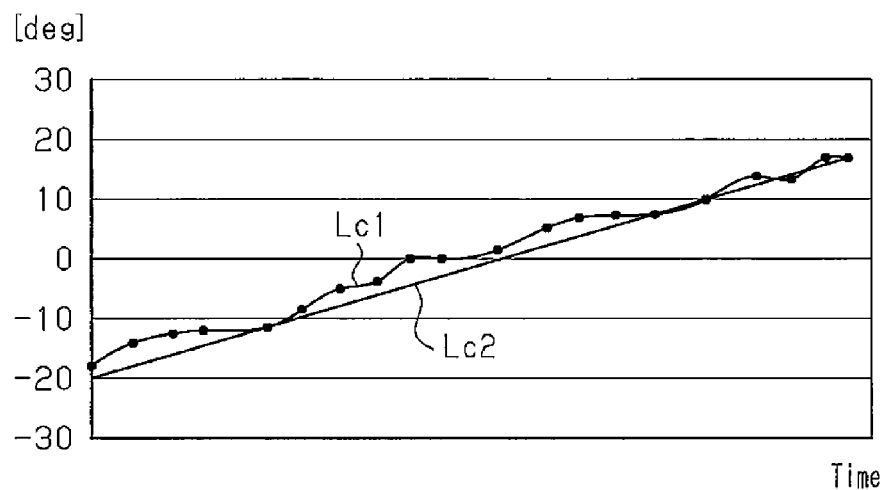
FIG. 19A is a diagram showing a steering angle change acquired in a vehicle that has traveled in a certain road section connecting a straight road and a curve when the visibility is favorable.

Meanwhile, as shown in FIG. 19A, the steering angle change Lc1 in, for example, the road section Sec2 in FIG. 17, acquired by the vehicle that has traveled in the road section Sec2, varies with a fixed gradient. That is, vehicle operations for entering the curve performed in the road section Sec2, are reflected. The approximate straight line Lc2 of this steering angle change Lc1 rises with a fixed gradient. In the predetermined traveling distance, the approximate straight line Lc2 varies in a range from about −20 degrees to about +20 degrees.

Figure 19B:
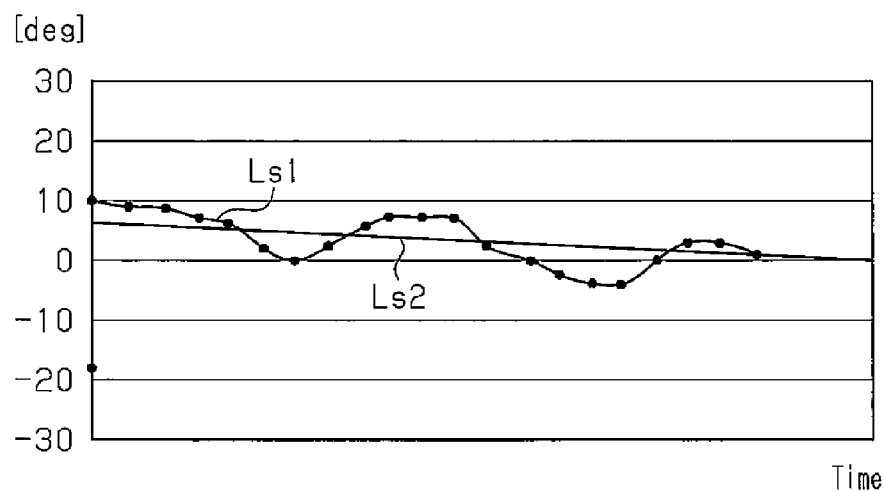
FIG. 19B is a diagram showing a steering angle change acquired by a vehicle that has traveled on a straight road when the visibility is poor.

In contrast, as shown in FIG. 19B, the approximate straight line Ls2 of the steering angle change Ls1 acquired by the vehicle that has traveled the straight line (road section Sec3) when the visibility is poor varies in a range from about +10 degrees to about 0 degrees. That is, the approximate straight line Ls2 of the straight road is smaller in the absolute value of the gradient than the approximate straight line Lc2 in the road section Sec2 located immediately before entry to the curve.

Therefore, in the present embodiment, if the absolute value of the gradient of the approximate straight line in the predetermined traveling distance is, for example, about 6 [deg/sec] or greater, it is determined that the data includes an amount of change reflecting vehicle operations for entering the curve, and is excluded from the data subjected to estimation.

The characteristics of such an approximate straight line are similar to those in a section located immediately after exit from the curve.

Next, a filtering process by the filtering section 210A according to the present embodiment will be described with reference to FIG. 20.

Figure 20:
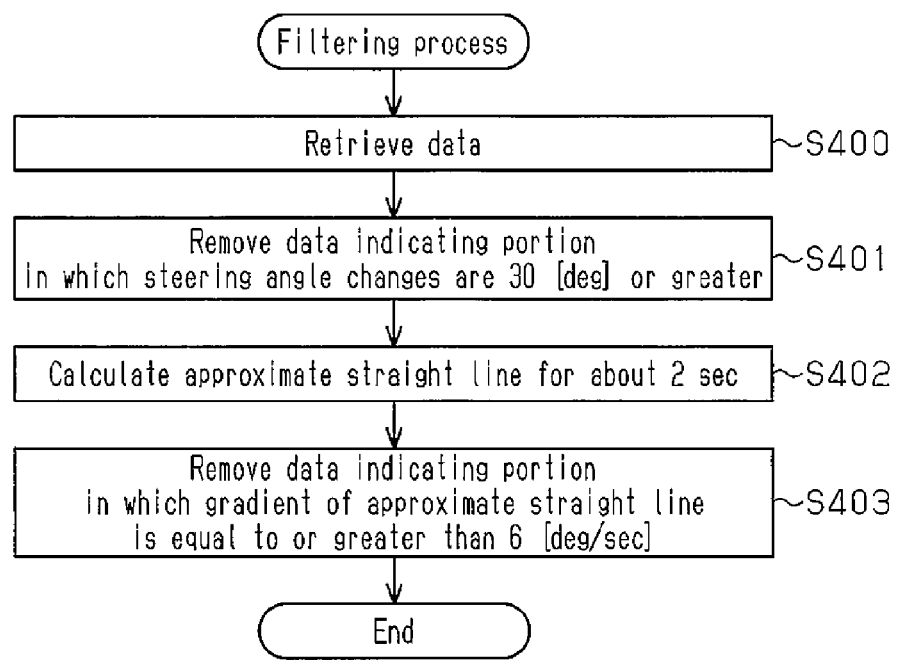
FIG. 20 is a flowchart of an example of a filtering process based on a steering angle and a steering angular velocity.

As indicated in step S400 in FIG. 20, when steering angle data stored in the data storage area 202 is retrieved, data indicating changes in which steering angle changes are 30 [deg] or greater is selected from among the retrieved data. Then, the data thus selected are discarded to be excluded from data subjected to poor visibility estimation (step S401).

Next, an approximate straight line is calculated based on data about steering angular velocity measured for a period of, for example, about 2 seconds (step S402). Then, data indicating that the absolute value of the gradient of the calculated approximate straight line is equal to or greater than, for example, 6 [deg/sec] is selected, and the steering angular velocity data thus selected is excluded from the data subjected to the poor visibility estimation (step S403).

In this way, the change amount calculating section 220 receives input of steering angular velocity data not including changes in vehicle operations due to the curve. Then, the visibility estimating section 230 estimates poor visibility based on the steering angular velocity data.

As described above, the poor visibility estimation system and the poor visibility estimation method of the present embodiment achieves the following advantages, as well as the advantages (1) to (12).

(13) The filtering section 210A further includes the curve determining section 212 that excludes data including an amount of change caused by a curve. The curve determining section 212 excludes data acquired on a road of a predetermined curvature or greater from data acquired when the visibility was poor. Thus, data reflecting the influence of vehicle operations performed during travel on a curve is excluded from data subjected to estimation. Thus, data including an amount of change based on a road linear shape, that is, an element different from poor visibility, is excluded in advance from data subjected to estimation. Thus, accuracy in estimation based on the amount of change in the operation element is improved.

(14) The curve determining section 212 calculates the approximate straight line of the change of steering angle, and excludes steering angular velocity data in which the approximate straight line has a predetermined gradient from data subjected to estimation. Therefore, even if the steering angular velocity data includes the influences of vehicle operations performed immediately before entry to a curve or vehicle operations performed immediately after exit from the curve, the data indicating the portion including the influences is excluded from data subjected to estimation. Therefore, a point where vehicle operations are performed due to entry to the curve or a point where vehicle operations are performed due to exit from the curve is prevented from causing erroneous determination that the visibility is poor at that point. Accordingly, accuracy in poor visibility estimation is further improved.

Fourth Embodiment

Figure 21:
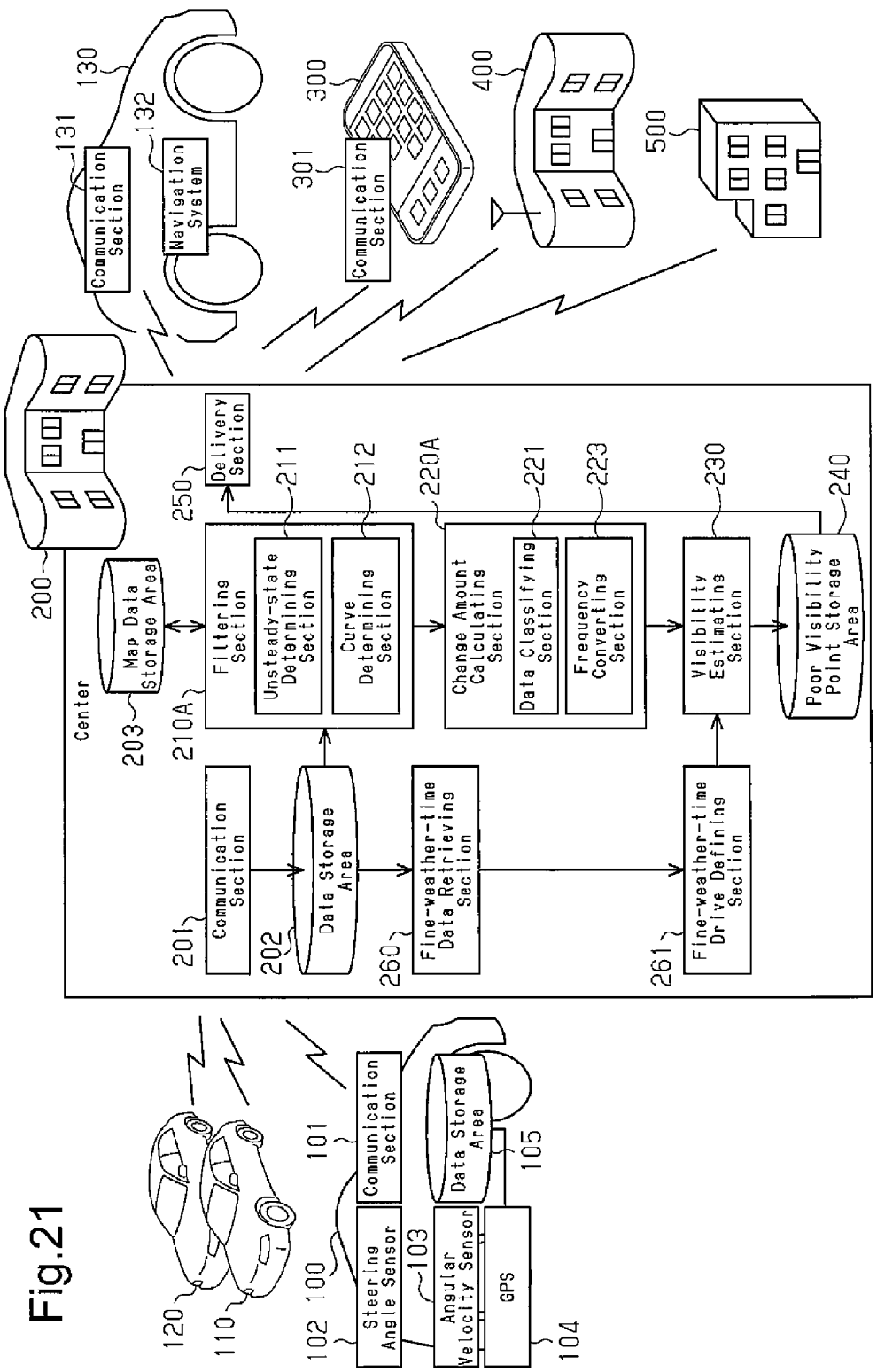
FIG. 21 is a block diagram schematically showing a center to which a poor visibility estimation system and a poor visibility estimation method according to a fourth embodiment of the present invention are applied, and showing communication with the center.

Next, referring to FIG. 21, a poor visibility estimation system and a poor visibility estimation method according to a fourth embodiment of the present invention will be described, focusing on differences from the second embodiment. The poor visibility estimation system and the poor visibility estimation method according to the present embodiment are identical in basic configuration to the second embodiment. In FIG. 21 also, elements substantially identical to those in the second embodiment are labeled with identical symbols, and redundant descriptions thereof will not be repeated.

As shown in FIG. 21, a filtering section 210A according to the present embodiment includes a curve determining section 212 as with the third embodiment described above. Based on changes in the steering angle, the curve determining section 212 excludes data acquired on a road of a predetermined curvature or greater. Additionally, the curve determining section 212 calculates approximate straight lines based on steering angular velocities, thereby excluding data acquired before and after a curve. Then, the curve determining section 212 outputs to a change amount calculating section 220A data from which data acquired on, before, or after a curve has been removed.

Then, the data from which the influences of the curve have been removed is subjected to frequency conversion as with the second embodiment described above, and poor visibility is estimated.

As described above, the poor visibility estimation system and the poor visibility estimation method of the present embodiment achieves the following advantages in place of the advantage (7), as well as the advantages (1) to (6) and (8) to (12).

(7B) The filtering section 210A further includes the curve determining section 212, which excludes data including an amount of change caused by a curve. The curve determining section 212 excludes data acquired on a road of a predetermined curvature or greater from data acquired when the visibility was poor. Thus, data reflecting the influence of vehicle operations performed during travel on a curve is excluded from data subjected to estimation. Thus, data including an amount of change based on a road linear shape, that is, an element different from poor visibility, is excluded in advance from data subjected to estimation. Accordingly, accuracy in estimation based on an amount of change in the operation element is improved.

(8B) The curve determining section 212 calculates the approximate straight line of the change of steering angle, and excludes steering angular velocity data in which the approximate straight line has a predetermined gradient from data subjected to estimation. Therefore, even if the steering angular velocity data includes the influences of vehicle operations performed immediately before entry to a curve or vehicle operations performed immediately after exit from the curve, the data indicating the portion including the influences is excluded from data subjected to estimation. Therefore, a point where vehicle operations are performed due to entry to the curve or a point where vehicle operations are performed due to exit from the curve is prevented from causing erroneous determination that the visibility is poor at that point. Accordingly, accuracy in poor visibility estimation is further improved.

Fifth Embodiment

Figure 22:
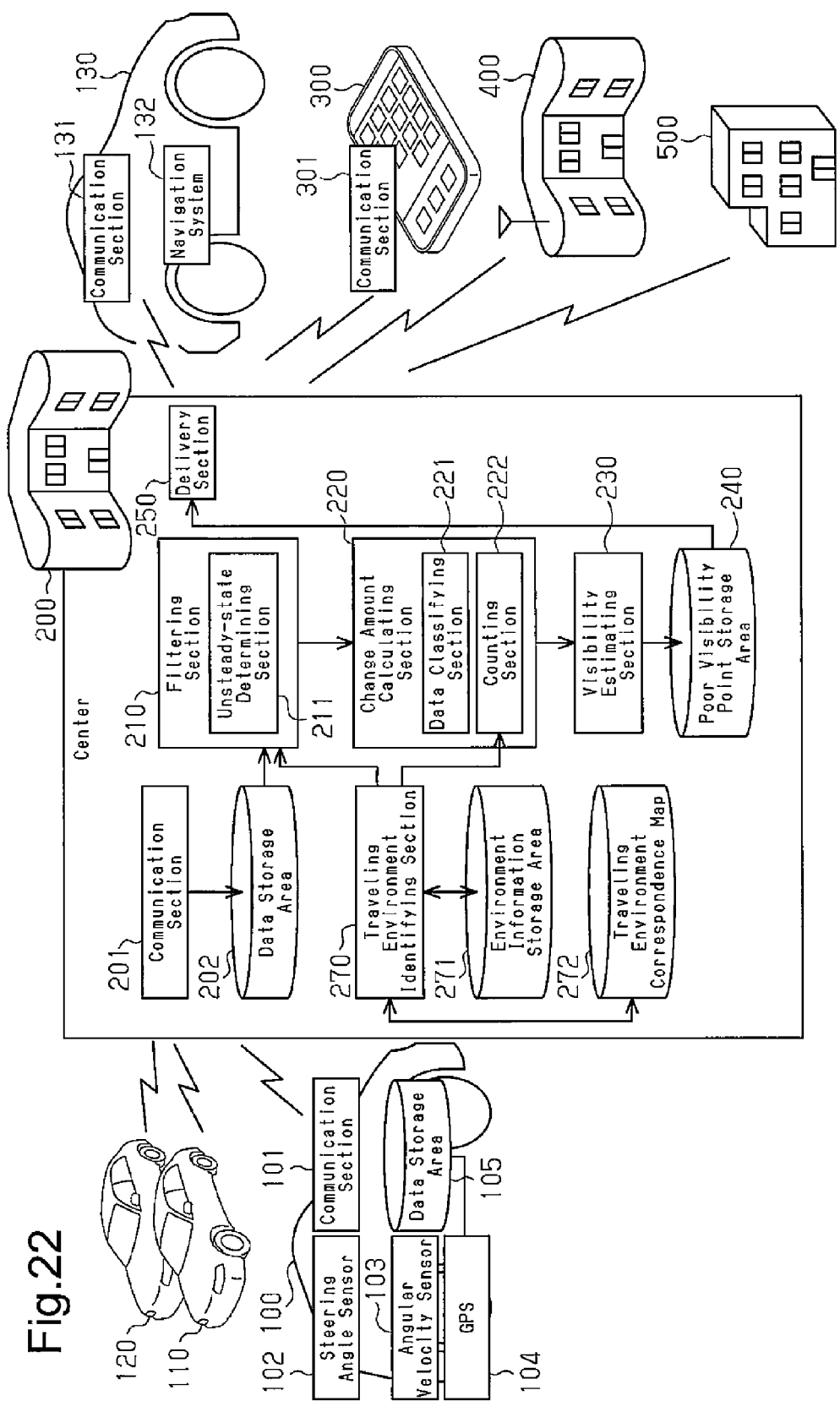
FIG. 22 is a block diagram schematically showing a center to which a poor visibility estimation system and a poor visibility estimation method according to a fifth embodiment of the present invention are applied, and showing communication with the center.
Figure 24:
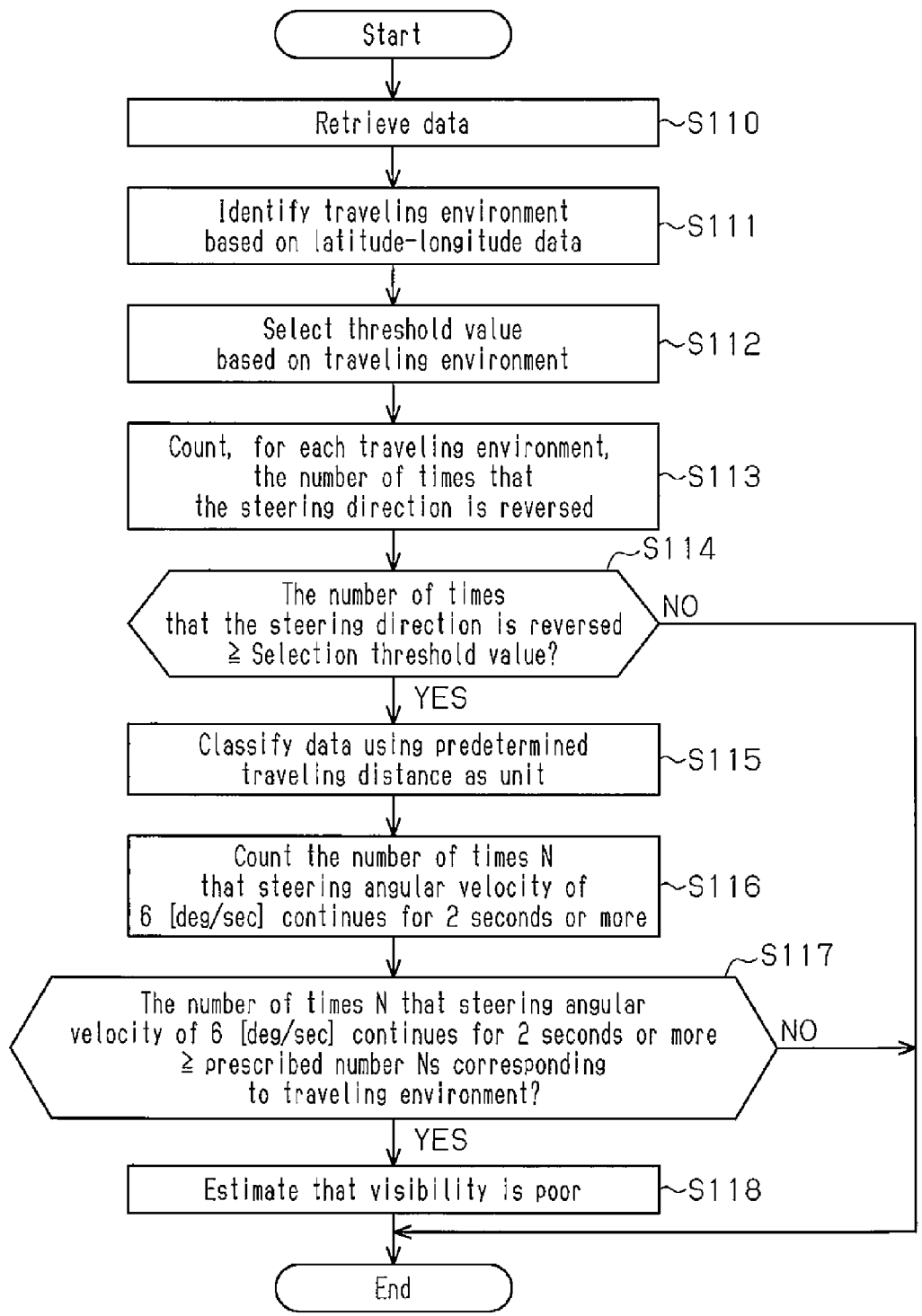
FIG. 24 is a flowchart of an example of a visibility estimation process using the poor visibility estimation system and the poor visibility estimation method according to the fifth embodiment.

Next, referring to FIGS. 22 to 24, a poor visibility estimation system and a poor visibility estimation method according to a fifth embodiment of the present invention will be described, focusing on differences from the first embodiment. The poor visibility estimation system and the poor visibility estimation method according to the present embodiment are identical in basic configuration to the first embodiment. In FIGS. 22 to 24 also, elements substantially identical to those in the first embodiment are labeled with identical symbols, and redundant descriptions thereof will not be repeated.

As shown in FIG. 22, a center 200 in the present embodiment includes a traveling environment identifying section 270, which, based on latitude-longitude data stored in a data storage area 202, identifies traveling environments of a vehicle from which the latitude-longitude data has been acquired. Additionally, the center 200 includes an environment information storage area 271 storing information about traveling environments and a traveling environment correspondence map 272, in which threshold values have been made to correspond to each traveling environment.

In the environment information storage area 271, intersections, road gradients, average temperatures and weather for each time of year for each area, and the like, are stored according to their respective latitudes and longitudes. Additionally, in the environment information storage area 271, traffic information acquired through communication between a communication section 201 and each vehicle 100, 110, 120, and between the communication section 201 and a road traffic information center 400 and the like, are stored. Traffic information includes information indicating road surface conditions, such as being dry, wet, frozen, covered with snow, or icy, and the latitudes and longitudes corresponding to these conditions.

The traveling environment correspondence map 272 shows data in which, as shown in FIG. 23, selection threshold values X1 to X7 and the like for the number of times that the steering direction is reversed are made to correspond to traveling environments, and are used by an unsteady-state determining section 211. Additionally, the traveling environment correspondence map 272 shows data in which, as shown in FIG. 23, threshold values Y1 to Y7 and the like used as the above-described prescribed numbers Ns are made to correspond to traveling environments, and are used by a visibility estimating section 230 to determine whether the visibility is favorable.

Upon retrieving latitude-longitude data from the data storage area 202, the traveling environment identifying section 270 identifies, based on the retrieved latitude-longitude data and environment information stored in the environment information storage area 271, the traveling environments of the point from which the latitude-longitude data has been acquired.

Then, the traveling environment identifying section 270 selects a threshold value from among selection threshold values X1 to X7 based on the identified traveling environment. The traveling environment identifying section 270 outputs the selected threshold value to the unsteady-state determining section 211.

The traveling environment identifying section 270 also selects a threshold value used as the above-described prescribed number Ns from among the threshold values Y1 to Y7 based on the identified traveling environment. The traveling environment identifying section 270 outputs the selected threshold value to the visibility estimating section 230.

Upon receiving input of the threshold value identified by the traveling environment identifying section 270, the unsteady-state determining section 211 determines based on this threshold value whether the vehicle is unsteady.

Upon receiving input of the threshold value identified by the traveling environment identifying section 270, the visibility estimating section 230 estimates poor visibility based on this threshold value.

Referring to FIG. 24, next will be described a visibility estimation procedure using the poor visibility estimation system and the poor visibility estimation method according to the present embodiment.

As shown in FIG. 24, when data stored in the data storage area 202 is retrieved (step S110), the traveling environment where the steering angle and steering angular velocity data has been acquired is identified based on latitude-longitude data of the retrieved data (step S111). Subsequently, a selection threshold value and a poor visibility estimation threshold value corresponding to the identified traveling environment are selected (step S112).

Then, the number of times that the steering direction is reversed in a predetermined traveling distance prescribed to be, for example, from tens to hundreds of meters, is counted based on the steering angle data of the retrieved data (step S113).

Then, it is determined whether the number of times that the steering direction is reversed is equal to or larger than the above-described selection threshold value (step S114). If it is determined that the number of times that the steering direction is reversed is equal to or larger than the selection threshold value, then steering angular velocity data and latitude-longitude data associated with the steering angle data subjected to the determination are selected as data not to be excluded (step S114: YES).

Then, the steering angular velocity data thus selected is classified into data for every predetermined traveling distance unit and integrated, as in the mode exemplified in FIG. 3 described above (step S115). Such classification is carried out in the mode of shifting the data as required for every data collection unit.

Next, based on the steering angular velocity data that is calculated as required for each predetermined traveling distance unit, the number of times N that a steering angular velocity of 6 [deg/sec] or higher continues for 2 seconds or more is equal to or larger than the prescribed number Ns based on the threshold value selected in step S112 (steps S116, S117).

Then, if it is determined that the number of times N is equal to or larger than the prescribed number Ns, (step S117: YES), the point at which the steering angular velocity data has been acquired or a particular range of area including this point is identified based on the latitude-longitude data associated with the steering angular velocity data subjected to the determination. Then, the visibility is estimated to be poor at the identified point or area (step S118).

In contrast, in step S114, if it is determined that the number of times that the steering direction is reversed is smaller than the selection threshold value (step S114: NO), the steering angular velocity data and latitude-longitude data associated with the steering angle data subjected to the determination are selected as data to be excluded. Then, each of the data determined to be excluded is discarded.

If it is determined in step S116 that the number of times is smaller than the prescribed number Ns (step S116: NO), it is determined that the visibility is not poor, i.e., the visibility is favorable at the point where the steering angular velocity data used for the determination has been acquired.

As described above, the poor visibility estimation system and the poor visibility estimation method of the present embodiment achieves the following advantages, as well as the advantages (1) to (12).

(15) Poor visibility determination based on steering angular velocity data is carried out for each traveling environment. Therefore, even when steering angle or steering angular velocity changes due to an element different from poor visibility, for example, road surface condition, the influence of road surface condition on the result of poor visibility estimation is reduced. Thus, the road surface condition is prevented from causing erroneous estimation that the visibility is poor, even though the visibility is favorable. Accordingly, estimation accuracy is further improved.

(16) The number of times that the steering direction is reversed is determined for each traveling environment. Therefore, even when the number of times that the steering direction is reversed is changed due to an element different from poor visibility, a determination corresponding to this change is made. Accordingly, whether the vehicle is unsteady can precisely be determined.

Sixth Embodiment

Figure 25:
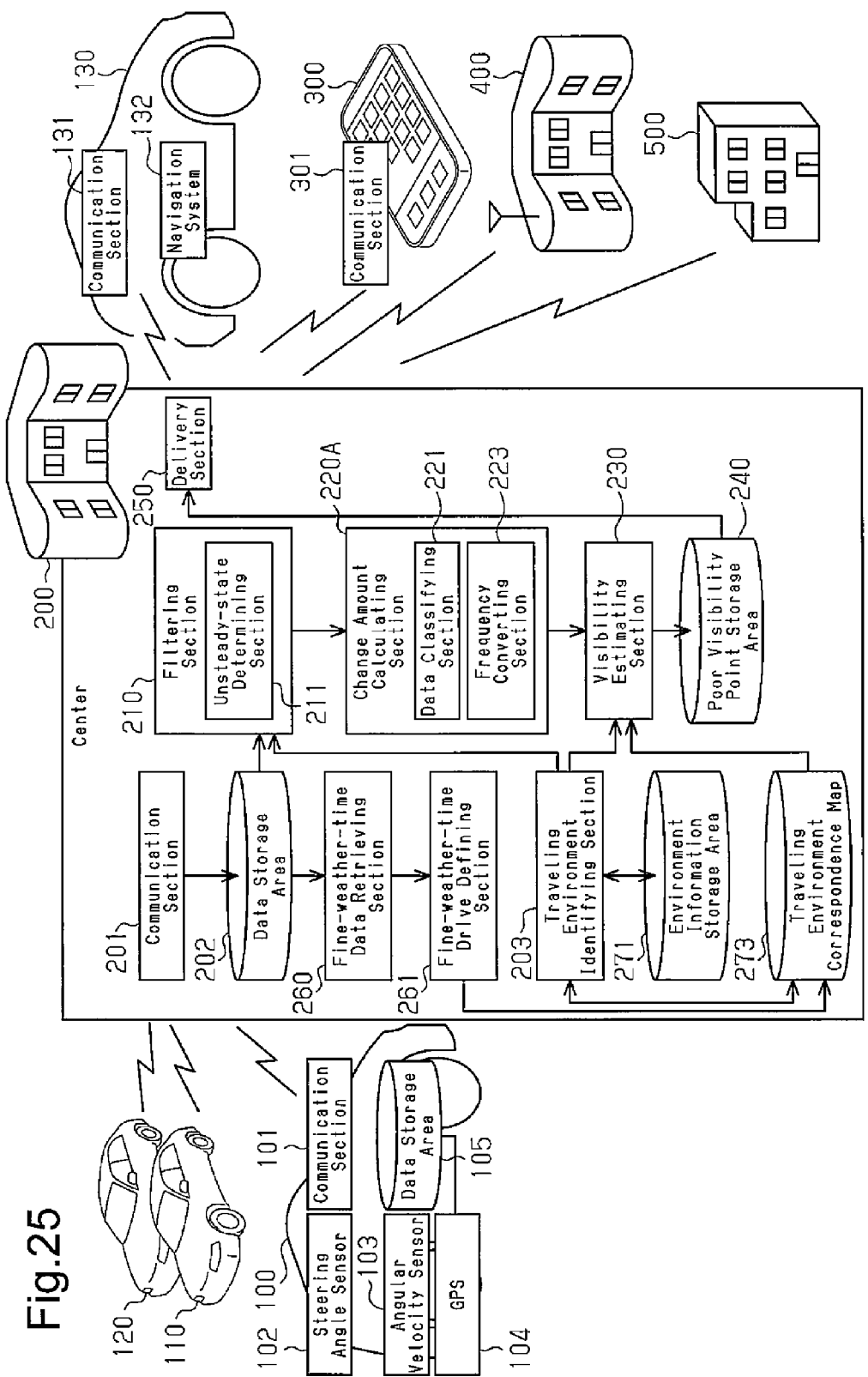
FIG. 25 is a block diagram schematically showing a center to which a poor visibility estimation system and a poor visibility estimation method according to a sixth embodiment of the present invention are applied, and showing communication with the center.
Figure 27:
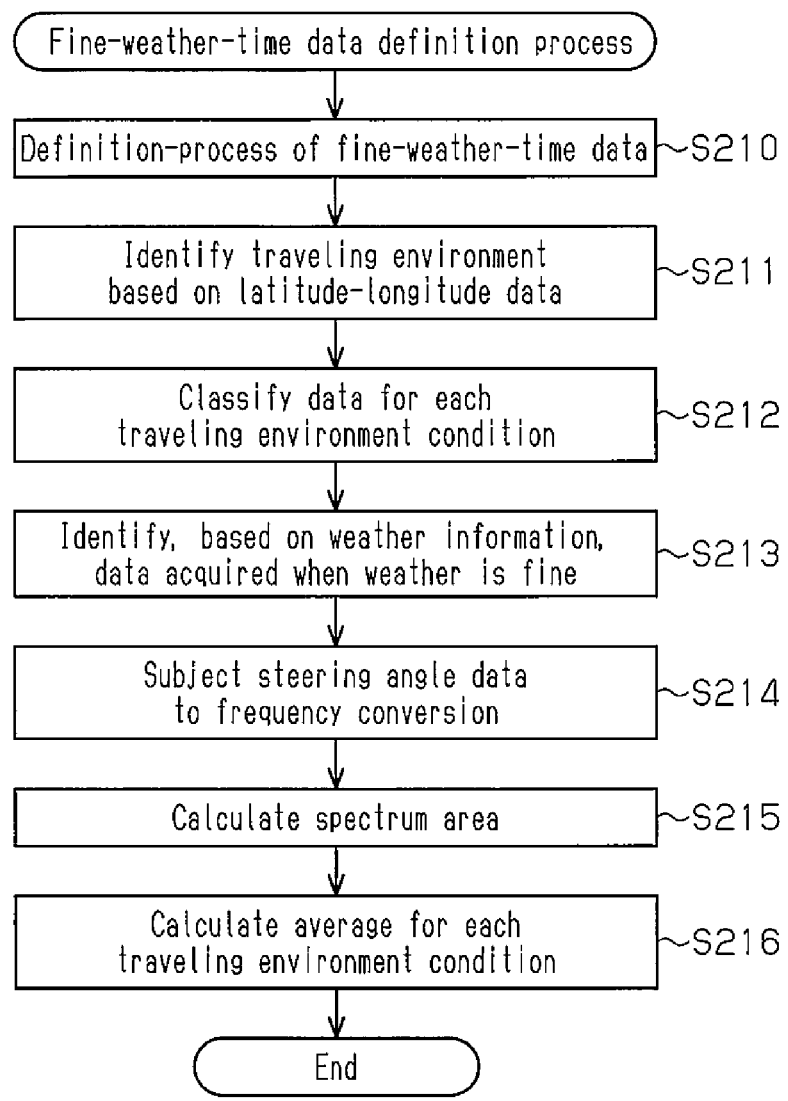
FIG. 27 is a flowchart of an example of a fine-weather-time data definition process according to the sixth embodiment.

Next, referring to FIGS. 25 to 27, a poor visibility estimation system and a poor visibility estimation method according to a sixth embodiment of the present invention will be described, focusing on differences from the second embodiment. The poor visibility estimation system and the poor visibility estimation method according to the present embodiment are identical in basic configuration to the second embodiment. In FIGS. 25 to 27 also, elements substantially identical to those in the second embodiment are labeled with identical symbols, and redundant descriptions thereof will not be repeated.

As shown in FIG. 25, a center 200 in the present embodiment has the above-described traveling environment identifying section 270, an environment information storage area 271, and a traveling environment correspondence map 273, all of which are described above.

A fine-weather-time drive defining section 261 according to the present embodiment defines fine-weather-time driving for each traveling environment. The fine-weather-time drive defining section 261 outputs information about defined fine-weather-time driving to the traveling environment correspondence map 273.

As shown in FIG. 26, the traveling environment correspondence map 273 according to the present embodiment has data in which selection threshold values X1 to X7 and the like for the number of times that the steering direction is reversed are made to correspond to traveling environments, and are used by the unsteady-state determining section 211.

Additionally, as shown in FIG. 26, the traveling environment correspondence map 273 has data in which the averages Z1 to Z7 and the like indicating fine-weather-time driving defined by the fine-weather-time drive defining section 261 are made to correspond to the traveling environments.

An unsteady-state determining section 211 and the visibility estimating section 230 according to the present embodiment also carry out unsteady-state determination and poor visibility estimation based on a threshold value selected by the traveling environment identifying section 270.

Next, a fine-weather-time data definition process according to the present embodiment will be described with reference to FIG. 27.

As shown in FIG. 27, first, weather information for identifying an area where weather is fine and a period of time that the weather is fine are acquired (step S210).

Then, the traveling environment where the data of the steering angle and the steering angular velocity has been acquired is identified based on latitude-longitude data stored in a data storage area 202 (step S211). Then, data on the steering angle and steering angular velocity is classified for each traveling environment identified (step S212).

Then, based on acquired weather information, a plurality of steering angle data and latitude-longitude data acquired when the weather is fine are identified from among the data stored in the data storage area 202 (step S213).

Next, the pieces of the steering angle data thus identified are subjected to frequency conversion, and spectrum areas corresponding to the data subjected to the conversion are calculated (steps S214, S215). Then, the average of the spectrum areas based on the pieces of the calculated steering angle data is calculated (step S216). When the average is thus calculated, this calculated average is defined as the amount of change in the steering angle based on the vehicle operation performed when the weather was fine.

Figure 28:
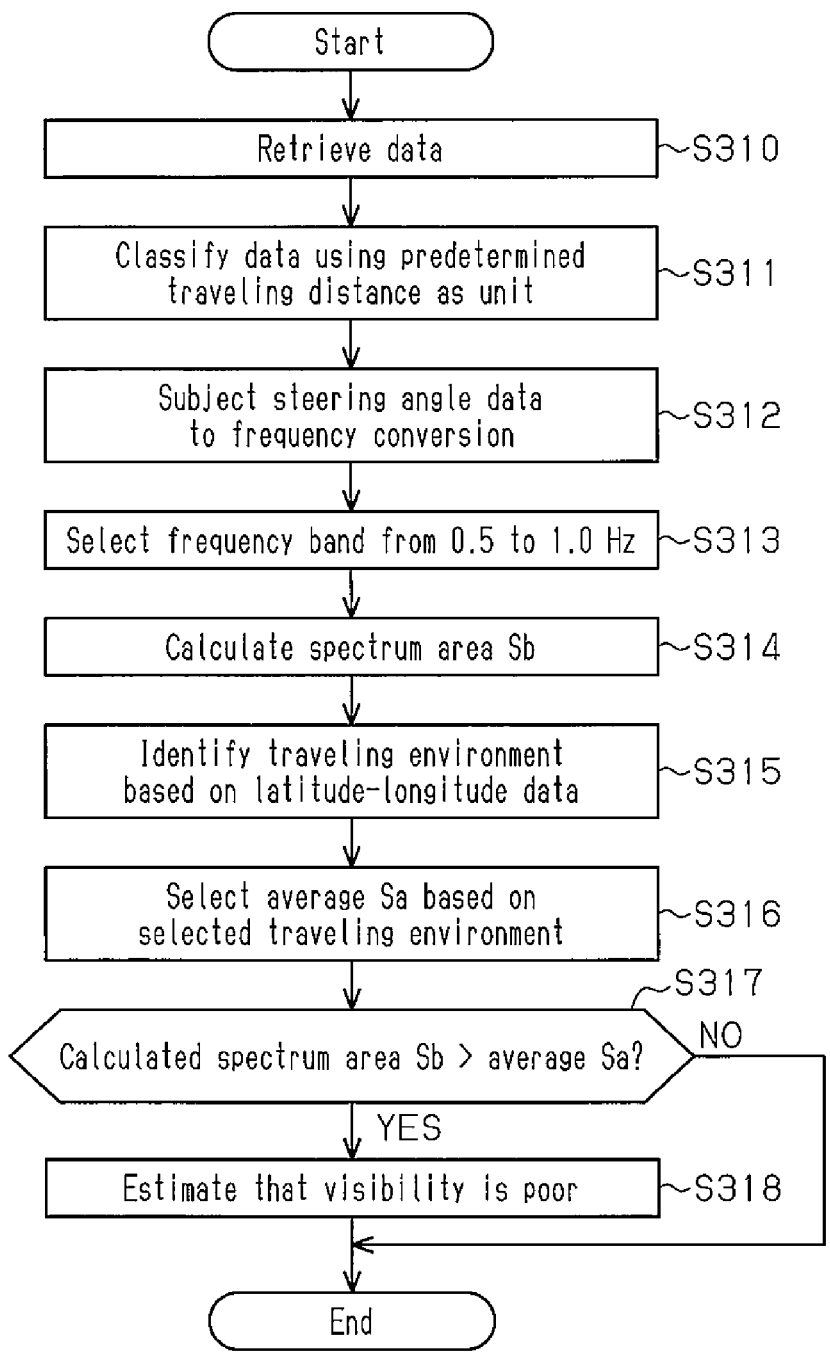
FIG. 28 is a flowchart of an example of a visibility estimation process using the poor visibility estimation system and the poor visibility estimation method according to the sixth embodiment.

Referring to FIG. 28, a poor visibility estimation system and a poor visibility estimation method according to the present embodiment will be described.

As shown in FIG. 28, when data stored in the data storage area 202 is retrieved (step S310), data indicating steering angle among the retrieved data is classified for every prescribed traveling unit and integrated (step S311).

Then, the steering angle data resulting from the classification is subjected to frequency conversion by, for example, the Fourier transform (step S312). Then, the data of the frequency band from 0.5 to 1.0 Hz is selected from among the data subjected to frequency conversion (step S313). When the data is thus selected, spectrum areas in the selected frequency band are calculated (step S314).

Subsequently, traveling environments where the steering angle data subjected to the calculation of the spectrum areas are identified based on the latitude-longitude data associated with the steering angle data (step S315). Next, for the average Sa of the spectrum areas acquired in a traveling environment common to or similar to an identified traveling environment, one of the threshold values Z1 to Z7 and the like shown in FIG. 26 described above is selected (step S316).

Then, the average Sa using one of the threshold values Z1 to Z7 selected and the spectrum area Sb calculated in step S314 are compared (step S317).

As a result of the comparison, if the calculated spectrum area Sb exceeds the average Sa of the spectrum areas when the weather is fine (step S317: YES), the amount of change in the steering angle is estimated to be equal to or greater than the reference change amount used for poor visibility estimation. Next, the point at which the steering angle data subjected to the calculation of the spectrum area Sb is acquired or the predetermined range of area including this point is identified. Thus, the visibility is estimated to be poor at the identified point or in the identified area (step S318).

In contrast, in step S317, if it is determined in step S305 that the spectrum area Sb is equal to or smaller than the average Sa of the spectrum areas when the weather is fine (step S317: NO), it is determined that the visibility is not poor, i.e., the visibility is favorable at the point where the steering angular velocity data used for the determination has been acquired.

As described above, the poor visibility estimation system and the poor visibility estimation method of the present embodiment achieves the following advantages, as well as the advantages (1) to (3), (6) to (12), and (4A) to (8A).

(17) Poor visibility determination based on steering angular velocity data is carried out for each traveling environment. Therefore, even when steering angle or steering angular velocity changes due to an element different from poor visibility, for example, road surface condition, the influence of road surface condition on the result of poor visibility estimation is reduced. Thus, the road surface condition is prevented from causing erroneous estimation that the visibility is poor, even though the visibility is favorable. Accordingly, estimation accuracy is further improved.

(18) The number of times that the steering direction is reversed is determined for each traveling environment. Therefore, even when the number of times that the steering direction is reversed is changed due to an element different from poor visibility, a determination corresponding to this change is made. Accordingly, whether the vehicle is unsteady can precisely be determined.

Seventh Embodiment

Figure 29:
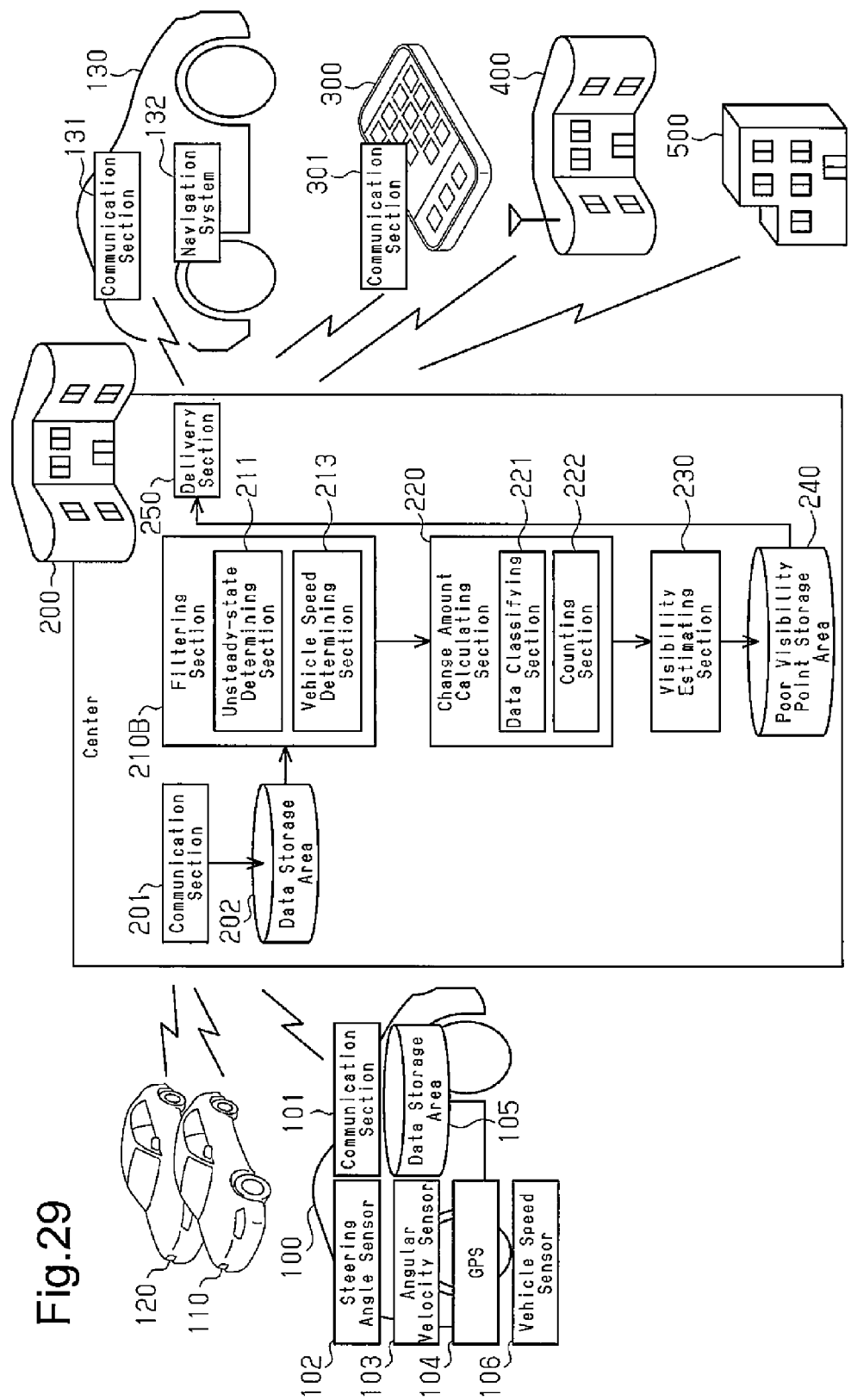
FIG. 29 is a block diagram schematically showing a center to which a poor visibility estimation system and a poor visibility estimation method according to a seventh embodiment of the present invention are applied, and showing communication with the center.
Figure 30:
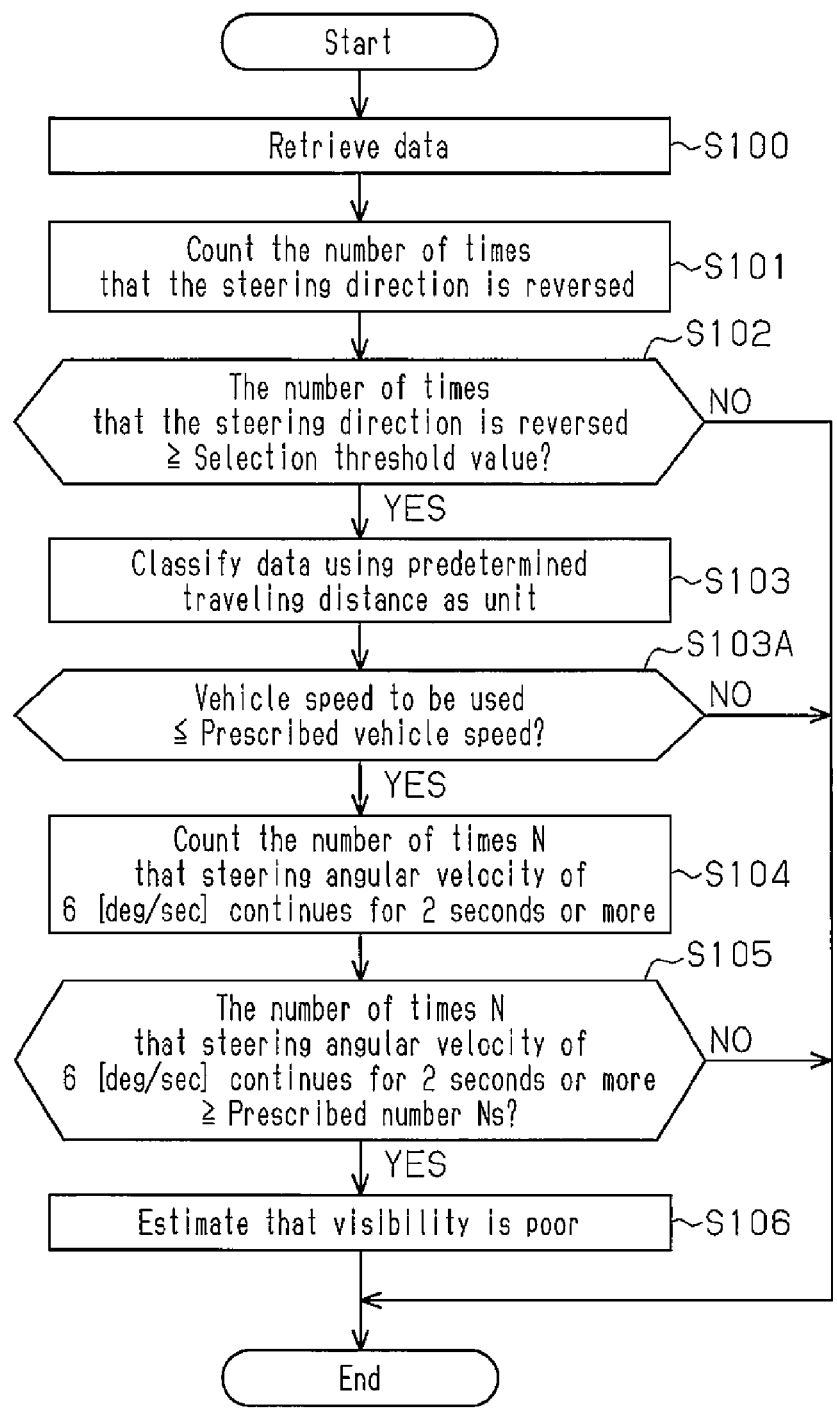
FIG. 30 is a flowchart of an example of a visibility estimation process using the poor visibility estimation system and the poor visibility estimation method according to the seventh embodiment.

Next, referring to FIGS. 29 and 30, a poor visibility estimation system and a poor visibility estimation method according to a seventh embodiment of the present invention will be described, focusing on differences from the first embodiment. The poor visibility estimation system and the poor visibility estimation method according to the present embodiment are identical in basic configuration to the first embodiment. In FIGS. 29 and 30 also, elements substantially identical to those in the first embodiment are labeled with identical symbols, and redundant descriptions thereof will not be repeated.

As shown in FIG. 29, a center 200 according to the present embodiment also collects vehicle speed data acquired by a vehicle speed sensor 106 mounted on a vehicle 100 and provided to detect the traveling speed of the vehicle 100.

Additionally, a filtering section 210B included in the center 200 in the present embodiment further includes a vehicle speed determining section 213 that selects data to be excluded, based on whether traveling speeds indicated by vehicle speed data are equal to or lower than a prescribed traveling speed. As the prescribed traveling speed, the speed that is, for example, about 25% or more lower than a traveling speed indicated by vehicle speed data acquired in fine weather is prescribed.

The filtering section 210B in the present embodiment outputs to a change amount calculating section 220 data that has not been excluded by the unsteady-state determining section 211 and vehicle speed determining section 213.

Referring to FIG. 30, next will be described a visibility estimation procedure using the poor visibility estimation system and the poor visibility estimation method according to the present embodiment.

As shown FIG. 30, when steps S100 to S103 in FIG. 5 are performed, it is determined whether the vehicle traveling speeds indicated by vehicle speed data associated with steering angular velocity data resulting from the classification in step S103 are equal to or lower than the prescribed traveling speed (step S103A).

If the vehicle traveling speeds indicated by the vehicle speed data are equal to or lower than the prescribed traveling speed (step S103A: YES), the vehicle speed data is highly likely to have been acquired at a point where the visibility is poor. Therefore, the vehicle speed data is subjected to counting in step S104.

In contrast, if the vehicle traveling speeds indicated by the vehicle speed data exceed the prescribed traveling speed (step S103A: NO), the vehicle speed data is highly likely to have been acquired in a situation where the visibility is favorable enough for the vehicle to travel at a normal traveling speed. Therefore, the steering angular velocity data associated with the vehicle speed data is excluded.

As described above, the poor visibility estimation system and the poor visibility estimation method of the present embodiment achieves the following advantage, as well as the advantages (1) to (12).

(19) Based on vehicle traveling speeds, the filtering section 210B selects data that is not used for poor visibility estimation. Therefore, the steering angular velocity data acquired at traveling speeds higher than the prescribed speed is highly likely to have been acquired when the visibility is favorable, and is excluded in advance from data to be processed by the change amount calculating section 220 and the visibility estimating section 230. Thus, it is possible for the change amount calculating section 220 and the visibility estimating section 230 to process data acquired at points where the visibility is highly likely to be poor. In this way, processing loads on the change amount calculating section 220 and the visibility estimating section 230 are reduced, thus smoothing poor visibility estimation.

Eighth Embodiment

Figure 31:
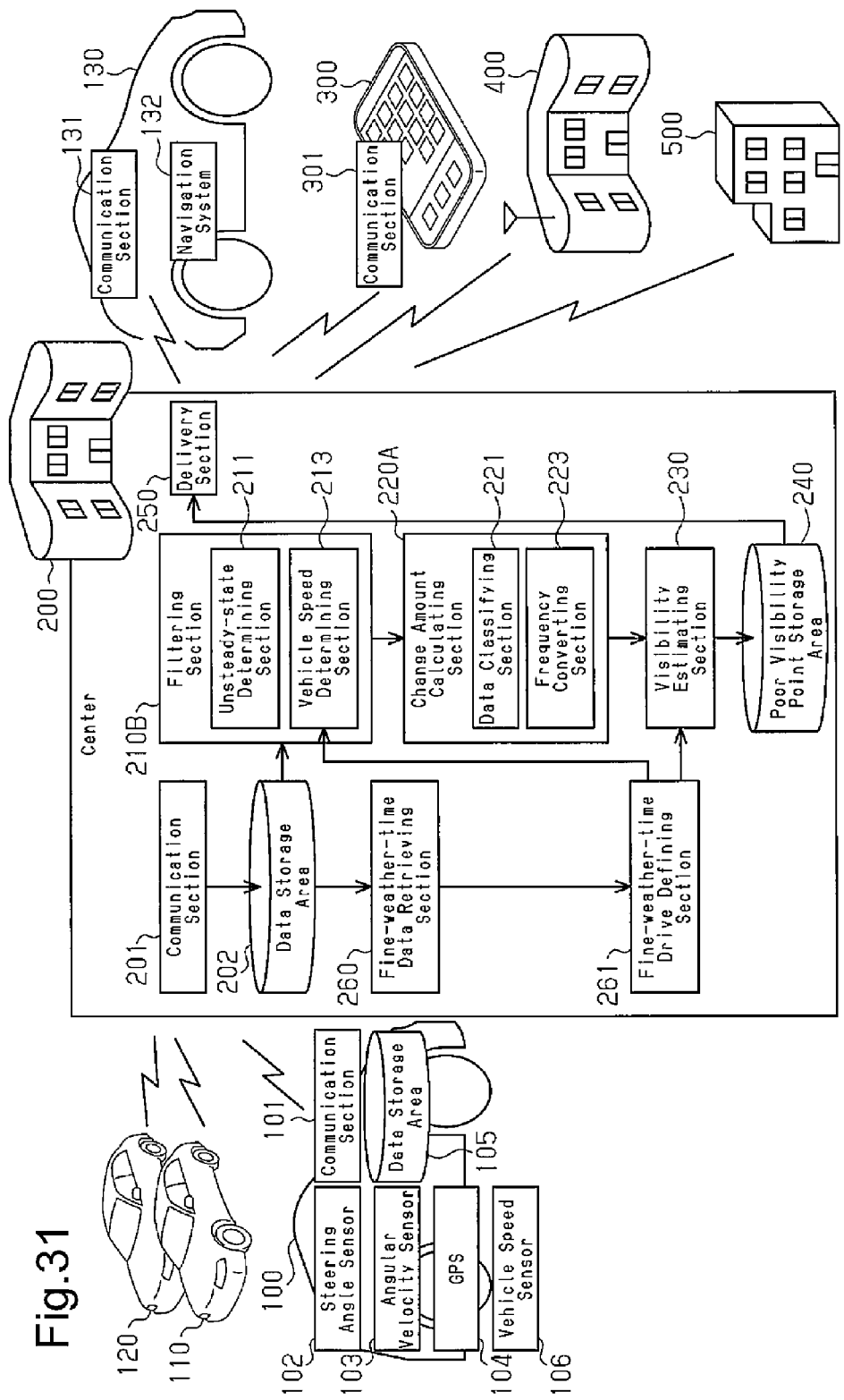
FIG. 31 is a block diagram schematically showing a center to which a poor visibility estimation system and a poor visibility estimation method according to an eighth embodiment of the present invention are applied, and showing communication with the center.
Figure 32:
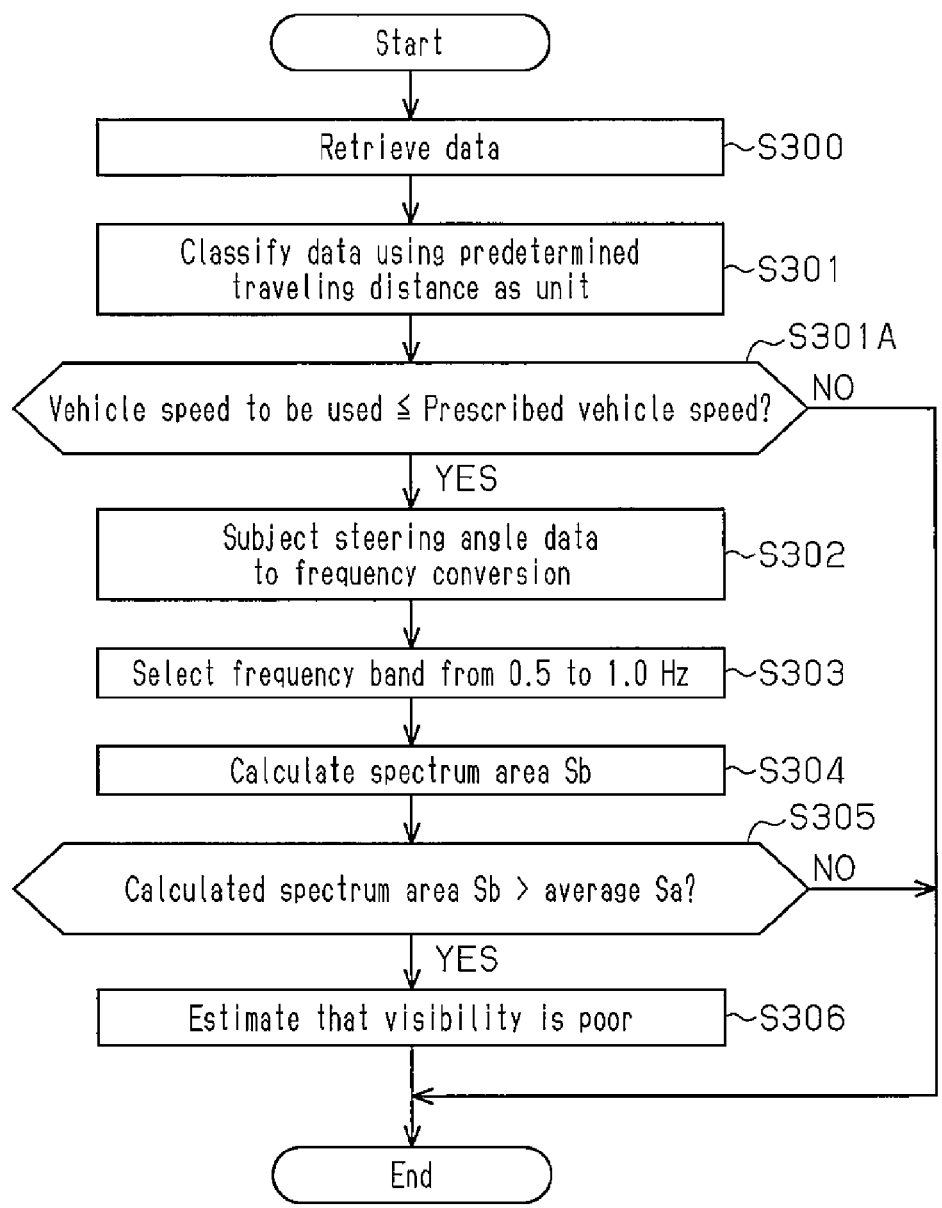
FIG. 32 is a flowchart of an example of a visibility estimation process using the poor visibility estimation system and the poor visibility estimation method according to the eighth embodiment.

Next, referring to FIGS. 31 and 32, a poor visibility estimation system and a poor visibility estimation method according to an eighth embodiment of the present invention will be described, focusing on differences from the second embodiment. The poor visibility estimation system and the poor visibility estimation method according to the present embodiment are identical in basic configuration to the second embodiment. In FIGS. 31 and 32 also, elements substantially identical to those in the second embodiment are labeled with identical symbols, and redundant descriptions thereof will not be repeated.

As shown in FIG. 31, a center 200 according to the present embodiment also collects vehicle speed data acquired by a vehicle speed sensor 106 mounted on a vehicle 100 and provided to detect the traveling speed of the vehicle 100.

Additionally, a filtering section 210B included in the center 200 in the present embodiment further includes a vehicle speed determining section 213 that selects data to be excluded, based on whether traveling speeds indicated by vehicle speed data are equal to or lower than a prescribed traveling speed.

The filtering section 210B in the present embodiment outputs to a change amount calculating section 220 data that has not been excluded by the unsteady-state determining section 211 and vehicle speed determining section 213.

A fine-weather-time data retrieving section 260 in the present embodiment also retrieves, from a data storage area 202, vehicle speed data acquired in fine weather. Then, a fine-weather-time data retrieving section 260 outputs the vehicle speed data retrieved to a fine-weather-time drive defining section 261.

Upon receiving input of a prescribed number or more of vehicle speed data, the fine-weather-time drive defining section 261 calculates the average of traveling speeds indicated by the corresponding vehicle speed data. Then, the fine-weather-time drive defining section 261 determines that this average is a normal traveling speed acquired in fine weather, and outputs the average to the vehicle speed determining section 213.

Upon receiving input of the average of the traveling speeds, the vehicle speed determining section 213 sets, as a prescribed traveling speed for selecting data to be excluded, the speed that is, for example, about 25% or more lower than this average or less.

Referring to FIG. 32, a poor visibility estimation system and a poor visibility estimation method according to the present embodiment will now be described.

As shown in FIG. 32, when data stored in the data storage area 202 is retrieved (step S300), data indicating steering angle among the retrieved data is classified for every prescribed traveling unit and integrated (step S301).

Then, it is determined whether the vehicle traveling speeds indicated by vehicle speed data associated with steering angle data resulting from the classification are equal to or lower than the prescribed traveling speed (step 301A).

If the vehicle traveling speeds indicated by the vehicle speed data is equal to or lower than the prescribed traveling speed (step S301A: YES), steering angle data associated with the vehicle speed data is to be subjected to frequency conversion (step S302). Based on the steering angle data thus subjected to frequency conversion, poor visibility estimation is estimated (steps S302 to 306).

In contrast, if the vehicle traveling speeds indicated by the vehicle speed data exceed the prescribed traveling speed (step S301A: NO), the vehicle speed data is highly likely to have been acquired in a situation where the visibility is favorable enough for the vehicle to travel at a normal traveling speed. Therefore, the steering angular velocity data associated with the vehicle speed data is excluded.

As described above, the poor visibility estimation system and the poor visibility estimation method of the present embodiment achieves the following advantages, as well as the advantages (1) to (3), (6) to (12), and (4A) to (8A).

(20) Based on vehicle traveling speeds, the filtering section 210B selects data not used for poor visibility estimation. Therefore, the steering angle data acquired at traveling speeds higher than the prescribed speed is highly likely to have been acquired when the visibility is favorable, and is excluded in advance from data to be processed by the change amount calculating section 220A and the visibility estimating section 230. Thus, it is possible for the change amount calculating section 220A and the visibility estimating section 230 to process data acquired at points where the visibility is highly likely to be poor. In this way, processing loads on the change amount calculating section 220A and the visibility estimating section 230 are reduced, thus smoothing poor visibility estimation.

Ninth Embodiment

Figure 33:
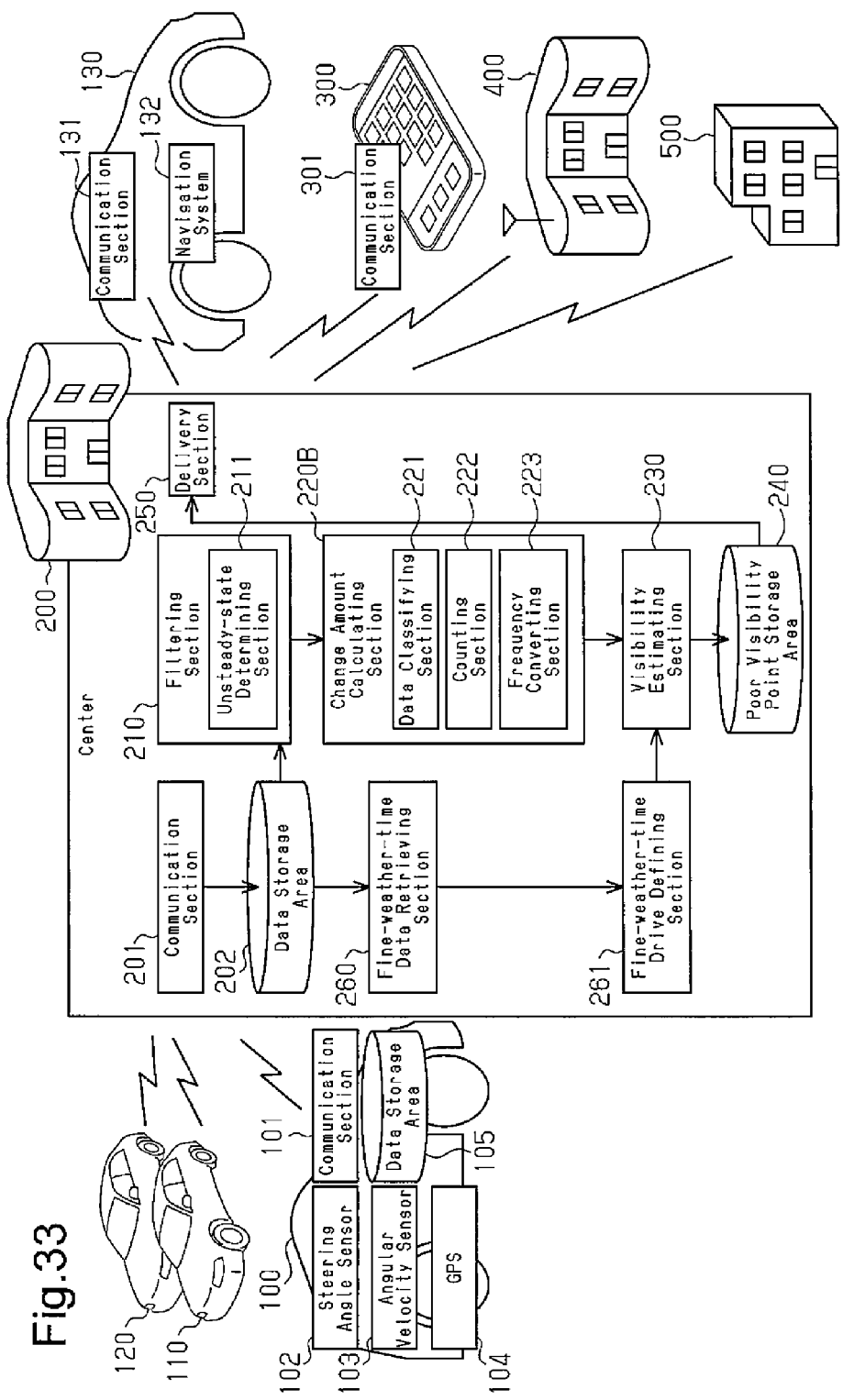
FIG. 33 is a block diagram schematically showing a center to which a poor visibility estimation system and a poor visibility estimation method according to a ninth embodiment of the present invention are applied, and showing communication with the center.
Figure 34:
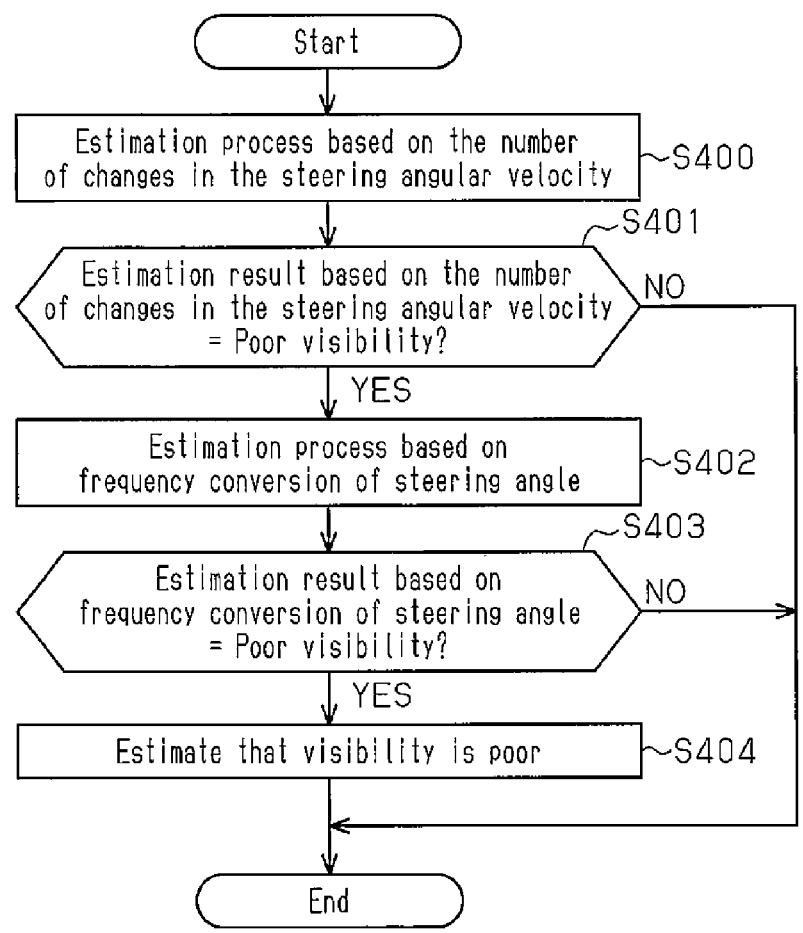
FIG. 34 is a flowchart of an example of a visibility estimation process using the poor visibility estimation system and the poor visibility estimation method according to the ninth embodiment.

Next, referring to FIGS. 33 and 34, a poor visibility estimation system and a poor visibility estimation method according to a ninth embodiment of the present invention will be described, focusing on differences from the first embodiment. The poor visibility estimation system and the poor visibility estimation method according to the present embodiment are identical in basic configuration to the first embodiment. In FIGS. 33 and 34 also, elements substantially identical to those in the first embodiment are labeled with identical symbols, and redundant descriptions thereof will not be repeated.

As shown in FIG. 33, a center 200 according to the present embodiment further includes the above-described fine-weather-time data retrieving section 260 and a fine-weather-time drive defining section 261.

Additionally, a change amount calculating section 220B included in a center 200 in the present embodiment includes the above-described data classifying section 221, the above-described counting section 222, and a frequency converting section 223.

A visibility estimating section 230 in the present embodiment estimates poor visibility based on the respective results of estimation by both the data classifying section 221 and the frequency converting section 223, or the result of estimation by either one of these.

Referring to FIG. 34, next will be described a visibility estimation procedure using the poor visibility estimation system and the poor visibility estimation method according to the present embodiment.

As shown in FIG. 34, first in step S400, an estimation process based on the number of changes in the steering angular velocity, which corresponds to steps S100 to S106 in FIG. 5 described above, is carried out.

Then, if the visibility is determined to be poor as a result of the estimation based on the number of changes in the steering angular velocity (step S401: YES), an estimation process based on the frequency conversion of the steering angle, which corresponds to steps S301 to S306 in FIG. 13 described above, is carried out (step S402).

If the visibility is determined to be poor as a result of the estimation based on the frequency conversion of the steering angles (step S403: YES), the visibility is estimated to be poor (step S404).

In contrast, if the visibility is determined not to be poor as a result of the estimation based on the number of changes in the steering angular velocity (step S401: NO), the condition for poor visibility is not satisfied, and this process is terminated. Similarly, if the visibility is determined not to be poor as a result of the estimation based on the frequency conversion of the steering angle (step S403: NO) when the visibility is determined to be poor as a result of estimation based on the number of changes in the steering angular velocity (step S401: YES), the condition for poor visibility is not satisfied, and this process is terminated.

As described above, the poor visibility estimation system and the poor visibility estimation method of the present embodiment achieves the following advantages, as well as the advantages (1) to (12).

(21) The change amount calculating section 220B has the counting section 222 and frequency converting section 223. If both the results of the processes respectively performed by the counting section 222 and the frequency converting section 223 are equal to a reference change amount provided for poor visibility, the visibility estimating section 230 estimates that the visibility is poor. Therefore, whether the visibility is favorable is estimated based on the respective amounts of change in both steering angle and steering angular velocity. Thus, the reliability of the result of poor visibility estimation is further improved.

(22) If the visibility is determined to be poor as a result of estimation based on the number of changes in the steering angular velocity, an estimation process based on the frequency conversion of the steering angle is carried out. Thus, the estimation process based on the frequency conversion of the steering angle is conditionally carried out. Thus, the processing load of frequency-converting the steering angle is reduced.

Tenth Embodiment

Figure 35:
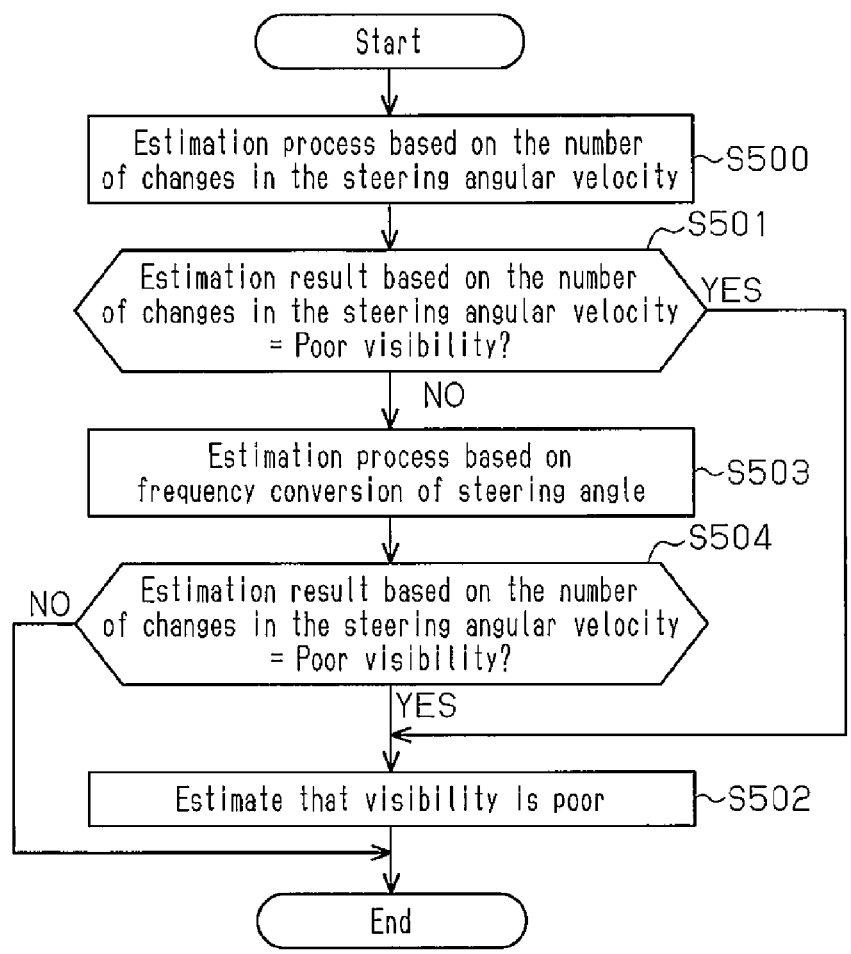
FIG. 35 is a flowchart of an example of a poor visibility estimation process using a poor visibility estimation system and a poor visibility estimation method according to a tenth embodiment of the present invention.

Next, referring to FIG. 35, a poor visibility estimation system and a poor visibility estimation method according to a tenth embodiment of the present invention will be described, focusing on differences from the ninth embodiment. The poor visibility estimation system and the poor visibility estimation method according to the present embodiment are identical in basic configuration to the ninth embodiment. In FIG. 35 also, elements substantially identical to those in the ninth embodiment are labeled with identical symbols, and redundant descriptions thereof will not be repeated.

In the present embodiment, as shown in FIG. 35, in step S500, an estimation process based on the number of changes in the steering angular velocity, which corresponds to steps S100 to S106 in FIG. 5 described above, is carried out.

Then, if the visibility is determined to be poor based on the number of changes in the steering angular velocity (step S501: YES), the visibility is estimated to be poor (step S502).

In contrast, if the visibility is determined not to be poor based on the number of changes in the steering angular velocity (step S501: NO), an estimation process based on the frequency conversion of the steering angle, which corresponds to steps S301 to S306 in FIG. 13 described above, is carried out (step S503).

Then, if the visibility is determined to be poor based on the frequency conversion of the steering angle (step S504: YES), the visibility is estimated to be poor (step S502).

In contrast, if the visibility is determined not to be poor as a result of both the determination based on the number of changes in the steering angular velocity and the determination based on the frequency conversion of the steering angle (steps S501: NO, S504: NO), the visibility is estimated not to be poor.

As described above, the poor visibility estimation system and the poor visibility estimation method of the present embodiment achieves the following advantages, as well as the advantages (1) to (12).

(23) The change amount calculating section 220B has the counting section 222 and frequency converting section 223. If the result of a process performed by the counting section 222 or that performed by the frequency converting section 223 is equal to a reference change amount for poor visibility, the visibility estimating section 230 estimates that the visibility is poor. Therefore, if the visibility is determined to be poor from the view of steering angle or steering angular velocity, the visibility is estimated to be poor. In this way, when the visibility is highly likely to be poor, the visibility is easily estimated to be poor, thus improving fail-safety of the estimation result.

(24) If the visibility is determined not to be poor as a result of estimation based on the number of changes in the steering angular velocity, an estimation process based on frequency conversion of the steering angle is carried out. Therefore, while estimation based on the number of changes in the steering angular velocity and frequency conversion of the steering angle is carried out, an estimation process based on frequency conversion of the steering angle is conditionally carried out. Thus, the processing load of frequency-converting the steering angle is reduced.

Eleventh Embodiment

Figure 36:
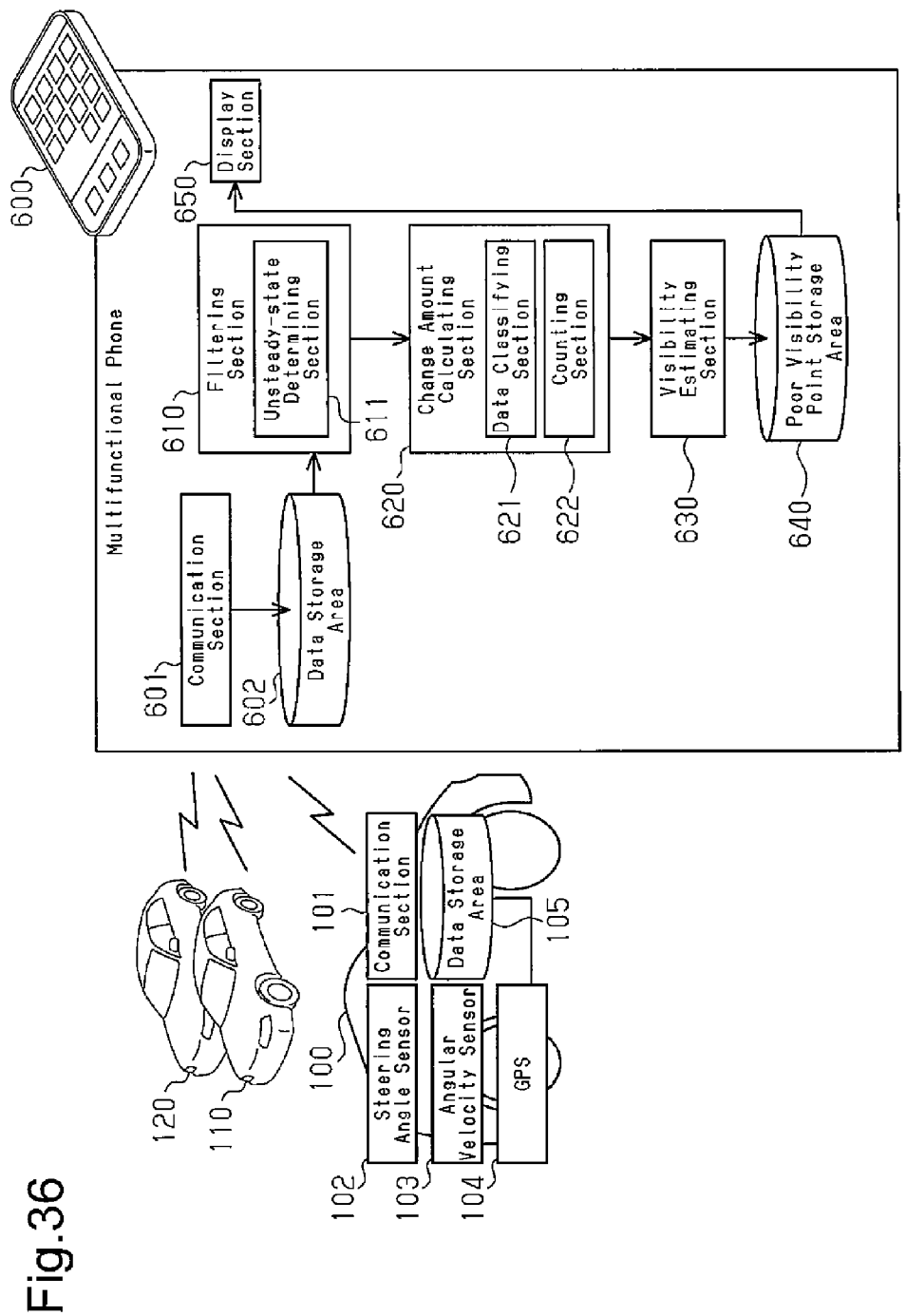
FIG. 36 is a block diagram schematically showing a center to which a poor visibility estimation system and a poor visibility estimation method according to an eleventh embodiment of the present invention are applied, and showing communication with the center.

Next, referring to FIG. 36, a poor visibility estimation system and a poor visibility estimation method according to an eleventh embodiment of the present invention will be described, focusing on differences from the ninth embodiment. The poor visibility estimation system and the poor visibility estimation method according to the present embodiment are identical in basic configuration to the first embodiment. In FIG. 36 also, elements substantially identical to those in the first embodiment are labeled with identical symbols, and redundant descriptions thereof will not be repeated.

As shown in FIG. 36, in the present embodiment, data acquired by each vehicle 100, 110, 120 are transmitted to a multifunctional phone 600 such as a smart phone.

The multifunctional phone 600 includes a communication section 601, a data storage area 602, a filtering section 610 having an unsteady-state determining section 611, a change amount calculating section 620 having a data classifying section 621 and a counting section 622, a visibility estimating section 630, and a poor visibility point storage area 640.

Additionally, the multifunctional phone 600 has a display section 650 for displaying the results of estimation by the visibility estimating section 630.

The multifunctional phone 600 with such a configuration acquires, via the communication section 601, various data transmitted from each vehicle 100, 110, 120. The multifunctional phone 600 estimates poor visibility based on acquired data. The multifunctional phone 600 displays the estimation result on the display section 650.

As described above, the poor visibility estimation system and the poor visibility estimation method of the present embodiment achieves the following advantage, as well as the advantages (1) to (12).

(25) The multifunctional phone 600 includes the change amount calculating section 620 and the visibility estimating section 630. Accordingly, the multifunctional phone 600 is able to estimate poor visibility alone.

Twelfth Embodiment

Figure 37:
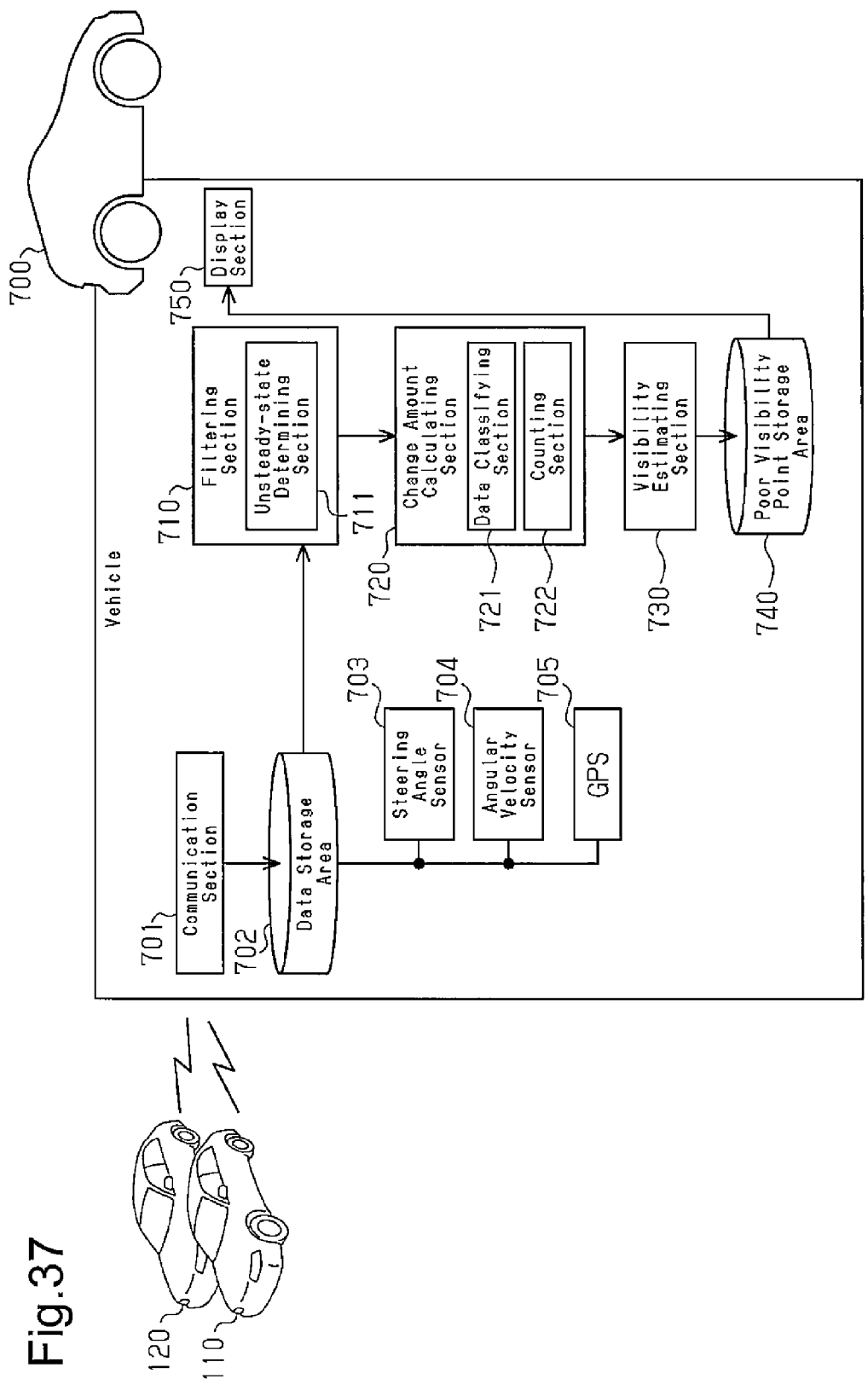
FIG. 37 is a block diagram schematically showing a center to which a poor visibility estimation system and a poor visibility estimation method according to a twelfth embodiment of the present invention are applied, and showing communication with the center.

Next, referring to FIG. 37, a poor visibility estimation system and a poor visibility estimation method according to a twelfth embodiment of the present invention will be described, focusing on differences from the first embodiment. The poor visibility estimation system and the poor visibility estimation method according to the present embodiment are identical in basic configuration to the first embodiment. In FIG. 37 also, elements substantially identical to those in the first embodiment are labeled with identical symbols, and redundant descriptions thereof will not be repeated.

As shown in FIG. 36, a vehicle 700 to which the poor visibility estimation system and the poor visibility estimation method according to the present embodiment are applied includes a communication section 701, a data storage area 702, a steering angle sensor 703, and an angular velocity sensor 704.

Additionally, the vehicle 700 includes a filtering section 710 having an unsteady-state determining section 711, a change amount calculating section 720 having a data classifying section 721 and a counting section 722, a visibility estimating section 730, and a poor visibility point storage area 740. The vehicle 700 also has a display section 750 for displaying the results of estimation by the visibility estimating section 730.

In the vehicle 700 with such a configuration, data indicating the respective results of detection by the steering angle sensor 703, the angular velocity sensor 704, and a GPS 705 are stored in the data storage area 702. Additionally, data are acquired from other vehicles 110, 120, and the like through communication between the communication section 701 and other vehicles 110, 120 and through communication between road vehicles. Then, the acquired data is stored in the data storage area 702.

When a route to a destination is searched for by a navigation system or the like, the filtering section 710 retrieves, from the data storage area 702, data acquired at a point or in an area included in the route searched for.

The filtering section 710 outputs the filtered data to the change amount calculating section 720. Then, poor visibility is estimated based on an amount of change in the operation element, calculated by the change amount calculating section 720. The result of poor visibility thus estimated is shown on the display section 750 together with a view provided for guiding the route to the destination.

As described above, the poor visibility estimation system and the poor visibility estimation method of the present embodiment achieves the following advantages, as well as the advantages (1) to (12).

(26) The vehicle 700 includes the change amount calculating section 720 and the visibility estimating section 730. Thus, it is possible for the vehicle 700 to estimate poor visibility alone based on data acquired from the vehicle 700 or data acquired between vehicles.

Thirteenth Embodiment

Figure 38:
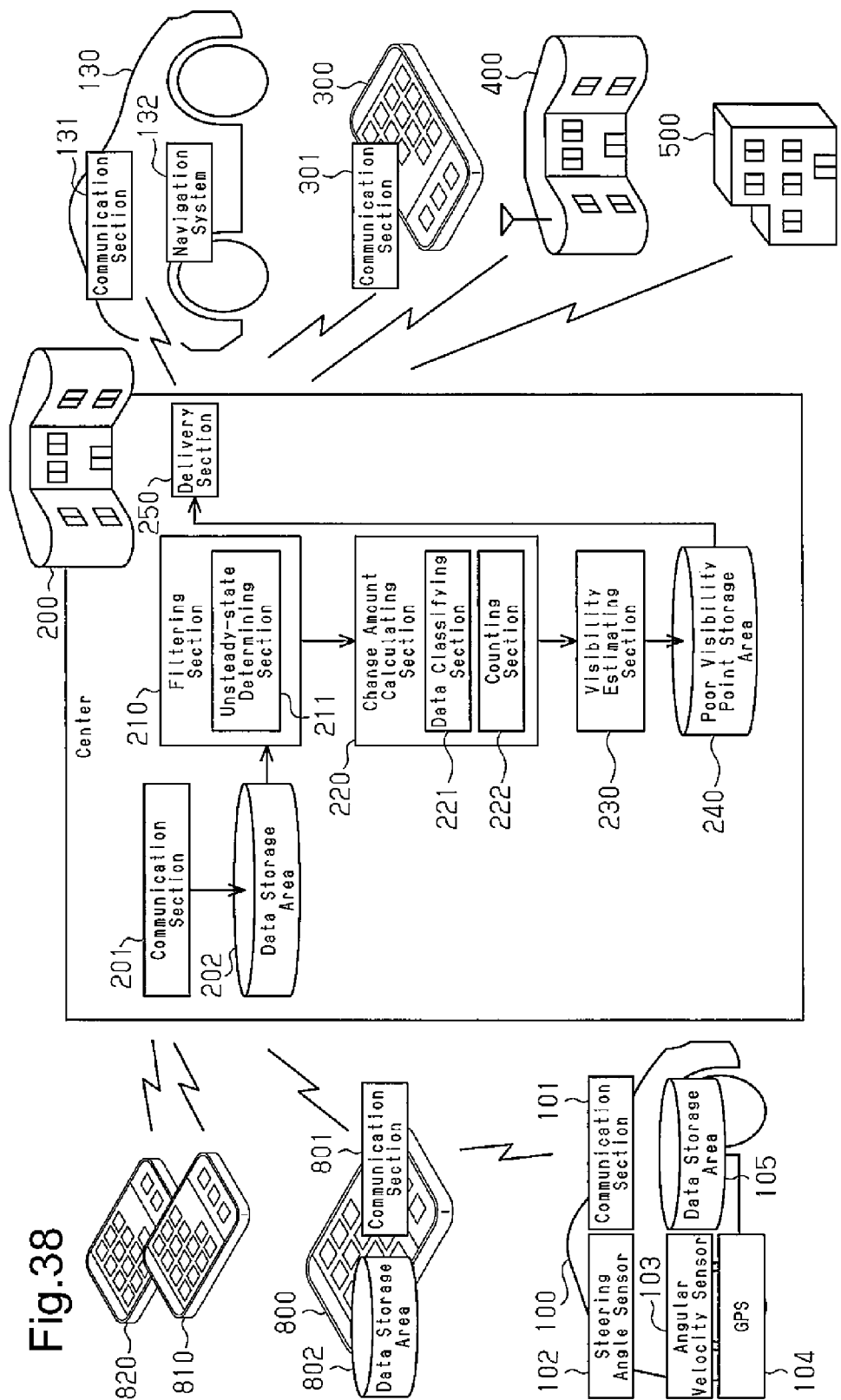
FIG. 38 is a block diagram schematically showing a center to which a poor visibility estimation system and a poor visibility estimation method according to a thirteenth embodiment of the present invention are applied, and showing communication with the center.

Next, referring to FIG. 38, a poor visibility estimation system and a poor visibility estimation method according to a thirteenth embodiment of the present invention will be described, focusing on differences from the first embodiment. The poor visibility estimation system and the poor visibility estimation method according to the present embodiment are identical in basic configuration to the first embodiment. In FIG. 38 also, elements substantially identical to those in the first embodiment are labeled with identical symbols, and redundant descriptions thereof will not be repeated.

As shown in FIG. 38, in the present embodiment, data acquired in the vehicle 100 is stored in a multifunctional phone 800, such as a smart phone used by a passenger in the vehicle 100, through communication between its communication section 101 and the communication section 801 of the multifunctional phone 800.

The multifunctional phone 800 includes a data storage area 802 storing data acquired through communication with the communication section 101. The multifunctional phone 800 transmits data stored in the data storage area 802 to a center 200 if at least one of, for example, the conditions described below is satisfied: a prescribed time has passed; data stored in the data storage area 802 have exceeded a prescribed amount; and the cessation of traveling of the vehicle 100 has been detected.

In this way, data are transmitted to the center 200 from multifunctional phones 800, 810, 820, and the like of a plurality of kinds. Then, in the center 200, poor visibility is estimated based on the collected data.

As described above, the poor visibility estimation system and the poor visibility estimation method of the present embodiment achieves the following advantage, as well as the advantages (1) to (12).

(27) Data acquired by the vehicle 100 is transmitted to the center 200 via the multifunctional phones 800, 810, 820, and the like. Accordingly, the collective source of data acquired by the vehicle 100 is diversified.

Other Embodiments

The above described embodiments may be modified as follows.

In each of the third and fourth embodiments, the filtering section 210A comprises the unsteady-state determining section 211 and the curve determining section 212. The invention is not limited to this, but the filtering section 210A may comprise the curve determining section 212 only. Additionally, in each of the first, second, and fifth to tenth embodiments, the filtering section may comprise only the curve determining section. Furthermore, in each embodiment, the filtering section may comprise the unsteady-state determining section, curve determining section, or vehicle speed determining section. Additionally, the filtering section may comprise an unsteady-state determining section, a curve determining section, and a vehicle speed determining section in combination, as needed.

In each of the first to tenth and thirteenth embodiments, the center 200 includes the filtering section 210. The invention is not limited to this, but a vehicle 100 and the like from which various types of data are acquired may comprise the filtering section 210.

In each of the first to tenth and thirteenth embodiments, the center 200 includes the filtering section 210. The invention is not limited to this, but the center 200 may include no filtering section 210. Additionally, in the eleventh embodiment, the multifunctional phone 600 includes the filtering section 610. However, the multifunctional phone 600 may include no filtering section 610. Furthermore, in the twelfth embodiment, the vehicle 700 includes the filtering section 710. However, the vehicle 700 may include no filtering section 710.

In each of the first, third, fifth, seventh, and ninth to thirteenth embodiments, poor visibility is estimated on the base of change amounts indicated by steering angular velocity data. The invention is not limited to this, but poor visibility may be estimated based on change amounts indicated by steering angle data. According to this, if a change amount per unit time of the steering angle indicated by steering angle data has reached or exceeded a prescribed change amount, the visibility is estimated to be poor. According to this, if the number of times that the steering direction is reversed, indicated by steering angle data, has reached or exceeded the prescribed change amount, the visibility is estimated to be poor.

Figure 39:
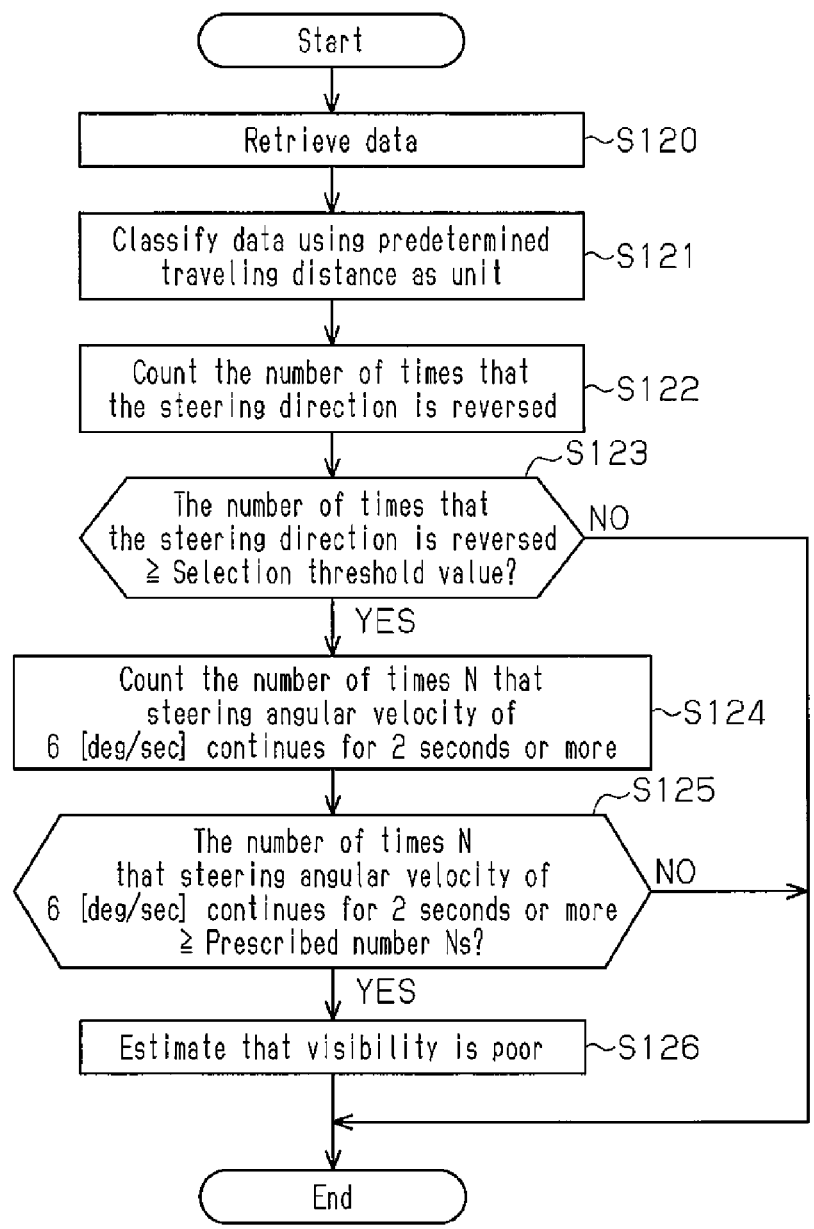
FIG. 39 is a flowchart of an example of a poor visibility estimation process using a poor visibility estimation system and a poor visibility estimation method according to another embodiment of the present invention.

In each of the first, third, fifth, seventh, and ninth to thirteenth embodiments, filtering based on the number of times that the steering direction is reversed is carried out in step S102 in FIG. 5 or the like, and then data is classified per predetermined traveling distance as a unit (step S102, S103 and the like). The invention is not limited to this. However, as shown in FIG. 39, in each embodiment, after data is classified using a predetermined traveling distance as a unit, filtering may be carried out per unit for the classification based on the number of times that the steering direction is reversed (steps S121 to 123 in FIG. 39).

In each of the first, third, fifth, seventh, and ninth to third embodiments, the visibility is estimated to be poor when the number of times that a steering angular velocity of about 6 [deg/sec] or higher continues for about 2 seconds or more is one or more. The invention is not limited to this. However, the number of times used as a reference for estimating the visibility to be poor may be two or more times. Additionally, the time for which a steering angular velocity of about 6 [deg/sec] or higher continues may be shorter or longer than 2 seconds. Furthermore, a steering angular velocity may be lower or higher than about 6 [deg/sec]. Additionally, a condition for estimating the visibility to be poor is satisfied in the case of at least one of the following situations: the time for which the amount of change equal to or greater than the reference change amount continues is equal to or longer than a prescribed time: the number of times that the amount of change becomes equal to or greater than the reference change amount is equal to or larger than a prescribed number; and the number of times that the time for which the amount of change equal to or greater than the reference change amount continues is equal to or longer than the prescribed time, is equal to or larger than a prescribed number. Besides this, the visibility may be estimated to be poor if the average of steering angular velocities is equal to or greater than a prescribed threshold value. Additionally, for example, the time for which the amount of change equal to or greater than the reference change amount may be the total of times for which the calculated amount of change is equal to or greater than the reference change amount, during a predetermined period.

In the fifth embodiment, a selection threshold value for the number of times that the steering direction is reversed, and an estimation threshold value for poor visibility are selected for each traveling environment. Besides this, in each of the first, third, fifth, seventh, and ninth to thirteenth embodiments, a selection threshold value for the number of times that the steering direction is reversed, and an estimation threshold value for poor visibility may be selected for each traveling environment.

In the sixth embodiment, fine-weather-time driving is defined for each traveling environment. Then, the average value of traveling environments common to or similar to the traveling environment where data to be subjected to estimation has been acquired is used for poor visibility estimation. Besides this, in each of the second, fourth, sixth, and eighth embodiments, fine-weather-time driving may be defined for each traveling environment. Then, the average value of traveling environments common to or similar to the traveling environment where data to be subjected to estimation has been acquired may be used for poor visibility estimation.

In each of the first, third, fifth, seventh, and ninth to thirteenth embodiments, data is classified per predetermined traveling distance unit in a manner shown in FIG. 3 as an example, and an amount of change in the operation element, indicated by the data classified per predetermined traveling distance unit is calculated in the mode of shifting the data as required for every data collection unit. The invention is not limited to this, but an amount of change in the operation element may be calculated using, as a unit, a predetermined traveling distance, for example, from tens to hundreds of meters. Additionally, an amount of change in the operation element may be calculated per data collection unit. The data collection unit is not limited to the interval used in a vehicle network but may be a unit determined based on the resolutions of various sensors.

In each of the second, fourth, sixth, and eighth embodiments, the change amount calculating section 220A performs the process of calculating an amount of change in the operation element, using as a unit a predetermined traveling distance of each vehicle 110, 120, 130. The invention is not limited to this. However, each time a collection road section of data indicating an amount of change in the operation element is switched, the change amount calculating section 220 may perform the process of calculating the amounts of change as required, the collection road section using as a unit a predetermined traveling distance of each vehicle 110, 120, 130. By means of this also, it is also possible to obtain the same effect as (4) described above.

In each of the second, fourth, sixth, and eighth embodiments, the center 200 includes the fine-weather-time data retrieving section 260 and the fine-weather-time drive defining section 261. The invention is not limited to this, but the center 200 may include neither the fine-weather-time data retrieving section 260 nor the fine-weather-time drive defining section 261. By virtue of this, the visibility estimating section 230 pre-holds data indicating the average of the spectrum areas of steering angle data acquired in fine weather. Then, the visibility estimating section 230 carries out poor visibility estimation based on the data indicating this average.

In each of the second, fourth, sixth, and eighth embodiments, the average of the spectrum areas of the steering angle acquired in fine weather is used. The invention is not limited to this, but the smallest or maximum value of the spectrum area of the steering angle acquired in fine weather may be used. Additionally, a value obtained by multiplying the average of the spectrum areas of the steering angle acquired in fine weather by a given coefficient may be used. Furthermore, if the difference from the average of the spectrum areas of the steering angle acquired in fine weather is equal to or larger than a prescribed value, the visibility may be estimated to be poor.

In each of the second, fourth, sixth, and eighth embodiments, poor visibility is estimated based on the spectrum areas of steering angle data. The invention is not limited to this, but poor visibility may be estimated based on the spectrum areas of steering angular velocity data.

In each of the second, fourth, sixth, and eighth embodiments, data resulting from frequency conversion using a frequency band from 0.5 to 1.0 Hz is used for poor visibility estimation. The invention is not limited to this, but data resulting from frequency conversion using a frequency band of 0.5 Hz or lower or 1.0 Hz or higher may be used for poor visibility estimation.

In each of the second, fourth, sixth, and eighth embodiments, data indicating amounts of change in the operation element is subjected to the Fourier transform. The invention is not limited to this. For example, data indicating amounts of change in the operation element may be subjected to the wavelet transform. Instead of these, any method can be used as the conversion method as long as data indicating amounts of change in the operation element is subjected to frequency conversion such that change amounts corresponding to frequencies can be converted into comparable data.

In each embodiment described above, latitude-longitude data indicating position information are collected together with data indicating amounts of change in the operation element. The invention is not limited to this, but data indicating amounts of change only in the operation element may be collected. By means of this, based on information indicating, for example, an address, the point where data indicating an amount of change in the operation element are acquired can be identified. Besides this, in the case where whether data indicating an amount of change in the operation element indicates poor visibility is only estimated, the identification of the poor visibility point or area is not required. Accordingly, latitude-longitude data (position information) does not have to be acquired.

In each embodiment described above, as weather conditions subjected to estimation, the presence or absence of fog, snowstorm, whiteout, or an amount of rain not smaller than a prescribed amount is estimated. The invention is not limited to this. Any weather conditions that may affect the operation mode of a vehicle operation element due to influence on the visibility can be estimated as factors in poor visibility. Whether a factor in poor visibility is fog, snowstorm, whiteout, or an amount of rain not smaller than a prescribed amount, is determined by, for example, a comparison between the threshold values respectively prescribed for fog, snowstorm, whiteout, or an amount of rain not smaller than a prescribed amount, and an amount of change in the operation element. Additionally, whether a factor in poor visibility is fog, snowstorm, whiteout, or an amount of rain not smaller than a prescribed amount, is determined based on, for example, weather information acquired from the outside.

In each embodiment, as an amount of change in the operation element, the steering angle and steering angular velocity of the steering wheel are used. The invention is not limited to this, but steering torque may be used for poor visibility estimation. In this case, steering torque is detected by, for example, a steering torque sensor. An amount of change in the steering wheel is accurately reflected in the steering torque. By virtue of this, poor visibility estimation is carried out with high accuracy using an amount of change in the steering torque as well. Besides this, the amount of change in at least one of elements: the traveling speed, the acceleration, the steering torque, the yaw rate, the amount of depression of the accelerator pedal, and the amount of depression of the brake pedal, may be used for the poor visibility estimation. Additionally, an amount of change in the operation element may be a change amount by which a vehicle operation resulting from poor visibility is reflected.

In each embodiment, poor visibility is estimated based on whether an amount of change in the operation element is equal to or greater than a reference change amount. The invention is not limited to this. However, poor visibility may be estimated based on a comparison between amounts of change, for example, a difference between an amount of change in the operation element subjected to estimation and an amount of change in the operation element acquired when the weather is fine, that is, when the visibility is favorable, or the ratio between them.

The above described embodiments may be combined as needed.

DESCRIPTION OF THE REFERENCE NUMERALS

100 . . . Vehicle, 101 . . . Communication section, 102 . . . Steering angle sensor, 103 . . . Angular velocity sensor, 104 . . . GPS, 105 . . . Data storage area, 106 . . . Vehicle speed sensor, 110, 120, 130 . . . Vehicle, 131 . . . Communication section, 132 . . . Navigation system, 200, 200B . . . Center, 201 . . . Communication section, 202 . . . Data storage area, 203 . . . Map data storage area, 210, 210A, 210B . . . Filtering section, 211 . . . Unsteady-state determining section, 212 . . . Curve determining section, 213 . . . Vehicle speed determining section, 220, 220A, 220B . . . Change amount calculating section, 221 . . . Data classifying section, 222 . . . Counting section, 223 . . . Frequency converting section, 230 . . . Visibility estimating section, 240 . . . Poor visibility point storage area, 250 . . . Delivery section, 261 . . . Fine-weather-time drive defining section, 270 . . . Traveling environment identifying section, 271 . . . Environment information storage area, 272, 273 . . . Traveling environment correspondence map, 300 . . . Multifunctional phone, 400 . . . Road traffic information center, 500 . . . Weather company server, 600 . . . Multifunctional phone, 601 . . . Communication section, 602 . . . Data storage area, 610 . . . Filtering section, 611 . . . Unsteady-state determining section, 620 . . . Change amount calculating section, 621 . . . Data classifying section, 622 . . . Counting section, 630 . . . Visibility estimating section, 640 . . . Poor visibility point storage area, 650 . . . Display section, 700 . . . Vehicle, 701 . . . Communication section, 702 . . . Data storage area, 703 . . . Steering angle sensor, 704 . . . Angular velocity sensor, 705 . . . GPS, 710 . . . Filtering section, 711 . . . Unsteady-state determining section, 720 . . . Change amount calculating section, 721 . . . Data classifying section, 722 . . . Counting section, 730 . . . Visibility estimating section, 740 . . . Poor visibility point storage area, 750 . . . Display section, 800 . . . Multifunctional phone, 801 . . . Communication section, 802 . . . Data storage area, 810, 820 . . . Multifunctional phone.

The invention claimed is:

1. A poor visibility estimation system that estimates poor visibility, comprising:
a detecting sensor configured to detect at least one of a steering angle, a steering angular velocity, and a steering torque of a vehicle; and
a microcomputer configured to perform as a visibility estimating section configured to estimate a poor visibility point or area based on at least one of the detected steering angle, steering angular velocity, and steering torque, wherein
the detecting sensor is configured to detect the steering angle of the vehicle,
the microcomputer is further configured to perform as a frequency converting section configured to subject data about the steering angle to frequency conversion, and
the visibility estimating section is configured such that, if the spectrum area of the data subjected to the frequency conversion in a predetermined frequency band exceeds a spectrum area prescribed as a reference, the visibility estimating section determines that the visibility is poor at the point where the data is acquired or that the visibility is poor in an area including this point.

2. The poor visibility estimation system according to claim 1, wherein the visibility estimating section is configured to use, as the predetermined frequency band, a frequency band in which a difference is noticeable between change in the steering angle when the visibility is poor and change in the steering angle when the visibility is favorable.

3. The poor visibility estimation system according to claim 2, wherein the visibility estimating section uses a frequency band from 0.5 to 1.0 Hz as the predetermined frequency band.

4. A poor visibility estimation system that estimates poor visibility, comprising:
a detecting sensor configured to detect at least one of a steering angle, a steering angular velocity, and a steering torque of a vehicle; and
a microcomputer configured to perform as a visibility estimating section configured to estimate a poor visibility point or area based on at least one of the detected steering angle, steering angular velocity, and steering torque, wherein
the detecting sensor is configured to detect the steering angular velocity of the vehicle, and
the visibility estimating section is configured such that, if at least one of conditions (a), (b), and (c) is satisfied, the visibility estimating section determines that the visibility is poor at a point where the steering angular velocity satisfying the condition is acquired or that the visibility is poor in an area including this point, wherein the conditions are
(a) the steering angular velocity continues to be equal to or higher than a prescribed reference used to determine whether the visibility is favorable for a time equal to or longer than a prescribed time,
(b) the number of times that the steering angular velocity has become equal to or higher than the prescribed reference used to determine whether the visibility is favorable is equal to or larger than a prescribed number, and (c) the number of times that the steering angular velocity continues to be equal to or higher than the prescribed reference used to determine whether the visibility is favorable for a time equal to or longer than the prescribed time is equal to or larger than the prescribed number.

\* \* \* \* \*